United States Patent [19]
Ogino

[11] Patent Number: 6,102,545
[45] Date of Patent: Aug. 15, 2000

[54] LIQUID CRYSTAL DISPLAY UNIT

[75] Inventor: Masanori Ogino, Yokohama, Japan

[73] Assignee: Hitachi, Ltd., Tokyo, Japan

[21] Appl. No.: 08/836,142

[22] PCT Filed: Oct. 17, 1995

[86] PCT No.: PCT/JP95/02123

§ 371 Date: Apr. 17, 1997

§ 102(e) Date: Apr. 17, 1997

[87] PCT Pub. No.: WO96/12208

PCT Pub. Date: Apr. 25, 1996

[30] Foreign Application Priority Data

Oct. 18, 1994 [JP] Japan .................................. 6-251800

[51] Int. Cl.[7] .................................................. G03B 21/14
[52] U.S. Cl. .................................................. 353/38; 353/98
[58] Field of Search .................................. 353/20, 38, 98,
353/99, 57; 362/296, 297, 298, 346, 347;
349/61, 67

[56] References Cited

U.S. PATENT DOCUMENTS

| | | | |
|---|---|---|---|
| 4,422,135 | 12/1983 | McCamy | 362/298 |
| 4,704,004 | 11/1987 | Nosker | 350/345 |
| 4,725,134 | 2/1988 | Ogino | 353/74 |
| 4,969,731 | 11/1990 | Ogino et al. | 353/34 |
| 5,142,387 | 8/1992 | Shikama et al. | 362/298 |
| 5,161,042 | 11/1992 | Hamada | 359/41 |
| 5,217,299 | 6/1993 | Yoshida et al. | 362/298 |
| 5,355,187 | 10/1994 | Ogino et al. | 353/38 |
| 5,491,525 | 2/1996 | Yamasaki et al. | 353/98 |
| 5,749,642 | 5/1998 | Kimura et al. | 353/98 |
| 5,833,341 | 11/1998 | Kimura et al. | 353/98 |
| 5,871,266 | 2/1999 | Negishi et al. | 353/98 |

FOREIGN PATENT DOCUMENTS

| | | |
|---|---|---|
| 0 571 088 | 11/1993 | European Pat. Off. . |
| 0 618 475 | 10/1994 | European Pat. Off. . |
| 60-169833 | 9/1985 | Japan . |
| 62-150317 | 7/1987 | Japan . |
| 62-195984 | 8/1987 | Japan . |
| 63-110422 | 5/1988 | Japan . |
| 1-209481 | 8/1989 | Japan . |
| 2-33082 | 3/1990 | Japan . |
| 3-80222 | 4/1991 | Japan . |
| 4-22938 | 1/1992 | Japan . |
| 4-78816 | 3/1992 | Japan . |
| 4-78840 | 3/1992 | Japan . |
| 4-270333 | 9/1992 | Japan . |
| 5-257114 | 10/1993 | Japan . |
| 6-34969 | 2/1994 | Japan . |
| 6-230384 | 8/1994 | Japan . |
| 6-250177 | 9/1994 | Japan . |
| 7-19029 | 3/1995 | Japan . |
| 7-162700 | 6/1995 | Japan . |

OTHER PUBLICATIONS

Patent Abstracts of Japan, vol. 013, No. 127, Mar. 29, 1989 & JP 63–298217 A (Hitachi, LTD.), Dec. 6, 1998.

Ogino, M., Projection Displays: Past and Future, SID 94 Digest, pp. 223–226.

*Primary Examiner*—William Dowling
*Attorney, Agent, or Firm*—Kenyon & Kenyon

[57] ABSTRACT

A liquid crystal display unit wherein a first light-refracting means, a second light-refracting means, a first light-reflecting means and a third light-refracting means are disposed in a light path of from a light source means to a liquid crystal panel means, and wherein light-converging power (reciprocal of focal length) of the third light-refracting means is selected to be algebraically small in its outer circumferential portion and large in its inner circumferential portion, so that it is possible to improve the efficiency of use of light of the liquid crystal display unit, the relative corner illuminance, the contrast ratio and the image quality.

20 Claims, 49 Drawing Sheets

LIQUID CRYSTAL DISPLAY UNIT

TECHNICAL FIELD

The present invention relates to a liquid crystal display unit excellent in efficiency of use of light and image quality.

Although the present invention is mainly disclosed about a projection type liquid crystal display unit, it can be applied to a direct-view type liquid crystal display unit or a fiber type liquid crystal display unit.

BACKGROUND ART

In order to construct a liquid crystal display unit excellent in image quality, that is, excellent in contrast ratio, light passing through a liquid crystal panel is required to be collimated as much as possible. According to the fruit of researches in recent years, for example, in order to obtain a contrast ratio not lower than 200 to 1, it is necessary that the angle of divergence of light passing through a liquid crystal panel is limited to a range of about 0.15 rad p—p in a first direction (in a direction of narrower directivity) and to a range of about 0.3 rad p—p (about twice as much as the aforementioned 0.15 rad p—p) in a second direction (in a direction of wider directivity).

A typical example of light collimating or collimator means in the prior art is a parabola mirror. A projection type liquid crystal display unit in the prior art is shown in FIG. 1.

In FIG. 1, the reference numeral 1 designates a light source; 2, a parabola mirror; 3, a liquid crystal panel; 4, a projection lens; and 5, a screen. The arrows show paths of light rays. The prior art has at least the following problems.

(1) In FIG. 1, light rays 6, 6' which reach the liquid crystal panel 3 directly without reflection by the parabola mirror 2 are not collimated. Accordingly, the contrast ratio and image quality of reproduced images are deteriorated.

(2) In FIG. 1, the improvement of the efficiency of use of light and the improvement of the relative corner illuminance ratio are contradictory to each other. That is, when one is improved, the other is deteriorated. The term "relative corner illuminance ratio" used herein means the ratio of corner illuminance to central illuminance on the liquid crystal panel and is hereinafter abbreviated to "RCI (relative corner illuminance)".

(3) In FIG. 1, the parabola mirror 2 is rotationally symmetrical with respect to the optical axis thereof. Accordingly, the sectional area of output light is shaped like a circle. When the radius of the circle is 1, the area is $\pi$. On the other hand, the liquid crystal panel 3 is shaped like a rectangular inclusive of a square. The area of the rectangular inscribed in a unit circle is not larger than 2. Accordingly, a loss of about $36\%(1-2/\pi)$ occurs in the peripheral region because of mismatched aspect.

(4) Because the light source 1 is surrounded by the parabola mirror 2 so that the path of an air flow is not linear, it is difficult to improve the efficiency of heat dissipation from the light source.

The result of inventor's analysis on the cause of the aforementioned problems on the basis of phisics or natural science will be described below with reference to FIGS. 1 and 2. FIG. 2 shows a coordinate system in which Z is taken in the direction of the optical axis of the parabola mirror 2 and r is the distance from the optical axis. Assume that the shape of the parabola mirror 2 is given by the following expression:

$$Z = 0.5 r^2 / R_1 \quad (1)$$

in which $R_1$ is the radius of curvature in the central region of the parabola mirror.

The light source 1 is located at the focal point ($Z=0.5R_1$) of the mirror 2. Accordingly, output light reflected by the mirror becomes collimated light. Upon the assumption that the light source is isotropic, light intensity thereof is denoted by I [cd]. Accordingly, total light flux is $4\pi I$[lm]. The increase of output light flux from the isotropic light source is proportional to the increase of the cosine of a zenith angle $\theta$ measured from the optical axis passing through the light source. The total light flux T collimated by the parabola mirror 2 and the efficiency of use of light $E(\theta_M)$ can be obtained as the following expressions. Incidentally, the aspect mismatch loss in the aforementioned item (3) is regarded to be neglected upon the assumption that the liquid crystal panel is shaped like a disk.

$$T = \int_{\theta=\theta_m}^{0} 2\pi I d\cos\theta = 2\pi I(1 - \cos\theta_M) = 4\pi I \sin^2 0.5\theta_M \quad (2)$$

$$\therefore E(\theta_M) = \frac{T}{4\pi I} = \sin^2 0.5\theta_M \quad (3)$$

On the other hand, the illuminance J of output collimated light of the parabola mirror 2 is inversely proportional to the square of the distance from the light source to the mirror. Accordingly, the following expression is obtained.

$$J = \frac{I}{r^2 + (Z - 0.5R_1)^2} \quad (4)$$

$$\underset{(1)}{=} \frac{I}{2R_1 Z + (Z - 0.5R_1)^2}$$

$$= \frac{I}{(Z + 0.5R_1)^2}$$

The aforementioned expression means that the distance from every point on the mirror to the light source is equal to $Z+0.5R_1$. When a value normalized by dividing output illuminance at every point on the mirror by illuminance in the central region of the mirror is made $J_1$, the following expression is obtained. In the aforementioned expression, the parentheses ( ) under the equal sign in the transforming process shows that an expression designated by the number put in the parentheses ( ) is used for deducing the equal sign. This rule applies to succeeding expressions.

$$J_1 = \left(\frac{0.5R_1}{Z + 0.5R_1}\right)^2 \quad (5)$$

Next, think of the expression of $J_1$ in the zenith angle $\theta$. The following expressions are obtained by using the aforementioned relation in which the distance between every point on the mirror and the light source in FIG. 2 is equal to $Z+0.5R_1$.

$$\cos\theta = \frac{0.5R_1 - Z}{Z + 0.5R_1} \quad (6)$$

$$\cos^2 0.5\theta = \frac{1 + \cos\theta}{2}$$

$$\underset{(6)}{=} \frac{0.5R_1}{Z + 0.5R_1} \quad (7)$$

-continued $$\therefore J_1 \underset{(5)}{=} \cos^4\theta \qquad (8)$$

The expressions (3) and (8) are shown in FIGS. 3 and 4 respectively. It is apparent from FIG. 3 that the efficiency of use of light becomes 50% when $\theta_M$ is 0.5 π, that is, a right angle. Moreover, the efficiency of use of light becomes 75% when $\theta_M$ is 2 π/3. It is apparent from FIG. 4 that the relative corner illuminance becomes 25% when θ is 0.5 π. In addition, the relative corner illuminance takes such a small value of 6.3% when θ is 2 π/3.

Although the aforementioned relations i.e. the expressions (4) to (8) have been obtained analytically, the relations may be also obtained on the basis of parabolic geometry alternatively. This is shown in FIG. 5. In FIG. 5, the dotted line 2' is the directrix of a parabola. The detailed description of FIG. 5 will be omitted.

As is understood from FIGS. 3 and 4, the prior art has a problem that the relative corner illuminance is deteriorated when the efficiency of use of light is improved.

As known commonly, a conventional one-panel type color liquid crystal display unit uses pigments of three primary colors for three-primary-color pixels. Accordingly, only energy not larger than one third the light energy generated by a white light source can be used (so-called shadow mask loss). As a measure to compensate for the shadow mask loss to thereby increase the efficiency of use of light by three times, provision of a three-direction means (which converts three primary colors into three different directions) and a microlens means on the light input side of the liquid crystal panel has been proposed in U.S. Pat. No. 5,161,042. In the aforementioned proposal, however, there is a problem that the angle of divergence of input light is degraded to about six times because the parallelism of light inputted to the liquid crystal panel is spoiled. The quality of reproduced images, that is, the contrast ratio of reproduced images is degraded so as to be nearly inversely proportional to the square of the divergence angle of the input light. Accordingly, the aforementioned proposal degrades the contrast ratio by about 36 times. Accordingly, the aforementioned proposal has not been put into practice yet.

Further, provision of lenticular lenses on the input side and output side of the liquid crystal panel has been proposed in JP-A-6-250177 of the present inventor. The proposal is, however, useless for the solution to the aforementioned contrast ratio degradation problem.

Further, in the projection type liquid crystal display unit in the prior art, there is a problem that moiré disturbance is generated because the pixel structure pattern of the liquid crystal panel 3 and the vertically striped structure of the lenticular lenses which are constituent elements of the screen 5 in FIG. 1 interfere with each other. Further, as an independent problem, there arises a problem of ghost disturbance caused by the inner round-trip light reflection in a Fresnel sheet used in the screen. The present inventor has found that such Fresnel ghost disturbance occurs terribly particularly at upper and lower ends on the reproduced image screen on the basis of reasons which will be explained later in the detailed description of embodiments.

The present invention which will be disclosed below is configured on the basis of JP-B2-7-19029, U.S. Pat. No. 4,969,751 (JP-A-2-181182), JP-A-5-257114 and JPA-6-250177 filed by the present inventor and further on the basis of a novel idea.

DISCLOSURE OF THE INVENTION

An object of the present invention is to provide a liquid crystal display unit excellent in contrast ratio and image quality to overcome at least one of the aforementioned problems in the prior art.

Another object of the present invention is to improve the efficiency of use of light of a liquid crystal display unit.

A further object of the present invention is to prevent the degradation of relative corner illuminance of a liquid crystal display unit and to improve the relative corner illuminance.

A further object of the present invention is to provide a light source device for a projection type liquid crystal display unit improved in efficiency of heat dissipation.

A further object of the present invention is to provide a projection type liquid crystal display unit with minimized resolution-degradation and reduced moiré disturbance.

A further object of the present invention is to provide a projection type liquid crystal display unit with reduced ghost disturbance.

A further object of the present invention is to provide a direct-view type, optical fiber type or projection type liquid crystal display unit with excellent efficiency of use of light due to application of the aforementioned improved liquid crystal display technique.

A further object of the present invention is to provide a liquid crystal display unit having a pixel arrangement excellently matched to visual mentality concerning the resolving power of human eyes.

A further object of the present invention is to provide a large-scale liquid crystal display unit durable against the changes of temperature, gravity, etc. in ambient environment.

In order to achieve at least one of the above-mentioned objects, in a first embodiment of the present invention, there are provided first, second and third light-refracting means and a first light-reflecting means.

A part of light outputted from the light source means is inputted to the first light-refracting means, so that light outputted from the first light-refracting means is supplied toward a central region of the liquid crystal panel means via the second light-refracting means; a part of light outputted from the light source means is inputted to the first light-reflecting means, so that light outputted from the first light-reflecting means is supplied toward a peripheral region of the liquid crystal panel means via the third light-refracting means; the third light-refracting means is formed so that a light-deflecting angle of an outside-edge portion thereof is algebraically smaller than a light-deflecting angle of an inside-edge portion thereof; the light-deflecting angle of the inside-edge portion of the third light-refracting means is smaller than a sum of respective light-deflecting angles of outside-edge portions of the first and second light-refracting means, and the direction of output light of the inside-edge portion of the third light-refracting means is substantially coincident with the direction of output light of the outside-edge portion of the second light-refracting means.

In another embodiment of the present invention, in a polar coordinate system having a light source as its origin, there are provided a spherical light-reflecting means in the western hemisphere and a light-ray-direction transforming means (collimator means) in the eastern hemisphere, the collimator means being constituted by at least a first-direction light-deflecting means and a second-direction light-deflecting means.

In a further embodiment of the present invention, in a polar coordinate system having a light source as its origin, there are provided a spherical light reflection means in the western hemisphere and air ventilation opening means in high latitude regions at the southern and northern ends of the spherical light-reflecting means.

In a further embodiment of the present invention, there is provided a direction regulator means in the transmission path of the collimator output light.

In a further embodiment of the present invention, there are provided a three-direction means which converts three primary colors into three different directions, a three-position means and a light-divergence-reducing means along the direction of travelling of light on the light input side of the liquid crystal panel means. As a modified example thereof, there is provided a polarization-direction matching means for making the light divergence direction of the three-direction means coincident with the wide-directivity direction of the liquid crystal panel.

In a further embodiment of the present invention, in a projection type liquid crystal display unit, a light-diverging means for diverging light at least in the horizontal direction is disposed between the liquid crystal panel and the projection lens.

In a further embodiment of the present invention, in a projection type liquid crystal display unit, a Fresnel ghost disturbance reducing means is provided between the liquid crystal panel means and the screen means.

In a further embodiment of the present invention, there is shown a three-direction means, which converts three primary colors into three different directions, using a diffraction grating.

In a further embodiment of the present invention, there is shown a five-direction means, which converts three primary colors into five different directions, using a diffraction grating and a row of prisms.

In a further embodiment of the present invention, there is shown a liquid crystal panel means using a curved thin glass plate.

In the first embodiment of the present invention, the aforementioned structure of the respective means acts so that the relative illuminance of the peripheral region of the liquid crystal panel means is improved. Further, the improvement of the efficiency of use of light is achieved by the combination of the light-refracting means and the light-reflecting means.

In the other embodiment of the present invention, the spherical light-reflecting means serves to return the light, which has been radiated from the light source onto the western hemisphere, to the light source to thereby radiate light towards the eastern hemisphere again. The first-direction light-deflecting means serves to deflect light in a latitude-reducing direction. The second-direction light-deflecting means serves to deflect light in a longitudinal-divergence-reducing direction. By the action of the first-direction and second-direction light-deflecting means, the section of output light thereof can be shaped like a rectangle. Accordingly, the aspect ratio mismatching loss in the prior art can be eliminated so that the efficiency of use of light can be improved.

In the further embodiment of the present invention, the air ventilation opening means provided at the southern and northern ends of the spherical light-reflecting means in the western hemisphere is located at positions to see into the light source means linearly. Accordingly, air can be ventilated efficiently so that the efficiency of heat dissipation can be improved.

In the further embodiment of the present invention, the aforementioned direction regulator means is formed by arranging a number of black thin plates in the form of shelves along the light-ray direction and serves to absorb poor-parallelism light incident at a relatively large angle to a surface of each of the thin plates and to reflect good-parallelism light incident at a relatively small angle thereto. Accordingly, the parallelism of light can be improved so that the angle of divergence of light can be reduced. Accordingly, the improvement of the contrast ratio can be attained.

In the further embodiment of the present invention, the aforementioned light-divergence angle reducing means has a function of reducing the angle of divergence of light of three primary colors to about a half. Accordingly, the six-fold angle of divergence in the conventional proposal can be reduced to the three-fold angle of divergence. Further, by the aforementioned polarization-direction matching means, the direction of the three-fold divergence angle can be made coincident with the wide-directivity direction of the liquid crystal panel means. By the reduction of the divergence angle to a half, the contrast ratio is improved to about four times. By polarization-direction matching, the contrast ratio can be improved to about twice ($sec^2 45°$) compared with the case of 45° mismatching. In the conventional proposal, the efficiency of use of light is improved to three times but the contrast ratio is spoiled fatally. Contrariwise, in the present invention, the efficiency of use of light (luminance) can be improved to three times without any degradation of the contrast ratio. According to the result of recent researches by the present inventor (SID paper by M. Ogino, "Projection Displays: Past and Future", SID 94 DIGEST, pp.223–226), the merit index of the quality of display is proportional to the product of the luminance and the contrast ratio. Accordingly, the impact of the present invention is magnificent.

In the further embodiment of the present invention, the horizontal spot size can be increased by the aforementioned light-diverging means. Accordingly, it is possible to reduce the moire interference due to the vertical-stripe structure of the screen and the pixel arrangement structure of the liquid crystal panel.

In the further embodiment of the present invention, the aforementioned Fresnel ghost disturbance reducing means has a function of tuning up the direction of the polarization plane (the plane containing the direction of vibration of electric field and the direction of travelling of light) of projection light into the vertical direction. Light having a plane of polarization in the vertical direction acts as P-wave at upper and lower ends of the Fresnel lens forming a screen. The upper and lower end portions of the Fresnel lens have properties in which reflectivity with respect to P-wave is very small. Accordingly, ghost disturbance caused by the round-trip light reflection in the Fresnel plate is reduced.

The three-direction means using a diffraction grating serves to transmit diffracted light of positive first order outputted by the diffraction grating toward the liquid crystal panel means and mirror-reflect diffracted light of negative first order outputted by the diffraction grating so that the reflected light thereof becomes collimated light in the direction of diffracted light of positive first order. Accordingly, both output lights of positive and negative polarities can be utilized. Accordingly, the efficiency of use of light can be improved.

The five-direction means converts input collimated white light into five directions of RGBGR. Light rays in the five directions are converged into respective positions of five arrangement positions (RGBRG) of three-primary-color pixels by means of the lenticular lenses. Accordingly, the efficiency of use of light can be improved. Further, the aforementioned pixel arrangement is adapted to visual mentality concerning the resolving power of human eyes.

The curved thin glass plate serves to give even pressure to liquid crystal layers of the liquid crystal panel means. Accordingly, a liquid crystal display unit minimized in uniformity of image quality depending on the environmental change can be configured.

BEST MODES FOR CARRYING OUT THE INVENTION

Before the disclosure of detailed embodiments of the present invention, an energy conservation law, that is, a light flux conservation law in a liquid crystal display unit, found by the present inventor will be disclosed to facilitate the understanding thereof. The assistance of this law makes it possible to inspire a liquid crystal display unit of the present invention suitable for respective specific purposes in various uses. The conservation law shows the following expression.

$$M = n_1^2 \int \int_{s_1} \int \int B(x, y, \theta x, \theta y) dx dy \, d(\sin\theta_x) d(\sin\theta_y) \quad (9)$$

$$= n_2^2 \int \int_{s_2} \int \int B(x, y, \theta x, \theta y) dx dy \, d(\sin\theta_x) d(\sin\theta_y) \quad (9')$$

The meaning of the aforementioned expression is as follows.

Generally, the quantity of light flux passing through an arbitrary sectional area $S_1$ and going toward another sectional area $S_2$ on a route of travelling of light is given by the right side of the expression (9). The value of the expression (9) is equal to a corresponding value in the sectional area $S_2$ through which the light passing through the sectional area $S_1$ passes succeedingly, that is, the value of the expression (9) is equal to the value of the expression (9'). This is an expression which is extended by the present inventor so that the Lagrange-Helmholtz law established only on an image-formation surface in a stigmatic optical system can be applied to an arbitrary boundary in the middle of a more general lossless light propagation path having an arbitrary aberration. From this expression, the intensity conservation law in a continuous optical system is derived.

Figure 6:
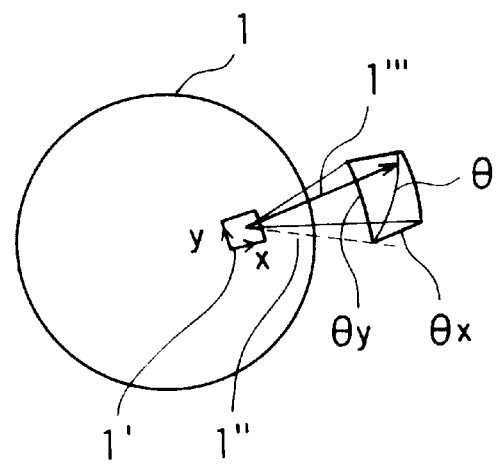
FIG. 6 shows a coordinate system for explaining a generalized light conservation principle which is a base for the present invention.

In the aforementioned expression, $n_1$ and $n_2$ are refractive indices of media including the sectional areas $S_1$ and $S_2$ respectively; dx and dy are differential calculi of orthonormal coordinates (x,y) of each local point on a sectional area on a light path; and $\theta x$ and $\theta y$ are x-axis and y-axis longitudinal components of a light direction $\theta$ measured from a normal direction of a sectional area element. In FIG. 6, the reference numeral 1 designates a light source; 1', a sectional area element; the dotted line 1'', a normal line of the sectional area element; and 1''', a light direction. In the aforementioned expression, $B(x,y,\theta x,\theta y)$ is luminance the unit of which is expressed in [lm/m²sr]=[nit]. Although "sr" in this unit is generally called "steradian", as understood from the expression (9), it is essentially proper to call it "sinusoidal area". Further, the inventor would like to make a proposal that the value of quadruple integral on the assumption B=1 in the expressions (9) and (9') is to be called a mutual exchange area [m²SR] between the faces $S_1$ and $S_2$.

When, for example, the surface of a light emitting portion of the light source is a spherical and Lambertian surface having a radius of 3 mm with a surface luminance of 100,000,000 nit. Accordingly, the total light flux is 100,000,000 nit·4π(3 mm)²·πsr, that is, about 35,500 lm. 4ππ (3 mm)² is called a self exchange area.

Assume now that a lossless light collimating means rotationally symmetrical with respective to an at $$M = B_0 \pi R_2^2 \underset{(10)}{=} \frac{B_0 \pi r_0^2 \pi R_2^2}{L^2} \quad \text{disk side}$$

$$\therefore R_2 = 2L \quad (11)$$

That is, the radius of the disk is twice as much as the distance L between the light source and the disk. This can be discerned from the fact that the surface area of a sphere with a radius L is equal to the surface area of a disk with a radius 2L.

Generally, when the total area of a Lambertian light source uniform in luminance of one unit is $S_1$, the total light flux, that is, the self exchange area of the face $S_1$, is $\pi S_1$. Assuming now that the total light flux is led to a light receiving surface of the area $S_2$ by any lossless optical system and that illuminance is made uniform, then the fact that the area of the two-dimensional divergence angle sine of the light receiving surface is equal to the ratio $\pi S_1/S_2$ can be deduced from the expression (9). On the other hand, reduction of divergence angle is required in order to obtain a high-quality reproductive image excellent in contrast ratio. Therefore, a liquid crystal panel which is as large-sized as possible must be used.

Figure 3:
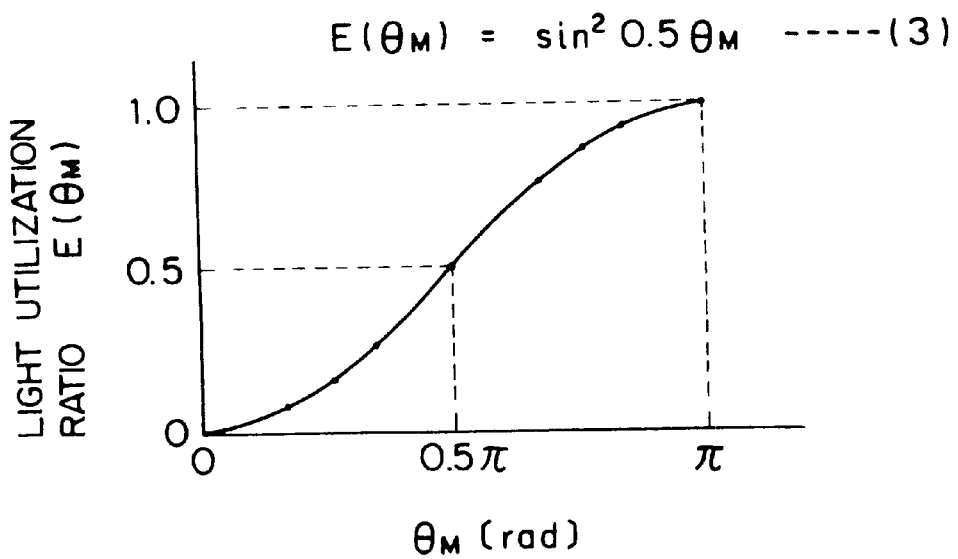
FIG. 3 is a graph for explaining the performance of the conventional liquid crystal display unit.

The next question is to obtain a function of $\theta$ by which R is defined in the case where light emitted in the direction of zenith angle $\theta$ from the isotropic light source 1 is made to reach a position at the radius distance R from the optical axis on the disk surface 7 by an unknown light collimating means. The answer may be obtained by using the relation of FIG. 3 already derived in the previous page, that is, by using the expression 11, as shown in the following expression.

$$R = 2L\sin 0.5\theta \quad (12)$$

$$= \frac{L\sin\theta}{\cos 0.5\theta} \quad (13)$$

$$\therefore \sin\theta = 2\sin 0.5\theta \cos 0.5\theta$$

If the unknown lossless light collimating means is formed to satisfy the aforementioned expression, illuminance on the disk can be made uniform. That is, the ambient light quantity ratio can be made 100%.

Now, the micro magnitude $\epsilon$ of light divergence angle in the position of the radius R on the disk will be obtained. The divergence angle in the direction of the radius, that is, in the meridional direction, is different from the divergence angle in the direction of the circumference, that is, in the sagittal direction. Accordingly, the divergence angles are made $\epsilon m(\theta)$ and $\epsilon s(\theta)$ respectively. Assume now a spherical surface with radius L and with the light source 1 as its center, then illuminance at every point on the spherical surface in the case of an isotropic light source is equal to the aforementioned value $E_0$. The circumference length of an annulus sharing the zenith angle $\theta$ and the width $\Delta\theta$ on the spherical surface is equal to $2\pi L \sin\theta$ and the width thereof is equal to $L\Delta\theta$. On the other hand, an annulus formed on the disk 7 correspondingly to the annulus on the spherical surface has a circumference length equal to $2\pi R$, that is, $4\pi L \sin 0.5\theta$ (expression 12) and a width equal to $\Delta 2L \sin 0.5\theta$, that is, $L \cos 0.5\theta \Delta\theta$. Accordingly, upon the assumption that the unknown light collimating means continuously maps the angle $\theta$ at the radius distance R on the disk in one-to-one correspondence, the following expression is obtained.

$$\mathcal{E}(0) = \frac{2r_0}{L}, \quad (14)$$

$$\mathcal{E}s(\theta)/\mathcal{E}(0) = \frac{2\pi L\sin\theta}{4\pi L\sin 0.5\theta} = \cos 0.5\theta,$$

$$\mathcal{E}m(\theta)/\mathcal{E}(0) = \frac{L\Delta\theta}{L\cos 0.5\theta \Delta\theta} = \frac{1}{\cos 0.5\theta},$$

$$\mathcal{E}m(\theta)\mathcal{E}s(\theta)/\mathcal{E}^2(0) = 1$$

$$\mathcal{E}m(\theta)/\mathcal{E}s(\theta) = 1/\cos^2 0.5\theta$$

Figure 8:
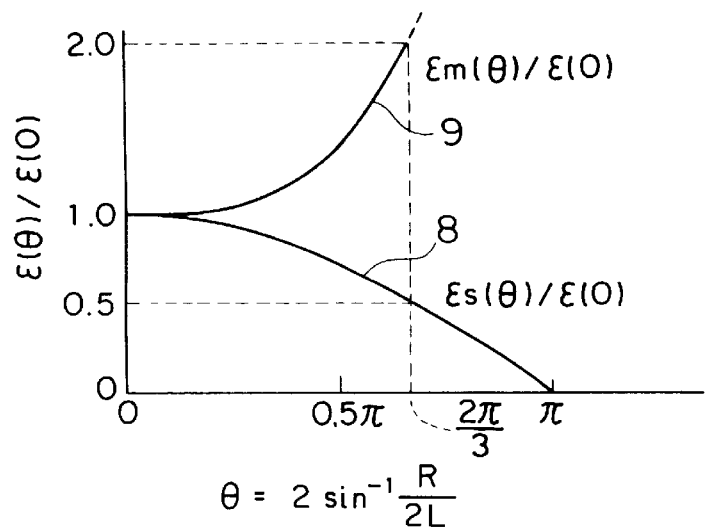
FIG. 8 is a graph for explaining a process of thought resulting in the present invention.

For the deduction of the aforementioned expression, the light flux conservation law in the aforementioned expression (9) is used for every annulus and in which luminance in continuous mapping in one-to-one correspondence is constant. There is further used an approximation in which the sine of a divergence angle $\epsilon$ is equal to the angle [rad] itself when the divergence angle $\epsilon$ is small. The expression (14) means that the divergence angle becomes small because the length is extended on the disk in the sagittal direction, that is, in the direction of the circumference whereas the divergence angle becomes large because the length is reduced on the disk in the meridional direction, that is, in the direction of the radius. The aforementioned relation is illustrated in FIG. 8. In FIG. 8, the curve 8 shows the sagittal divergence angle, and the curve 9 shows the meridional divergence angle.

Figure 4:
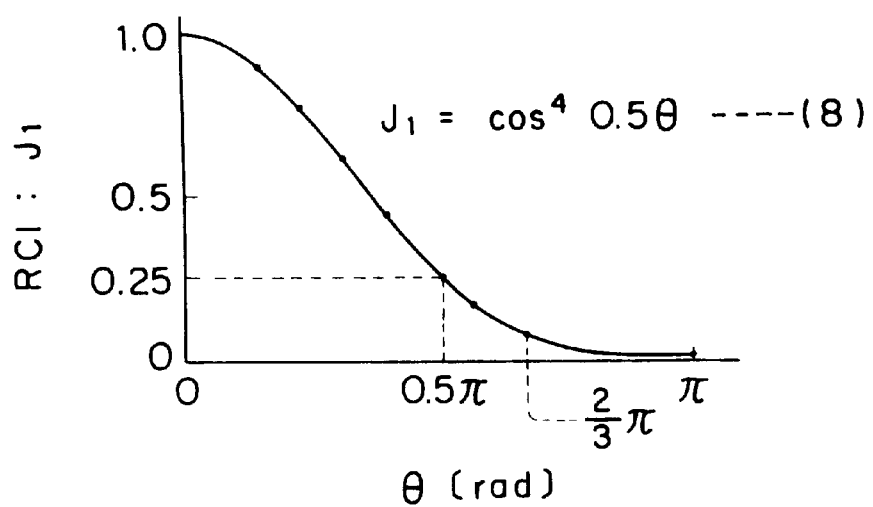
FIG. 4 is a graph for explaining the performance of the conventional liquid crystal display unit.
Figure 9:
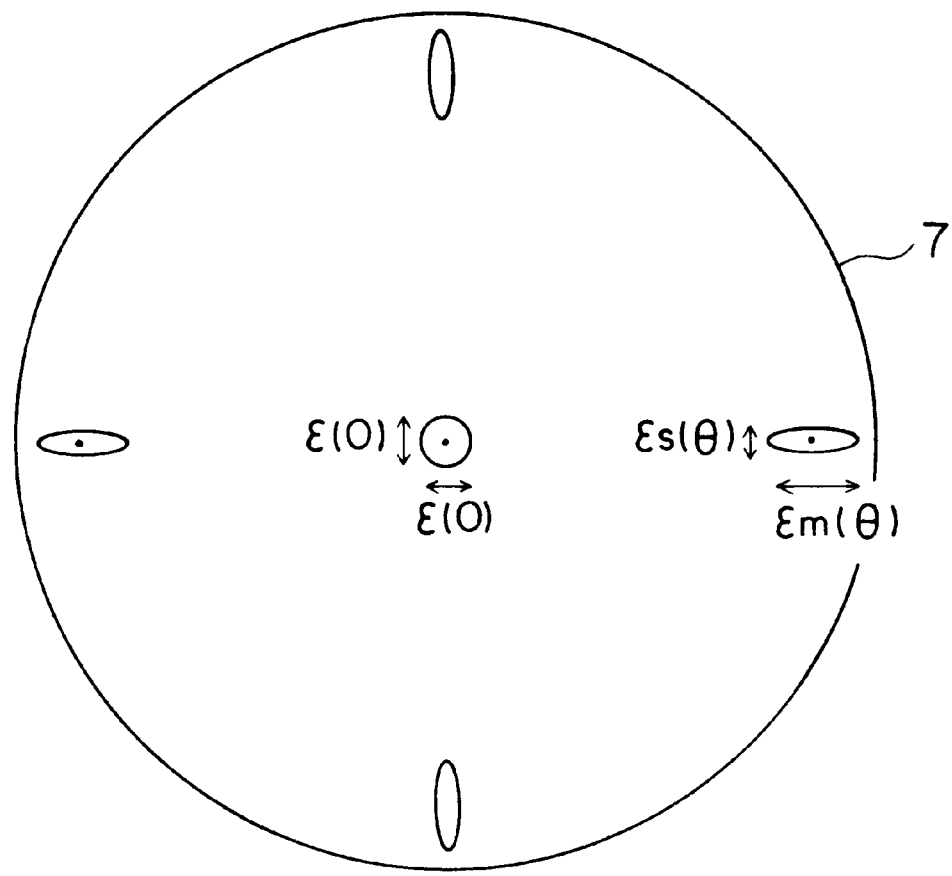
FIG. 9 is a graph for explaining a process of thought resulting in the present invention.

FIG. 9 shows the aforementioned divergence angle on a front view of the disk 7. In FIG. 9, the major axis of each ellipse showing the divergence angle is equal to $\epsilon m(\theta)$ and the minor axis of the ellipse is equal to $\epsilon s(\theta)$. When the area of the central circle is equal to the area of each ambient ellipse, ambient illuminance becomes equal to central illuminance. In the parabola mirror method preliminarily described in the prior art, each of the divergence angles $\epsilon m(\theta)$ and $\epsilon s(\theta)$ in the ambient portion of the disk has been selected to be equal to $\epsilon(0) \cos^2 0.5\theta$. That is, each of the divergence angles has been selected to be proportional to the divergence angle area $\cos^4 0.5\theta$. This fact explains the problems in the prior art in FIG. 4 from another aspect.

As is understood from the form of the ratio $\epsilon m(\theta)/\epsilon s(\theta)$ in the last equation of the expression (14), the square of the ratio is $1/\cos^4 0.5\theta$, that is, the improvement ratio of the ambient light quantity ratio. To make the practical effect of the present invention large, the improvement ratio is preferably selected to be not lower than 1.4. Therefore, it is recommended that the meridional divergence angle of incident light to diagonal corners of the input surface (the meaning of which is a surface of entrance of light before the passage of light through a lenticular lens which will be described later) of the liquid crystal panel is increased to be not smaller than about 1.2 times as much as the sagittal divergence angle. The meaning of the divergence angle is to be understood from the above description.

Figure 7:
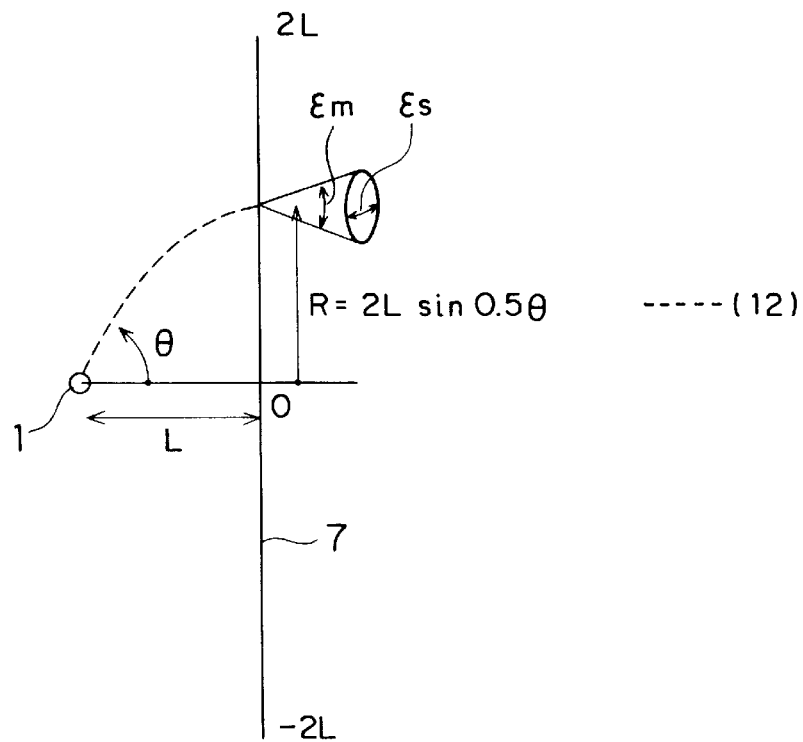
FIG. 7 is a graph for explaining a process of thought resulting in the present invention.

The way of putting the unknown light collimating means into practice will be described below successively in FIGS. 10, 11, 12 and 13. In these drawings, polar coordinates are shown. The origin is disposed in the center of the light source, and $\theta$ means a zenith angle measured from an optical axis. In these drawings, the reference numeral 1 designates a light source; 110, an optical axis; and 7, a disk which is the same as in FIG. 7.

Figure 10:
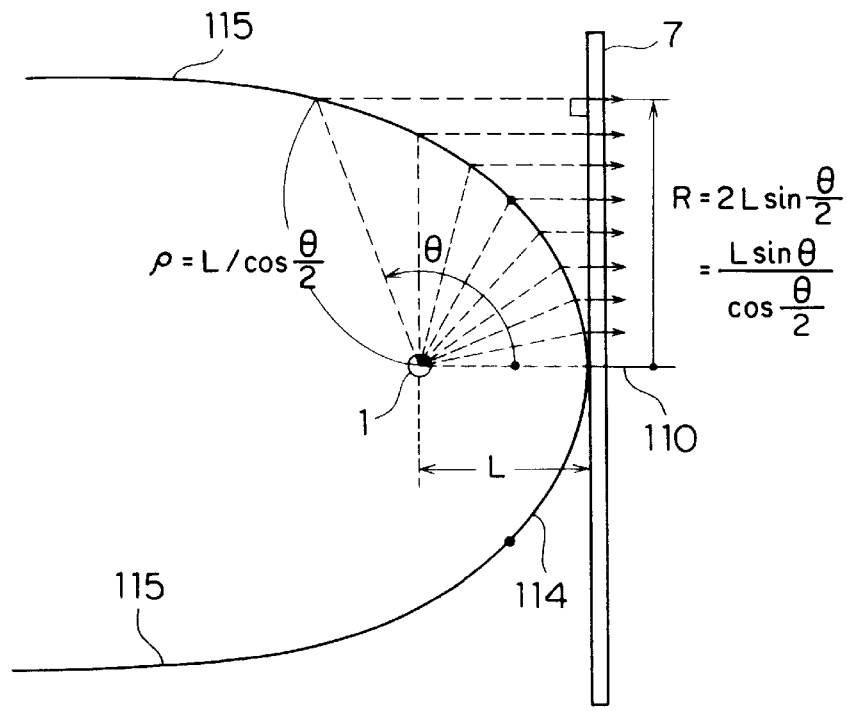
FIG. 10 is a graph for explaining a process of thought resulting in the present invention.

In FIG. 10, the reference numerals 114 and 115 designate auxiliary curves for designing. The auxiliary curve 114 corresponds to a portion in which the zenith angle is not larger than about 60 degrees whereas the auxiliary curve 115 corresponds to a portion in which the zenith angle is not smaller than about 60 degrees. As shown in FIG. 10, the length of radius p is set in accordance with the following expression.

$$\rho = \frac{R}{\sin\theta} \quad (15)$$

$$\overset{=}{\scriptscriptstyle(12)} \frac{2L\sin 0.5\theta}{2\sin 0.5\theta \cos 0.5\theta} = \frac{L}{\cos 0.5\theta} \quad (16)$$

Figure 11:
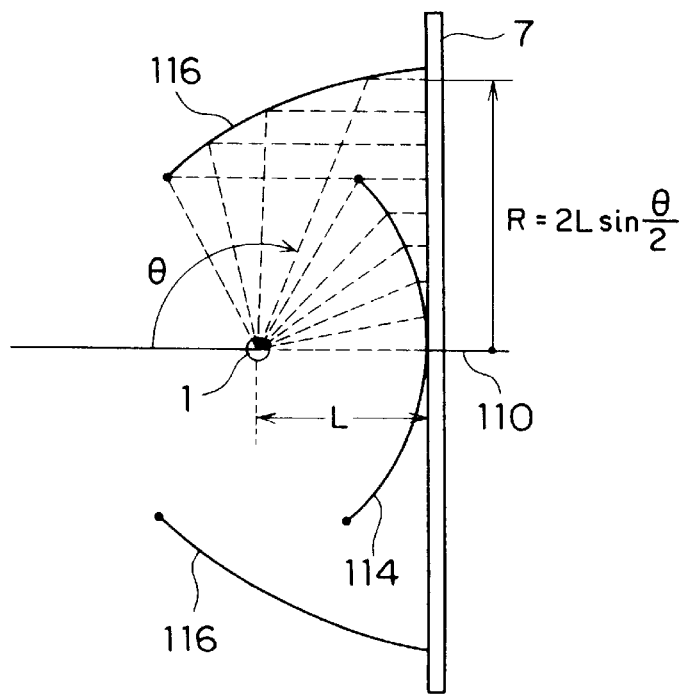
FIG. 11 is a graph for explaining a process of thought resulting in the present invention.

If light emitted in the direction of $\theta$ from the light source 1 intersects the auxiliary curves 114 and 115 and then the light is collimated in parallel to the optical axis 110 as shown in FIG. 10, the illuminance of light incident to the disk 7 is made uniform. The reason is based on the principle described above with reference to FIG. 7. It is however very difficult to realize the function shown in FIG. 10 by one optical means. Therefore, FIG. 10 is transformed into FIG. 11. In FIG. 11, the reference numeral 116 designates an auxiliary curve which is obtained by laterally symmetrically inverting the portion where the zenith angle is not smaller than about 60 degrees in FIG. 10.

Next, it will be thought of that the function shown in the auxiliary curve 114 in FIG. 11 is realized by first and second light-refracting means and, further, the function expressed by the auxiliary curve 116 is realized by a first light-reflecting means and a third light-refracting means. This is shown in FIG. 12.

Figure 12:
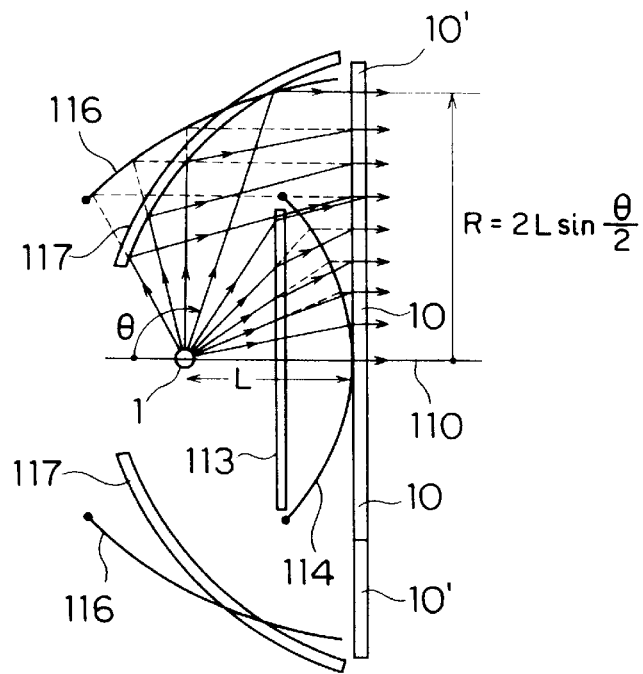
FIG. 12 is a schematic structural view for explaining a first embodiment of the present invention.

In FIG. 12, the reference numeral 113 designates a first light-refracting means; 10, a second light-refracting means; 10', a third light-refracting means; and 117, a first light-reflecting means. Next, the operation thereof will be described. In FIG. 12, the solid lines each having arrow heads show actual light-ray paths. The dotted lines are the same as those in FIG. 11.

Figure 14:
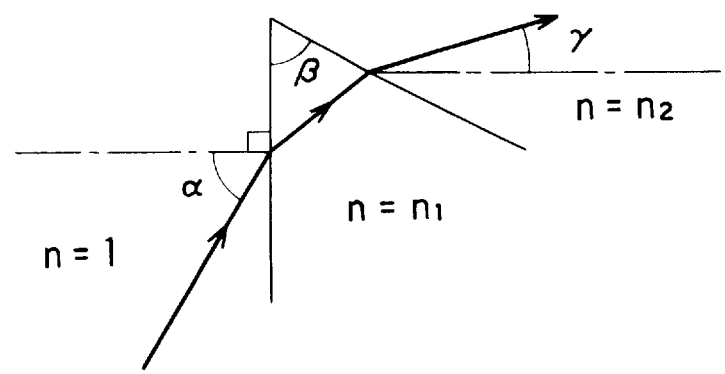
FIG. 14 is a schematic structural view for explaining a method of designing a Fresnel lens.

Specifically, each of the first, second and third light-refracting means can be constituted by a light-refracting lens or a Fresnel lens. In the case where a Fresnel lens is used, the prism angle $\beta$ of the Fresnel lens may be preferably selected as shown in the following expression when the input and output angles known by the aforementioned drawing are made $\alpha$ and $\gamma$ respectively. The respective meanings of the symbols are as shown in FIG. 14.

$$\tan\beta = \frac{\sin\alpha + n_2\sin\gamma}{\sqrt{n_1^2 - \sin^2\alpha} - n_2\cos\gamma} \quad (17)$$

in which $n_1$ is the refractive index of the Fresnel medium, and $n_2$ is the refractive index of the Fresnel output-side medium and generally $n_2=1$.

In the aforementioned expression, n is the refractive index of each medium.

Specifically, the first light-reflecting means designated by the reference numeral 117 can be realized by a concave mirror. The dotted line portion and the portion obtained by removing the auxiliary curves 114 and 116 from FIG. 12 are a main part of a first embodiment of the present invention. The first embodiment of the present invention is configured by replacing the portion of the light source 1 and the parabola mirror 2 in the prior art in FIG. 1 by this main part. Prerequisites for the main part to have are as follows. In the following description, the light deflection angle of a light-refracting means is an angle between the direction of light inputted to the light-refracting means and the direction of light outputted from the light-refracting means.

A liquid crystal display unit wherein:
(1) the unit comprises a light source means, and a liquid crystal panel means;
(2) the unit further comprises at least first, second and third light-refracting means and a first light-reflecting means which are disposed in a path from the light source means to the liquid crystal panel means;
(3) a part of light outputted from the light source means is inputted to the first light-refracting means so that the output light of the first light-refracting means is supplied toward the central region of the liquid crystal panel means via the second light-refracting means whereas a part of light outputted from the light source means is inputted to the first light-reflecting means so that the output light of the first light-reflecting means is supplied toward the peripheral region of the liquid crystal panel means via the third light-refracting means;
(4) the light deflection angle of the outside-edge portion of the third light-refracting means is formed so as to be algebraically smaller than the deflection angle of the inside-edge portion thereof; and
(5) the light deflection angle of the inside-edge portion of the third light-refracting means is formed so as to be smaller than the sum of the light deflection angles of the outside-edge portions of the first and second light-refracting means and so that the direction of the output light of the inside-edge portion of the third light-refracting means substantially coincides with the direction of the output light of the outside-edge portion of the second light-refracting means.

Figure 1:
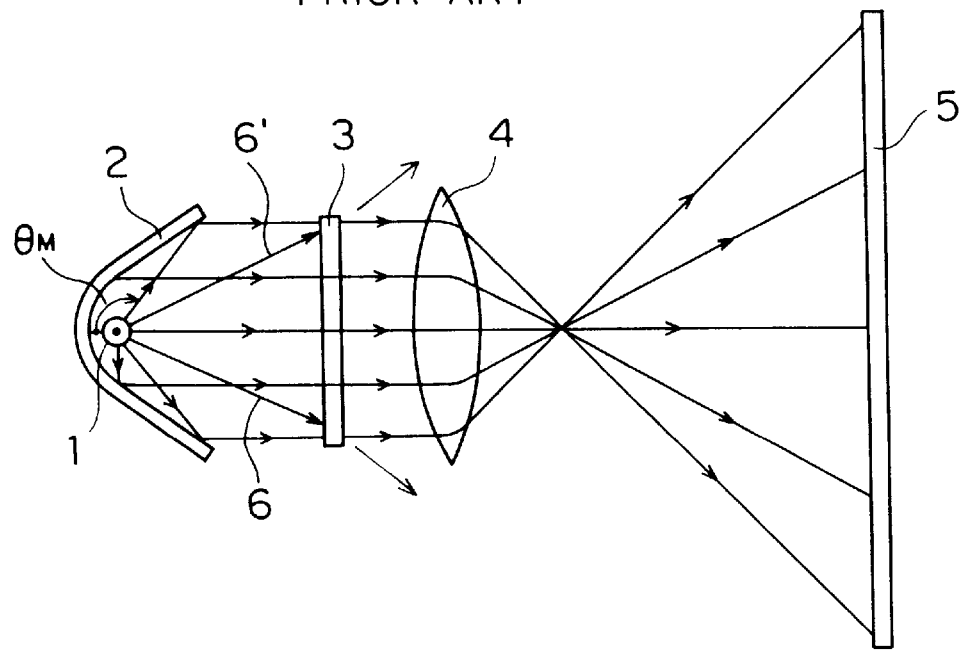
FIG. 1 is a schematic view showing a conventional liquid crystal display unit.
Figure 2:
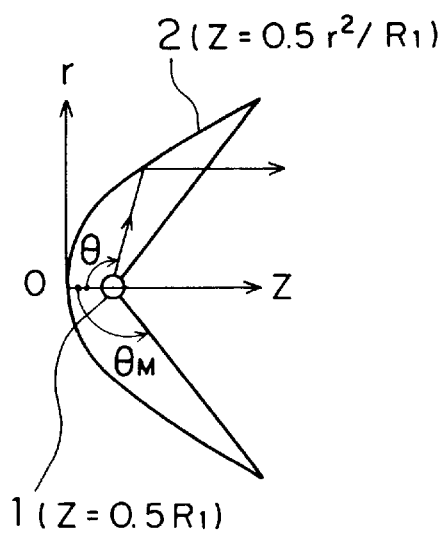
FIG. 2 is a graph for explaining the performance of the conventional liquid crystal display unit.

As is understood from the above description, the projection lens 4 and the screen 5 in FIG. 1 are not essential requisites for the first embodiment. Further, as shown in FIG. 12, the second and third light-refracting means may be united into one body.

Although the description about FIG. 11 has been made upon the case where the boundary for cutting the auxiliary curves 114 and 116 is at the zenith angle of about 60 degrees, this angle can be selected to be an arbitrary sharp angle. Although the first light-reflecting means generally has an aspherical shape, this may be replaced by a spherical mirror.

Incidentally, as described above, it is recommended that the magnitude of the meridional divergence angle of light incident to diagonal corners of the liquid crystal panel is selected to be not smaller than about 1.2 times as much as the sagittal divergence angle thereof.

Figure 13:
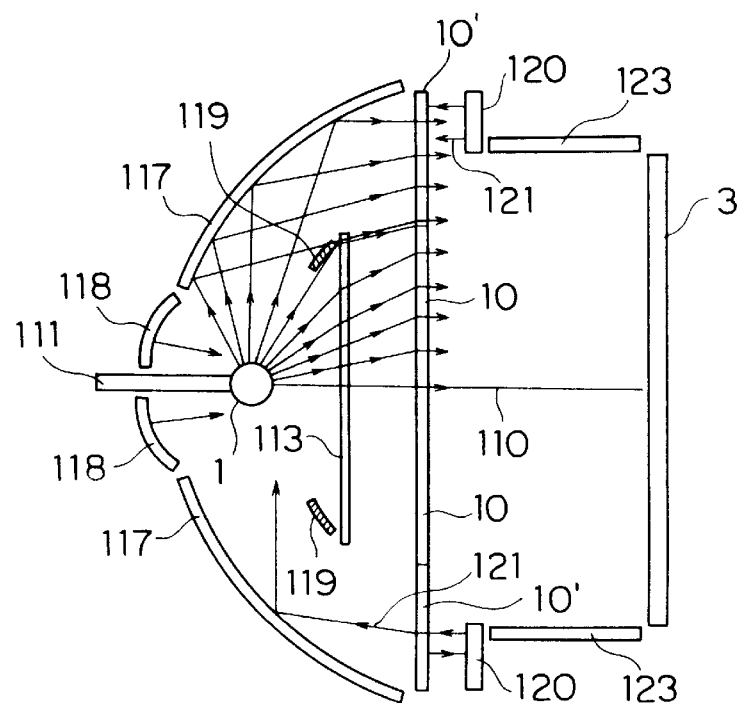
FIG. 13 is a schematic structural view for explaining a modified example of the first embodiment of the present invention.

Modifications of the first embodiment of the present invention are shown below in FIG. 13. A first modification shown in FIG. 13 is different from FIG. 12 in that a stem 111 for supporting the light source 1 is added to the light source 1.

In a second modification, a second light-reflecting means 118 is added. The second light-reflecting means reflects input light given from the light source 1 so that the output light of the second light-reflecting means returns toward the light source 1 to thereby improve the efficiency of use of light. Specifically, a metal halide lamp, a xenon lamp, a magnetron excitation lamp, or the like, may be used used as the light source 1.

In a third modification, a light shielding means 119 is added. As shown in FIG. 13, the light shielding meas 119 is disposed on the outer circumferential portion of the first light-refracting means 113 so as to be along the direction of light emitted from the light source. The purpose and effect of the light shielding means are to prevent the output light of the first light-reflecting means 117 from being inputted to the first light-refracting means by mistake. By this means, the abnormal increase of the light divergence angle can be prevented, so that the contrast ratio in a reproduced image can be improved and, accordingly, the quality of the image can be improved.

Figure 15:
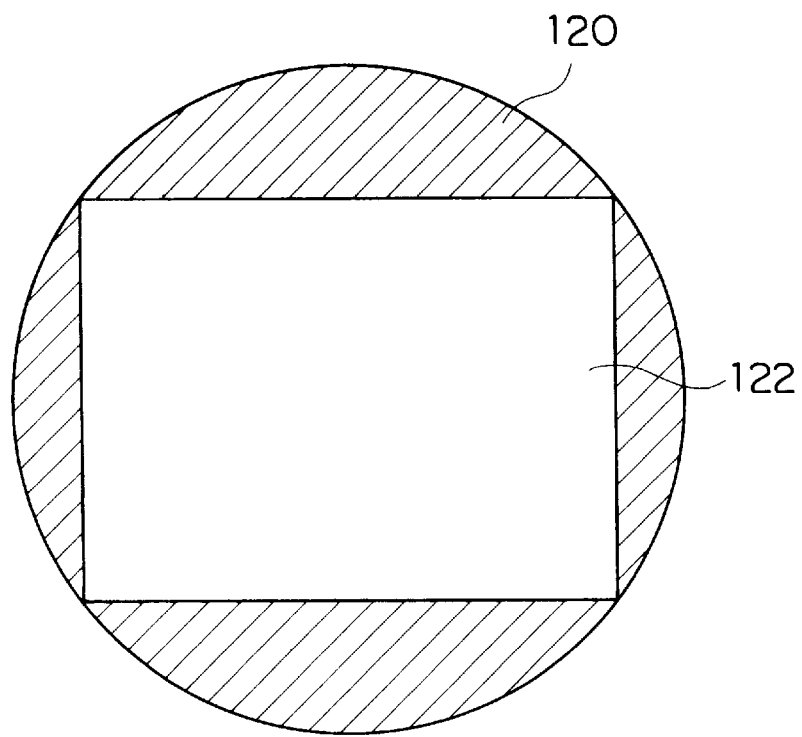
FIG. 15 is a view showing the aspect ratio of a liquid crystal panel.

In a fourth modification, a third light-reflecting means 120 is added. As shown in FIG. 13, this means is disposed in a region where the effective surface of the liquid crystal panel 3 is absent in the direction of travelling of light in the back of this means, so that this means contributes to improvement of the efficiency of use of light. The output reflected light 121 of this means is made to return toward the light source 1. FIG. 15 is a front view of the light source side from the liquid crystal panel means. In FIG. 15, the reference numeral 120 designates a third light-reflecting means, that is, a shadow portion. The reference numeral 122 designates a light-transmissible portion having its central region corresponding to the second light-refracting means and its peripheral region corresponding to the third light-refracting means. The third light-reflecting means may be disposed between the third light-refracting means and the first light-reflecting means.

In FIG. 13, sealing gaps between the means 10', 117, 118 and 111 to prevent dust from entering thereinto is recommended for use in a dusty environment. Further, it is effective to fill the sealed space with a coolant (silicone oil, etc.) having a small refractive index. In this case, it is however preferable to shape the light source 1 like a commonly-known double tube.

In the first embodiment of the present invention and modified examples thereof, the light-refracting means means a visible-light refracting means. Preferably, the light-refracting means reflects invisible light such as infrared light, ultraviolet light, or the like. Particularly, it is preferable to provide an invisible light reflection film at least on an input surface of each of the first and second light-refracting means. Further, the light-reflecting means means a visible light-reflecting means. It is preferable that the light-reflecting means transmits invisible light such as infrared light, ultraviolet light, or the like. Such a preferred characteristic can be given by the application of a known multi-layer film technique. This fact holds also in large part of the following description.

Figure 16:
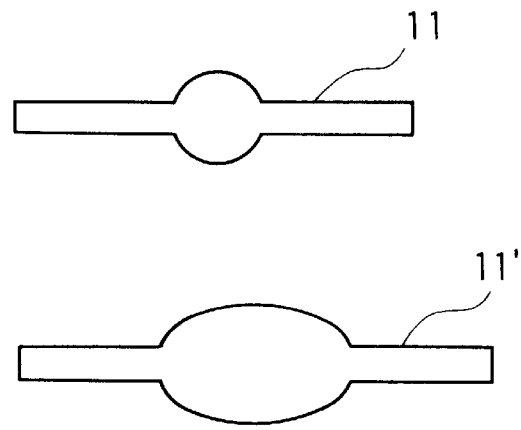
FIG. 16 is a view showing a modified example of the light source.

FIG. 16 shows a modified example of the light source means 1.

The reference numeral 11 designates a spherical light source having stems on its opposite sides; and 11', a light source having a light emitting portion which is long in the direction of the optical axis. In the case where the light source long in the direction of the optical axis is used as a substitute for the light source 1 in FIG. 13, the light source is made anisotropic with respect to the zenith angle θ and the relative corner illuminance is apt to increase. Accordingly, the present invention can be realized more easily.

Figure 17:
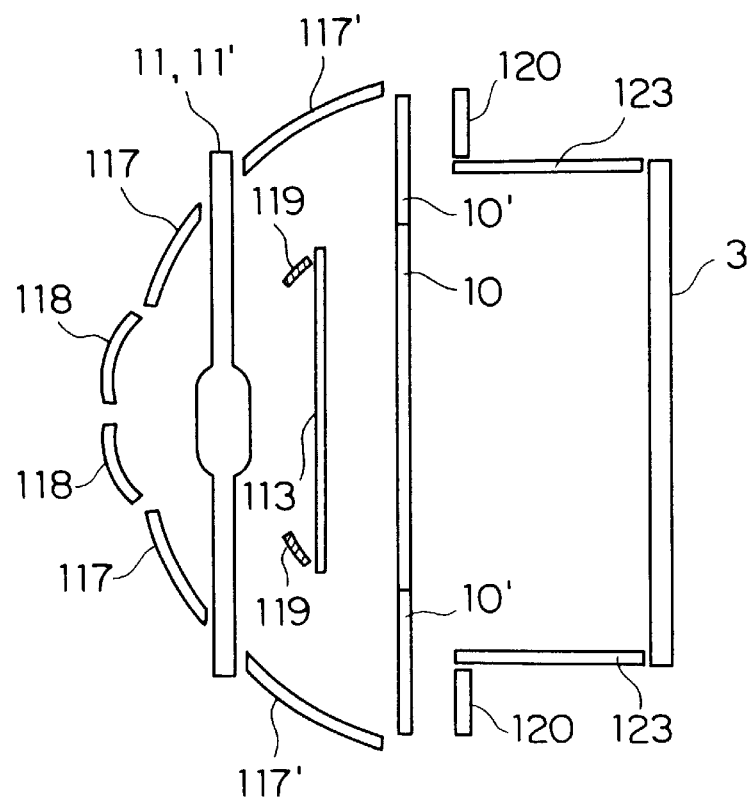
FIG. 17 is a view showing a modified example of the first embodiment.

FIG. 17 shows a modified example of the light source arrangement. In FIG. 17, respective reference numerals designate the same parts which have been already described, correspondingly. The reference numeral 123 designates a rectangular parallelepiped light guide tube. Adjustment of the direction of the light source 11 or 11' to the direction of the short side of the screen, that is, generally to the vertical direction of the screen is effective for improvement of the efficiency of use of light. In this case, the portion designated by the first light-reflecting means 117' in FIG. 17 can be removed.

Figure 18:
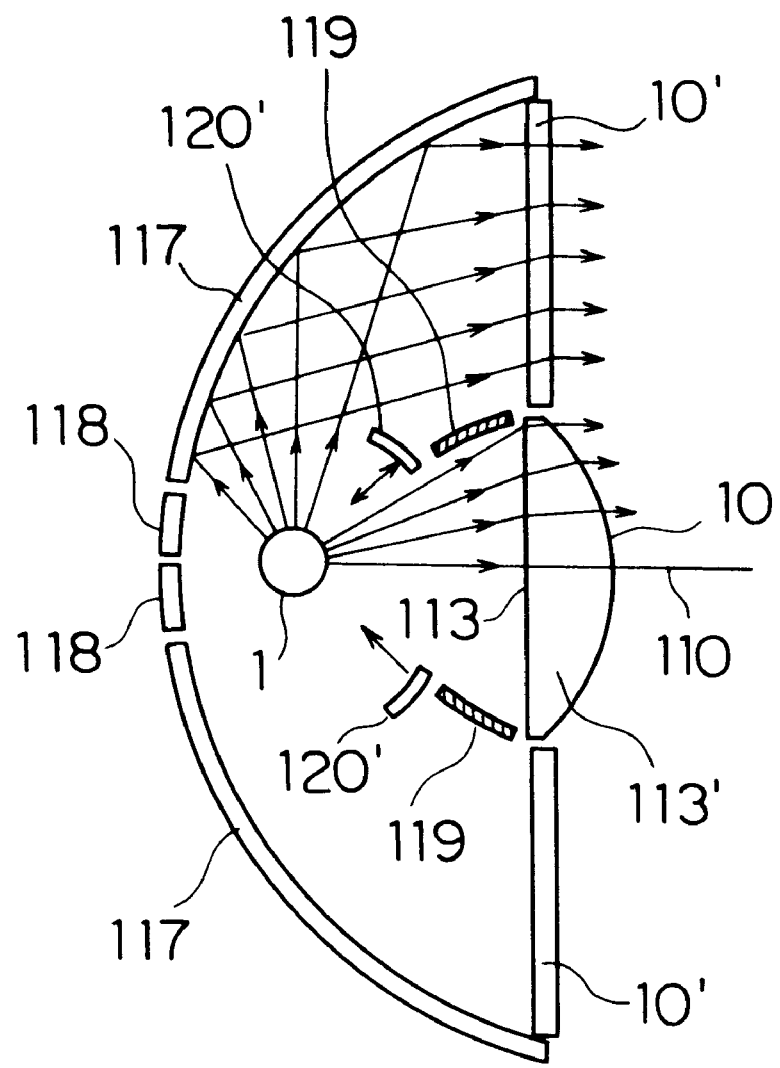
FIG. 18 is a view showing a modified example of the first embodiment of the present invention.

Further, a modified example of FIG. 13 showing a modified example of the first embodiment of the present invention is shown in FIG. 18. A first point of difference between FIGS. 18 and 13 is that the first and second light-refracting means are realized by one refracting lens designated by the reference numeral 113'. An input surface 113 of the refracting lens forms the first light-refracting means, and an output surface 10 thereof forms the second light-refracting means.

A second point of difference is that the third light-reflecting means designated by the reference numeral 120' is moved to the light input side of the first light-reflecting means. The third light-reflecting means is disposed in a region in which there is no effective light transmitted to the following liquid crystal panel means. The light-reflecting means reflects light emitted from the light source toward the light source or toward the outer circumferential portion of the light source. Accordingly, the efficiency of use of light can be improved. In FIG. 18, parts 10' and 113' may be united into one body structurally.

A further modified example is shown in FIG. 19. A point of difference between FIGS. 19 and 18 is that the peripheral region of the third light-refracting means designated by the reference numeral 10' is configured to have a negative converging power, that is, has a negative light-deflection angle.

Figure 19A:
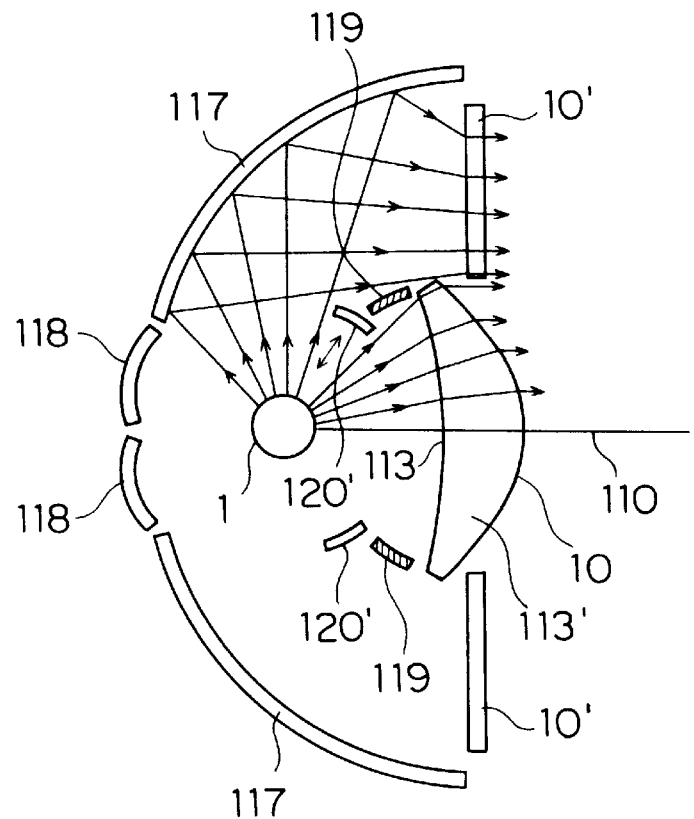
FIGS. 19A and 19B are a schematic structural view and a plan view of a light-reflecting means, showing a modified example of the first embodiment.
Figure 19B:
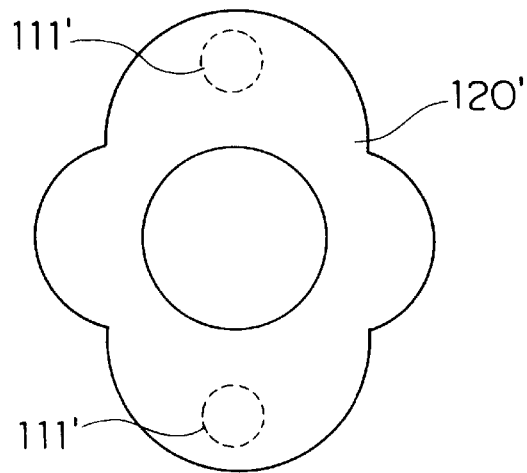

FIG. 19B is a front view showing the shape of the third light-reflecting means 120' in the structure of FIG. 19A on the basis of Mercator projection from the light source means 1. In FIG. 19B, a four-petaled-flower-shaped annular portion 120' serves as the third light-reflecting means.

The dotted line 111' in the four-petaled flower shows stem portions of the light source means 1. The stem portions are not shown in a sectional view depicted in the upper part of FIG. 19A.

Figure 20:
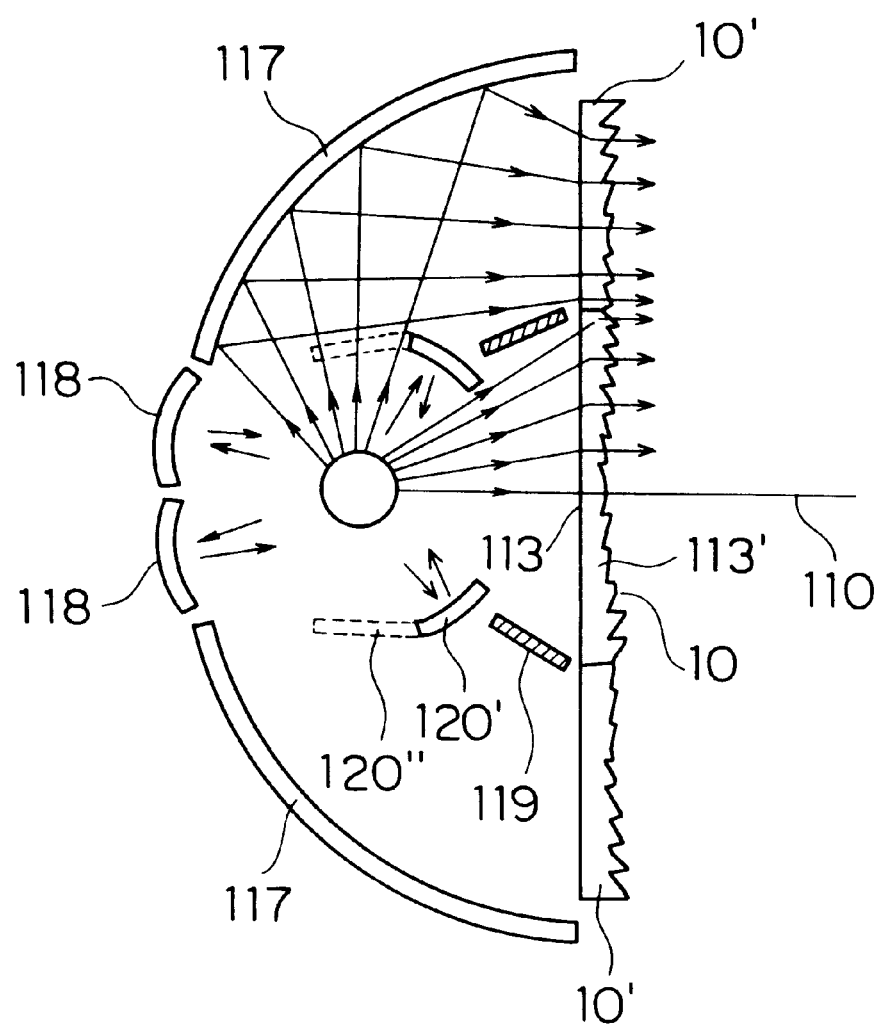
FIG. 20 is a view showing a modified example of the first embodiment.

A further modified example of the first embodiment is shown in FIG. 20. In FIG. 20, the first, second and third light-refracting means in FIG. 19A are formed by a structurally integrated Fresnel lens. All the reference numerals in FIG. 20 designate the same parts which have been already described, correspondingly. Pay attention to the fact that the sum of the light-deflecting angle of the inside-edge portion of the third light-refracting means 10' and the light-deflecting angle of the outside-edge portions of the first and second light-refracting means 113 and 10 changes discontinuously. This characteristic is one of characteristics common to the first embodiment and modified examples thereof. In FIG. 20, there is a tendency that the illuminance of the peripheral region of the second light-refracting means becomes insufficient because the distance between the first and second light-refracting means 113 and 10 is small. The percentage of reduction of the illuminance is, however, practically allowable. Alternatively, the reduction of the illuminance can be compensated by controlling the light output direction of the second light-reflecting means 118. In FIG. 20, the portion 120" shown by the dotted line by the side of the third light-refracting means 120' corresponds to the short side direction, that is, generally to the vertical direction on the reproduced image and means that the third light-reflecting means is extended in this direction. In FIG. 20, the light input side of the integrated Fresnel lens can be formed from a glass material and the light output side thereof can be formed from a synthetic resin. Further, it is recommended to form an invisible-light reflecting film on the input surface of the Fresnel lens. This is because the life of the output side synthetic resin can be elongated by doing so.

In FIG. 20, an example of actual dimensions in the case where a material having a diagonal line of 10 inches and the aspect ratio 4:3 is used as the liquid crystal panel means are as follows.

The diameter of the second light-refracting means is about 160 mm and the maximum diameter of the third light-refracting means is about 250 mm.

The aforementioned respective dimensions can be reduced/enlarged proportionally. In the aforementioned example, the length of the short side of the liquid crystal panel is about 150 mm which is smaller than the diameter of the second light-refracting means. Accordingly, a structure supporting the gravity of the third light-reflecting means 120', 120" can be provided from the direction of the short side and in the outside of the light transmission path.

The above description is made on the assumption that effective portions of the first, second and third light-refracting means and the first light-reflecting means are rotationally symmetrical with respect to the optical axis. Generally, these portions may be however rotationally asymmetrical. By doing so, the outer edge of output light flux can be made resemble not a circle but to a rectangle (122 in FIG. 15).

Figure 37:
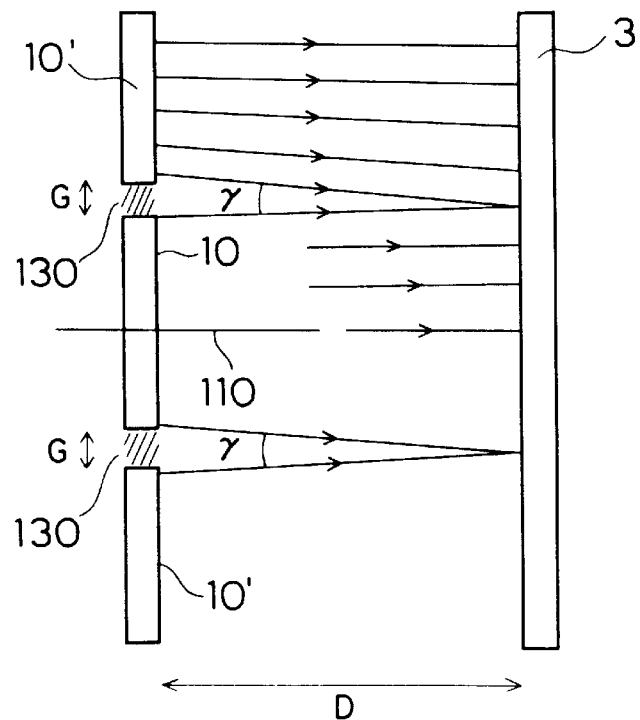
FIG. 37 is a schematic optical structural view showing means for solving the problem in the first embodiment.

Next, measures counter to the problem in the first embodiment will be supplementarily explained. In FIGS. 12, 13, 17, 18, 19 and 20 which are described above, an annular shadow portion is generated in the boundary of the second and third light-refracting means 10 and 10'. The condition for reducing the shadow portion to be in a practically allowable range on the liquid crystal panel means in FIGS. 13 and 17 is shown in FIG. 37. In FIG. 37, portions designated by the oblique lines 130 corresponds to the shadow portion. The condition for eliminating the shadows on a panel surface of the liquid crystal panel means 3 is shown in the following expression:

$$D\gamma \approx G \quad (18)$$
$$= 0.5G \sim 1.5G$$

in which D is the distance between the second/third light-refracting means and the liquid crystal panel means, $\gamma$ is an angle [rad] at which the main output direction of the peripheral region of the second light-refracting means and the main output direction of the central region of the third light-refracting means intersect each other, and G is the width of each shadow. As shown in the aforementioned expression, the aforementioned shadow disturbance can be made inconspicuous practically by selecting the value of $D\gamma$ to be in a range of from 0.5G to 1.5G.

The description about the first embodiment of the present invention has been finished. The aforementioned first embodiment is basically categorized in an optical system which is rotationally symmetrical (which means rotationally symmetrical except the peripheral region of output light) with the optical axis. The expression (9) which has been found out by the present inventor is effective also for constructing a rotationally asymmetrical collimator optical system. Such a modified example will be described later in FIG. 54 et seq.

Next, an improvement in the neighborhood of the input surface of the liquid crystal panel 3 which may be effectively used in the present invention will be described.

Figure 21:
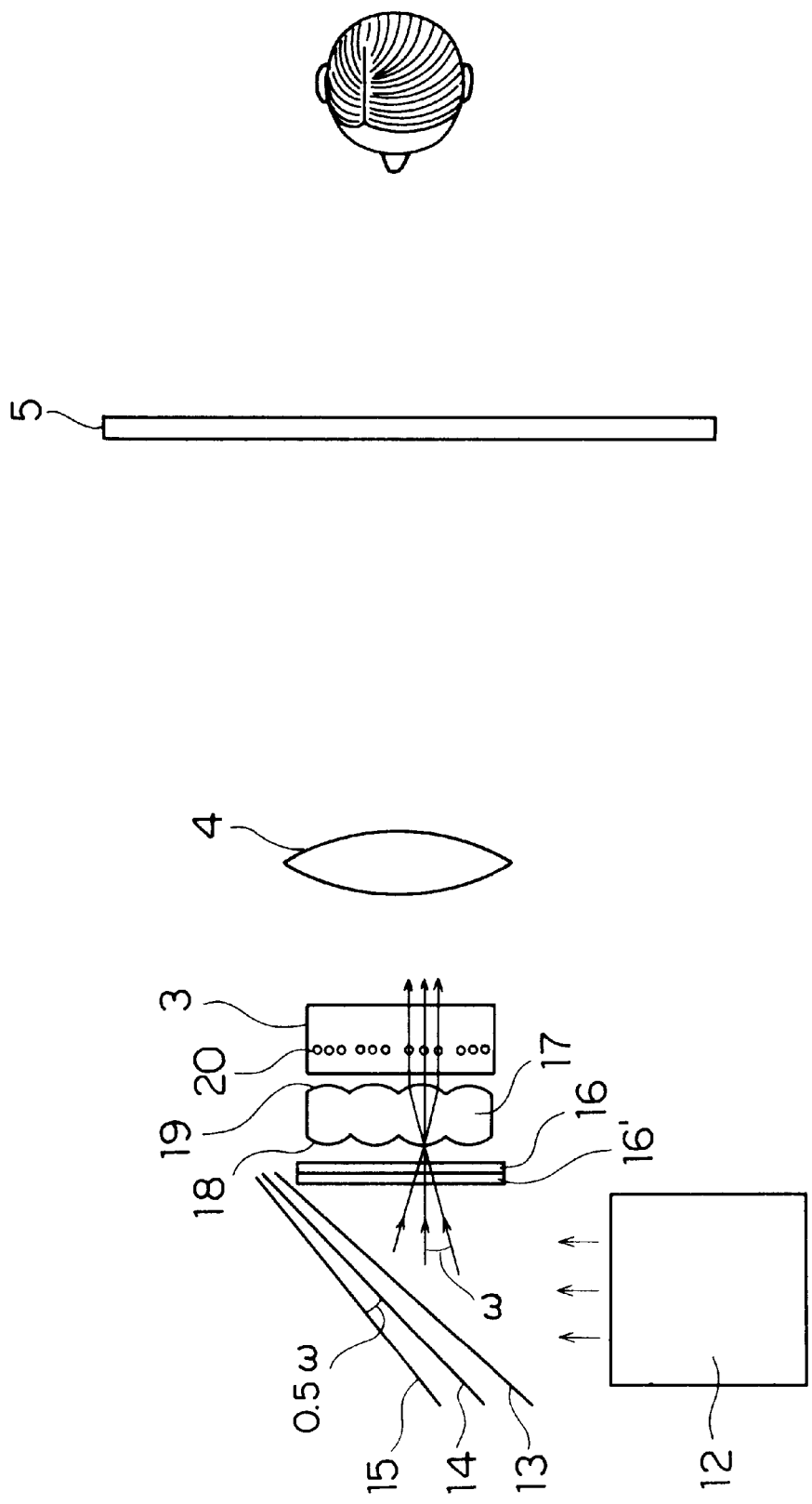
FIG. 21 is a schematic structural view for explaining a second embodiment of the present invention.
Figure 22:
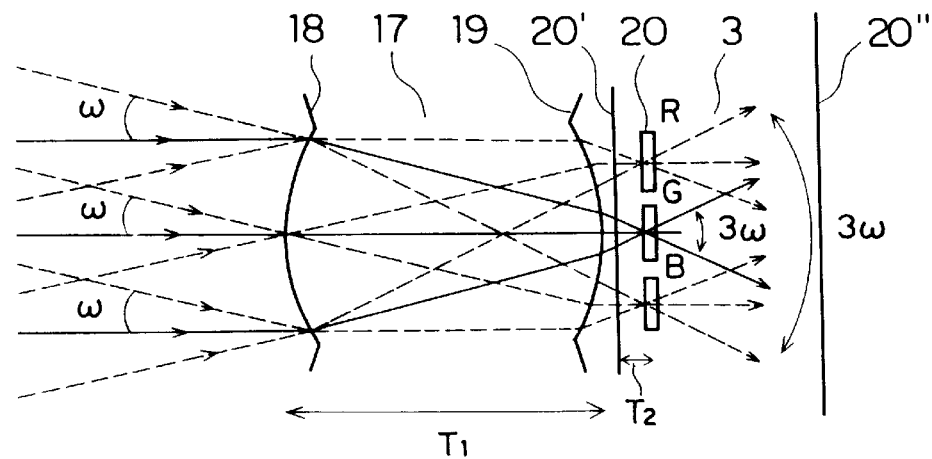
FIG. 22 is an enlarged structural view of a main part of FIG. 21.
Figure 23:
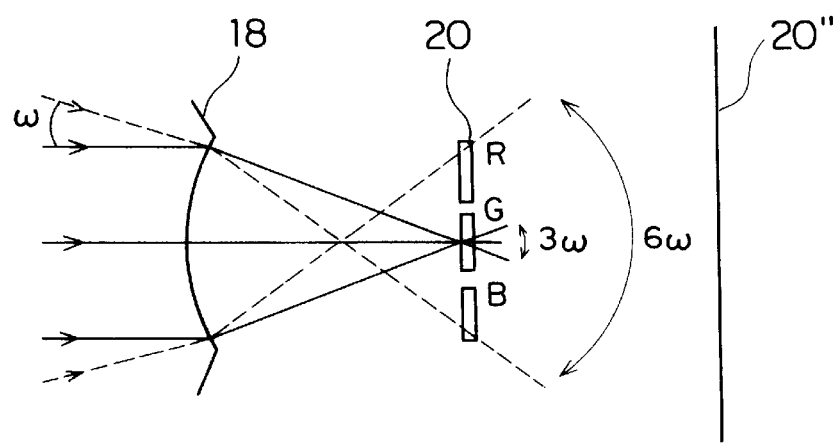
FIG. 23 is a view showing a schematic optical structure in the prior art.

A second embodiment of the present invention is shown in FIG. 21. FIG. 21 is a horizontal sectional view. In FIG. 21, the reference numerals 3, 4 and 5 designate the same parts which have been already described, correspondingly. The reference numeral 12 designates a block obtained by collecting the light source means and the light-ray-direction transforming means. The first embodiment of the present invention can be applied to the block 12 but there is no necessity of limitation thereto. The reference numerals 13, 14 and 15 designate a three-direction means which converts three primary colors into three different directions. Specifically, dichroic mirrors for reflecting respective primary colors of RGB are used as the three-direction means. The dichroic mirrors may be replaced by diffraction-grating filter means described in JP-A-5-257114 filed by the present inventor. When the angle between adjacent mirrors is 0.5ω as shown in FIG. 21, the angle between adjacent output light rays of three primary colors becomes ω. The value of ω is selected to be in a range of from about one to two times the divergence angle $\epsilon(0)$. The reference numerals 16 and 16' designate polarization-direction matching means for making the light divergence direction of the three-direction means (13, 14 and 15) coincident with the wide-directivity direction of the liquid crystal panel means 3. Specifically, the reference numeral 16 designates a polarization plate which allows only light having a polarization plane in a 45° oblique direction to pass through. The term "45° oblique direction" means the direction of arrangement of the major axes of molecules in the input side of the liquid crystal layer of the nematic liquid crystal panel means 3. The reference numeral 16' designates a half-wavelength plate for rotating the polarization plane by 45°. As known well, the polarization plane can be rotated by 45° by using the half-wavelength plate while the optical axis (light-anomaly axis) of the half-wavelength plate is inclined by 22.5°. Incidentally, an output side polarization sheet is generally stuck to the output surface of the liquid crystal panel 3 so as to be formed integrally. The output side polarization sheet is however not shown in FIG. 21. The reference numeral 17 designates a double-side lenticular lens which includes a three-position means which converts three primary colors into three different directions (first lenticular lens means) 18 in its input side, and a light-diverging-angle reducing means (second lenticular lens means) 19 in its output side. The reference numeral 20 designates pixels in the liquid crystal panel means 3. The operations of the parts 17, 18 and 19 will be described with reference to FIGS. 22 and 23. FIGS. 22 and 23 are enlarged views respectively showing one period. In FIG. 22, the reference numerals 3, 17, 18, 19 and 20 designate the same parts which have been already described, correspondingly. The reference numerals 20' and 20" designate input and output surfaces, respectively, of the liquid crystal panel means 3. Though not shown, a polarization plate is generally stuck to the output surface 20" of the liquid crystal panel so as to be formed integrally. In FIG. 22, the arrow-headed solid line represents a G color light path, and the arrow-headed dotted lines represent R and B light paths respectively. In a typical applied example of the present invention, the focal length $f_1$ of the light-diverging-angle reducing means 19 is selected to be nearly equal to the distance ($T_1$ in FIG. 22) between the three-position means 18 and the light-diverging-angle reducing means 19. The distance $T_2$ between the input surface 20' of the liquid crystal panel means 3 and the pixel surface 20 is selected to be smaller than $T_1$, actually smaller than ⅔ of $T_1$. By such selection, the angle of divergence of output light (light passing through the pixel surface of the liquid crystal panel) becomes about 3ω as shown in FIG. 22. In practical application, one important object (improvement of the contrast ratio by reduction of the divergence angle) of the present invention can be achieved by selecting the value of $T_1$ to be a range of from 60% to 120% of the value of $f_1$ as shown in the expression (19') instead of the expression (19). This is because the increase of the divergence angle of the R/B light compared with the G light can be reduced by 60% or more by doing so. Incidentally, the focal length $f_0$ of the three-position means 18 is selected to satisfy the expression (19").

$$f_1 \approx T_1 \quad (19)$$

$$T_1 = (0.6 \sim 1.2)f_1 \quad (19')$$

$$f_0 = (1.6 \sim 1.0)T_1 \quad (19")$$

$$T_2 = < \frac{2}{3} T_1 \qquad (20)$$

Accordingly, the essential prerequisite for this embodiment of the present invention is to satisfy the expressions (19'), (19") and (20).

To facilitate the understanding of the effect of the light-divergence-angle reducing means 19, the case where the means 19 is removed is shown in FIG. 23. In FIG. 23, the directions of RGB of light passing through the pixel surface of the liquid crystal panel lack consistency and the divergence angle thereof is about 6ω which is a large value. The divergence angle (3ω)) in the present invention is improved to about ½ times compared with the divergence angle (6ω) in the prior art. The contrast ratio of the reproduced image is substantially inversely proportional to the square of the divergence angle of light passing through the pixel surface of the liquid crystal panel. Hence, according to the present invention, the contrast ratio can be improved to about 4 times. Further, because the direction of divergence of light is made coincident with the wide-directivity direction of the liquid crystal panel means, the effect of improving the contrast ratio becomes large.

The basic description of the second embodiment of the present invention has been finished. Although only four periods in the lenticular lens are shown in FIG. 21 in order to facilitate the understanding of the drawing, hundreds of periods or more are formed in one panel in a practical case. This rule applies also to the drawings which will be explained hereafter. In FIG. 21, the half-wavelength plate 16' may be omitted in accordance with the use. In this occasion, color purity or contrast ratio is more or less degraded. In this embodiment, it is not always necessary to use a dichromic mirror as the three-direction means which converts three primary colors into three different directions, and light diffracting grating or a color separation prism may be used.

Figure 24A:
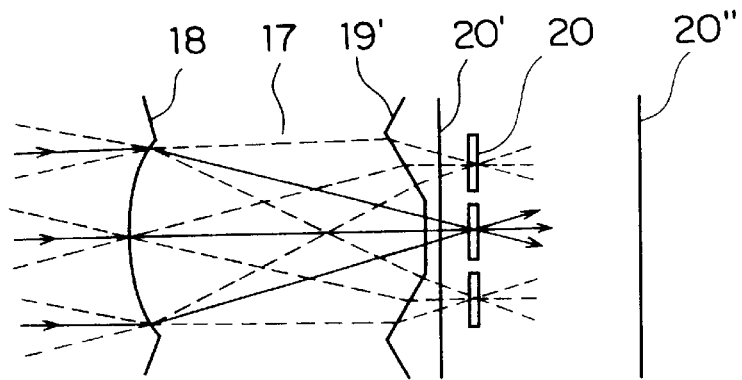
FIGS. 24A, 24B and 24C are views showing modified examples of the second embodiment.
Figure 24B:
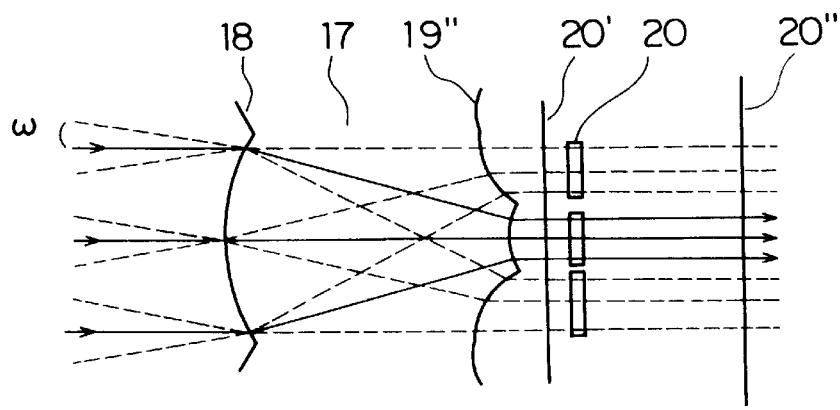
Figure 24C:
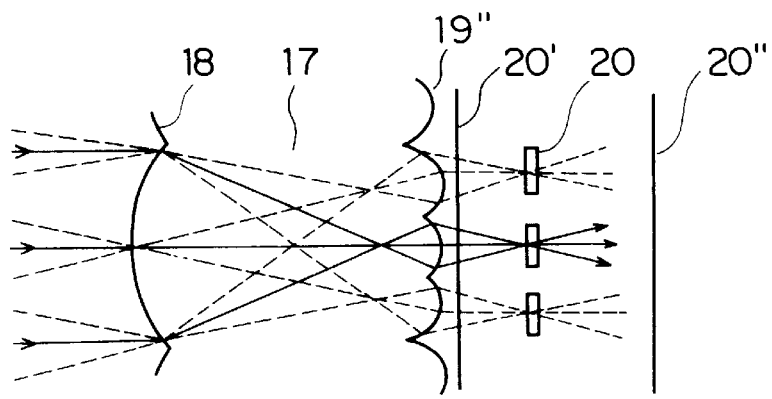

Modified examples of the light-divergence-angle reducing means 19 are shown in FIGS. 24A, 24B and 24C respectively. FIG. 24A shows the case of a trapezoid lenticular lens. FIG. 24B shows the case where each side of the trapezoid in FIG. 24A is shaped like a concave lens. FIG. 24C shows the case where each side of the trapezoid in FIG. 24A is shaped like a convex lens. That is, as shown in the drawings, not only R and B light rays are prevented from diverging laterally but also the divergence of R, G and B light rays is reduced. FIGS. 24A to 24C are effective in the case where the aforementioned divergence angle ε(0) of input light is sufficiently smaller than ω. FIGS. 24A to 24C are however ineffective in the case where ε(0) is nearly equal to ω. The description of FIGS. 24A, 24B and 24C has been finished.

Figure 25A:
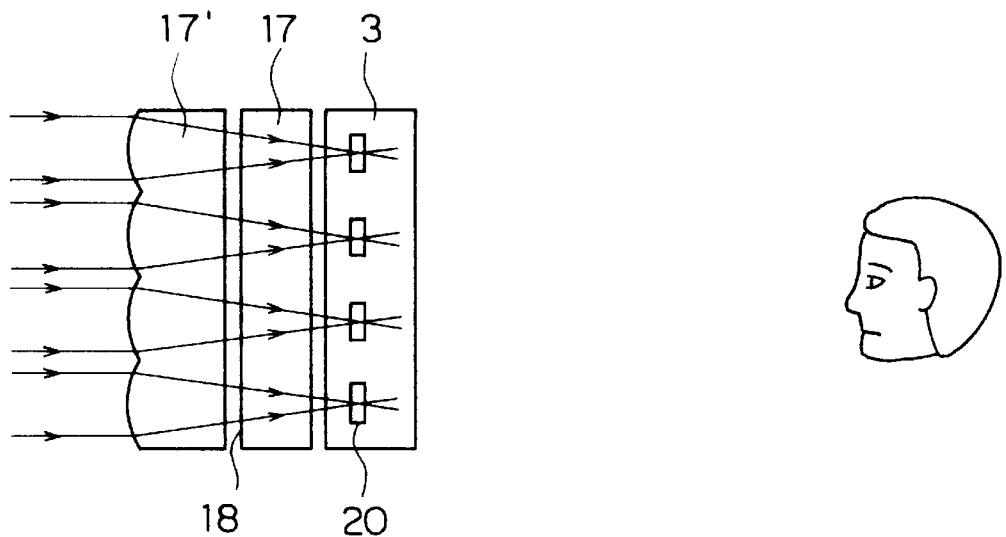
FIGS. 25A and 25B are views showing a modified example of the second embodiment.
Figure 25B:
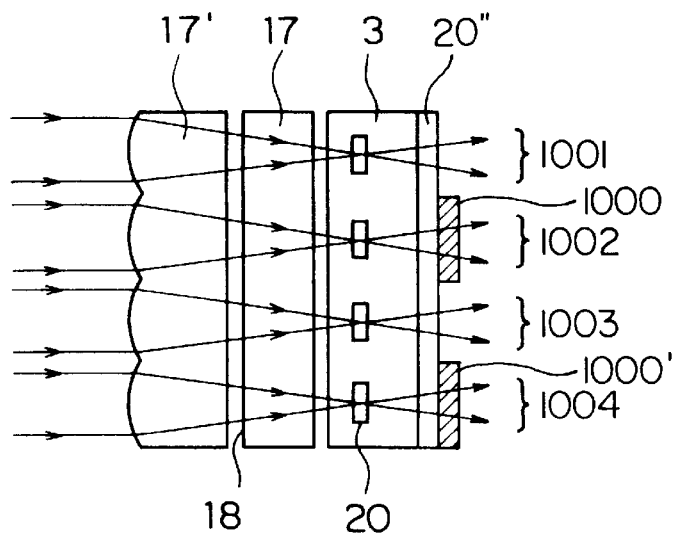

Further modified examples are shown in FIGS. 25A and 25B. FIGS. 21, 22, 23 and FIGS. 24A to 24C are horizontal sectional views whereas FIGS. 25A and 25B are vertical sectional views. FIG. 25A shows a structure in which a lenticular lens means 17' for absorbing light in the vertical direction (narrow-directivity direction of the liquid crystal panel) to improve the efficiency of use of light is provided in addition to the structure of FIG. 22. The prerequisite for this structure is that the focal length of the lens means 17' is selected to be larger than the focal length of the lens means 18. Thus, the degradation of the contrast ratio can be suppressed to the minimum so that the efficiency of use of light can be improved.

FIG. 25B shows a modified example in which the present invention is applied to a polarization spectacles type stereoscopic display unit. In FIG. 25B, the reference numeral 20" designates an output side polarization plate which has been described; 1000 and 1000', half-wavelength plates arranged in the form of horizontal stripes for rotating the polarization plane by 90°. As known well, the polarization plane can be rotated by 90° by using each half-wavelength plate while the light-anomaly axis of the half-wavelength plate is inclined by 45°. The reference numerals 1001, 1002, 1003 and 1004 designate output light rays corresponding to first, second, third and fourth scanning lines respectively. As is understood from FIG. 25B, the polarization plane of only even-numbered output light is rotated by 90°. Left-eye signals are applied to pixels corresponding to odd-numbered scanning lines whereas right-eye signals are applied to pixels corresponding to even-numbered scanning lines. In the polarization spectacles put on a spectator, a polarization plate allowing only light corresponding to the polarization plate 20" to pass through is provided for the left eye and a polarization plate allowing only the light which has passed through the half-wavelength plates 1000, 1000", . . . to pass through is provided for the right eye. Accordingly, a stereoscopic image can be seen. As a practical method for forming the horizontally striped half-wavelength plates 1000, 1000", . . . , there can be used a light-distribution film type molecular arrangement orienting method which is well-known in a liquid crystal panel producing technique. As an effect peculiar to this structure, output light for the left eye and output light for the right eye can be separated from each other without crosstalk by combination of the lenticular lens means 17' and the striped half-wavelength plates 1000, 1000', . . . and, accordingly, a high-quality stereoscopic image can be provided.

Figure 26A:
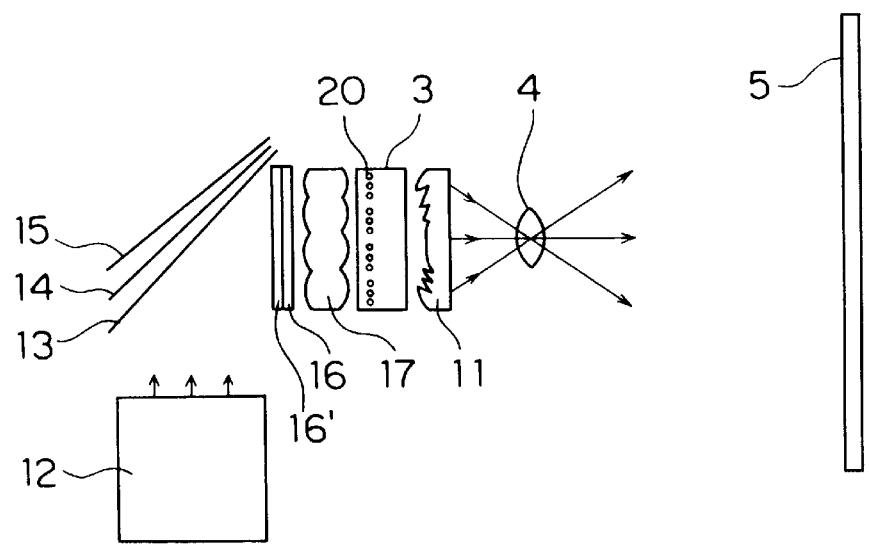
FIGS. 26A and 26B are a schematic optical structural view showing a further embodiment of the present invention and an optical structural view of a main part thereof.

A third embodiment of the present invention is shown in FIG. 26A. This embodiment is characterized in that a field lens means 11 is disposed in the output side of the liquid crystal panel means 3. Because output light can be deflected toward the input pupil of the projection lens means 4 by the field lens means 11, there arises an advantage that the size of the aperture of the projection lens means 4 can be reduced.

Figure 26B:
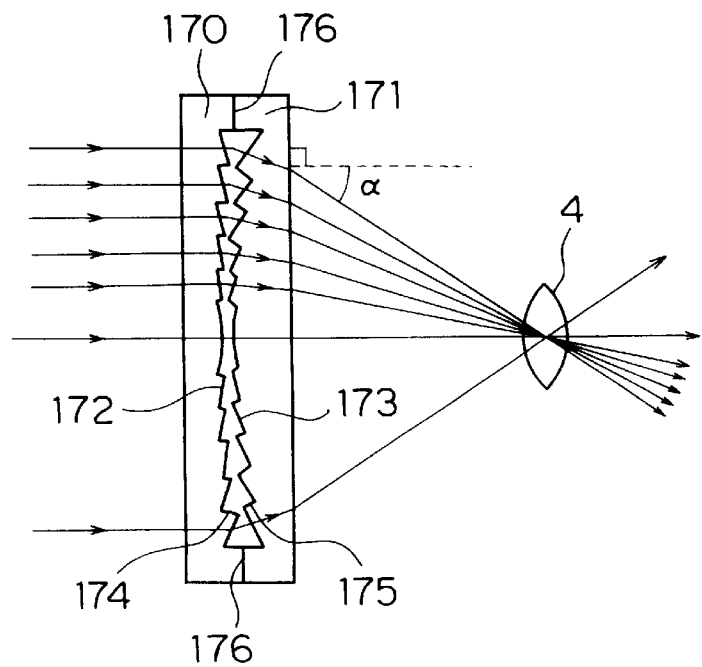

Although the projection lens means 4 is merely expressed as one lens element for the purpose of simplification of the drawings in FIGS. 26A, 26B and so on, the projection lens means 4 is practically constituted by a plurality of lens elements. Although the shape of a stop for the projection lens means 4 is not shown, it is recommended that the stop is shaped like an ellipse or an oval having its major axis in the wide-directivity direction of the liquid crystal panel means 3. This is because this measure can prevent unnecessary abnormal light from passing through and, accordingly, the contrast ratio (image quality) of the reproduced image can be improved.

A modified example of the field lens means 11 is shown in FIG. 26B. In FIG. 26B, the reference numeral 170 designates a first Fresnel sheet; 171, a second Fresnel sheet; 172, a Fresnel lens surface formed in the output side of the first Fresnel sheet; 173, a Fresnel lens surface formed in the input side of the second Fresnel sheet; 174, discontinuous portions of the first Fresnel sheet; 175, discontinuous portions of the second Fresnel sheet; and 176, an adhesive portion for sticking the first and second Fresnel sheets to each other in the peripheral region. According to this structure, the angle α of view can be enlarged to about 30° or larger and, accordingly, a compact optical system short in projection distance can be constructed.

Figure 27:
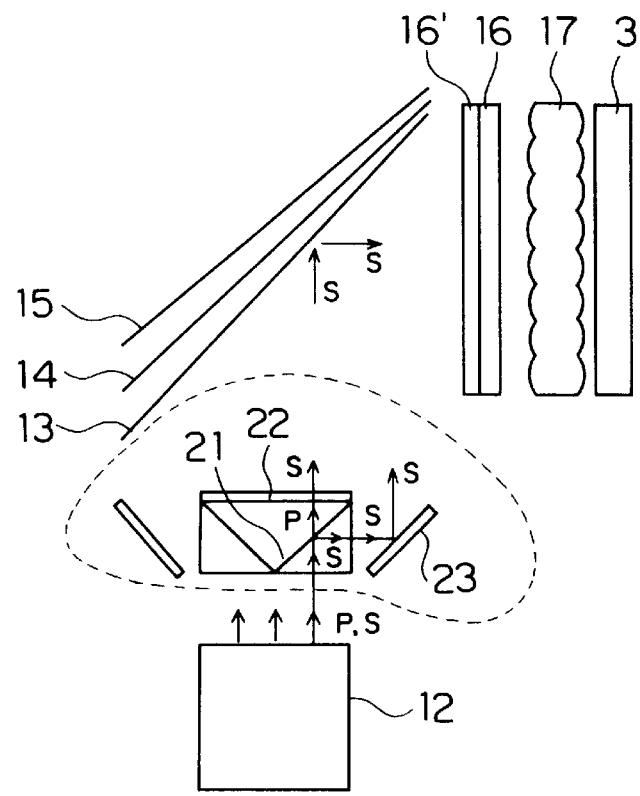
FIG. 27 is a schematic optical structural view showing a further embodiment of the present invention.

A fourth embodiment of the present invention for improvement of the efficiency of use of light is shown in FIG. 27. In FIG. 27, the portion surrounded by the dotted line is an light-utilizing efficiency improving means which is a main part of this embodiment. The light-utilizing efficiency improving means is formed for using both P wave and S wave. Because the portion surrounded by the dotted line is laterally symmetrical, the right half thereof will be explained below. The reference numeral 21 designates a polarizing beam splitter which allows P wave to pass through and reflects S wave. The reference numeral 22 designates a half-wavelength plate for rotating the plane of polarization by 90° to thereby convert P wave into S wave. The reference numeral 23 designates a reflecting mirror. Although FIG. 27 shows the type of use of S wave, the present invention may be applied to the type of use of P wave as a substitute.

Further, a dichroic mirror for reflecting part of unnecessary spectra in order to improve color purity may be disposed between the three-direction means 13, 14 and 15 and the unit surrounded by the dotted line in FIG. 27.

Figure 28:
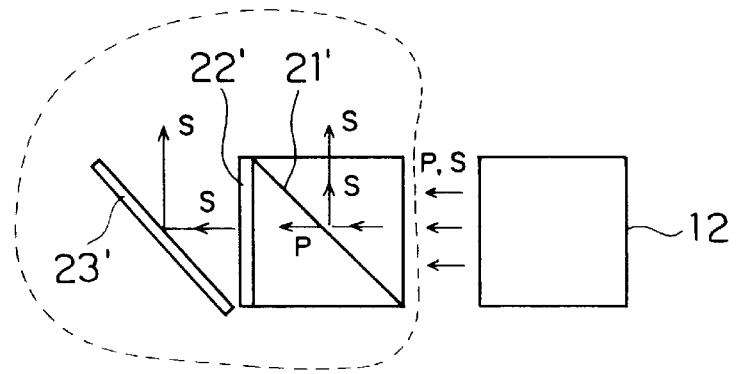
FIG. 28 is a schematic optical structural view showing a modified example of FIG. 27.

A partly modified example of FIG. 27 is shown in FIG. 28. The reference numeral 21' designates a polarizing beam splitter; 22', a half-wavelength plate for rotating the plane of polarization by 90°; and 23', a reflecting mirror.

In each of FIGS. 27 and 28, the efficiency of use of light can be improved to about twice. In each of FIGS. 27 and 28, a triangular pole-shaped space between the polarizing beam splitter and the reflecting mirror 23 (23') may be filled with a liquid or gel material so as to be united with the polarizing beam splitter 21 (21'). The explanation of FIGS. 27 and 28 has been finished.

Figure 29:
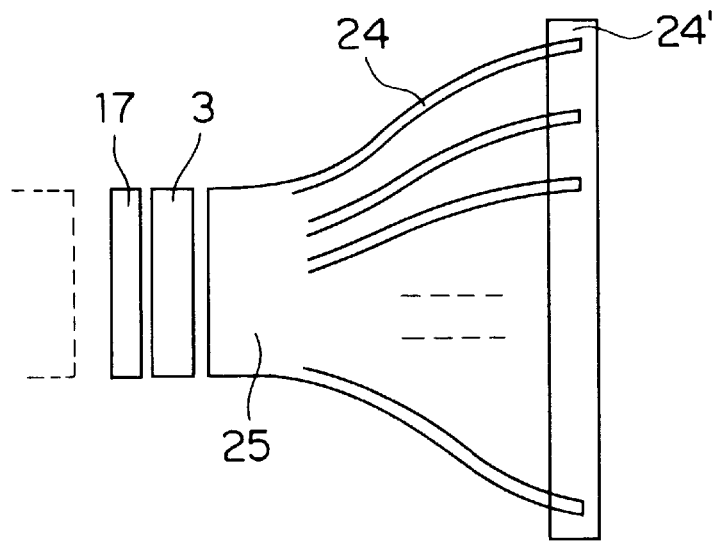
FIG. 29 is a view showing an example of application of the present invention to a fiber type liquid crystal display unit.

FIG. 29 shows an example in which the present invention is applied to an optical fiber type liquid crystal display unit. Portions such as a light-ray-direction transforming means, and so on, are omitted in FIG. 29. In FIG. 29, the reference numerals 17 and 3 designate the same parts which have been already described, correspondingly. The reference numeral 24 designates an optical fiber group; 25, an optical fiber input end; and 24', an optical fiber output end, that is, an image display portion.

In FIG. 29, it is recommended that the fiber light-receiving end 25 and the output surface of the liquid crystal panel means 3 are connected to each other by liquid or silicone gel without any air layer. By this measure, a loss of reflection in the boundary can be reduced and the contrast ratio of the reproduced image can be improved.

Figure 30:
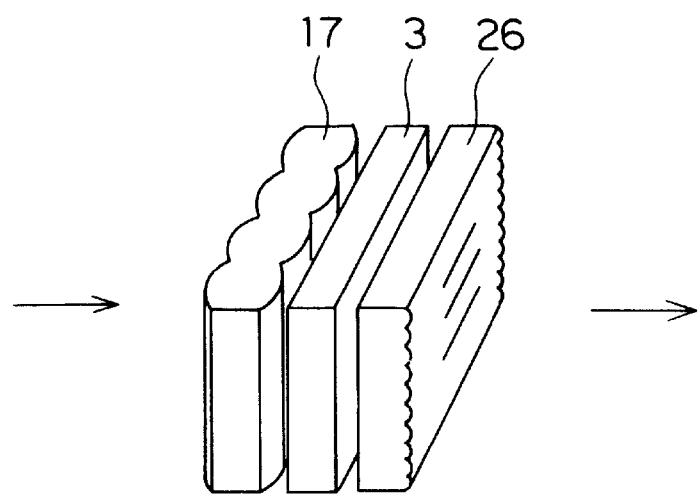
FIG. 30 is a perspective view showing an example of application of the present invention to a direct-view type liquid crystal display unit.

FIG. 30 shows an example in which the present invention is applied to a direct vision type liquid crystal display unit. In FIG. 30, the reference numeral 26 designates a lenticular lens means for diverging light vertically.

Figure 31:
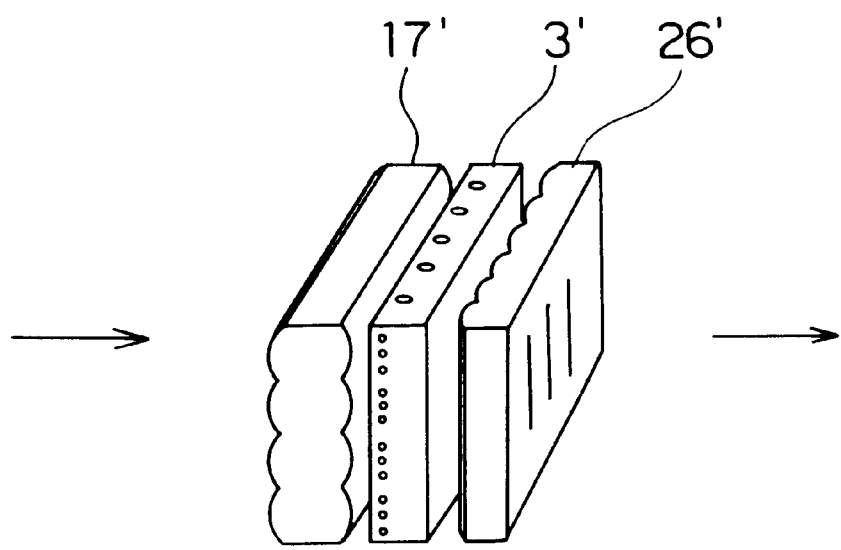
FIG. 31 is a view showing a modified example of FIG. 30.

FIG. 31 shows a direct vision type liquid crystal display unit of the type obtained by rotating FIG. 30 by 90°. The wide-directivity direction of the liquid crystal panel means 3, 3' is horizontal in FIG. 30 and vertical in FIG. 31.

Figure 32:
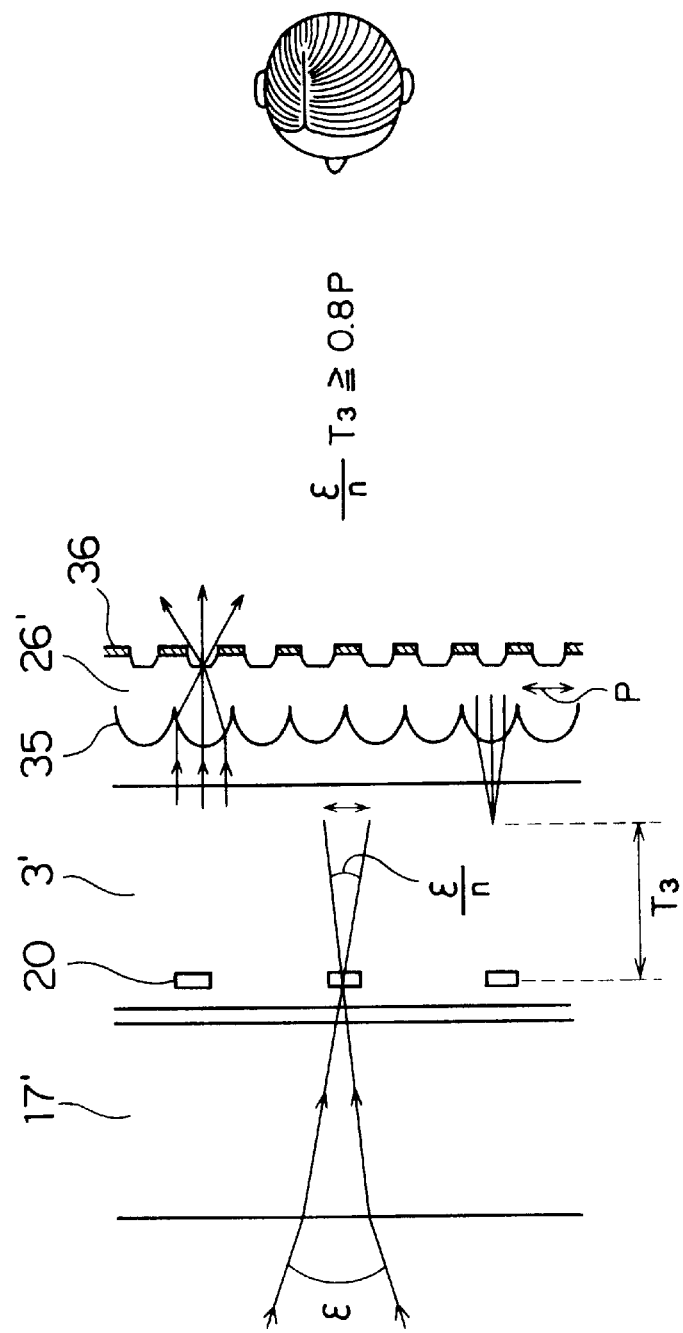
FIG. 32 is a view showing a modified example of FIG. 31.

FIG. 32 is an enlarged view of a horizontal section of the embodiment depicted in FIG. 31. In FIG. 32, the reference numeral 26' designates a lenticular lens means for diverging light horizontally; 35, lenticular lenses; and 36, black stripes (black-printed portions). In this configuration, it is necessary to satisfy a conditional expression described in FIG. 32 in order to prevent the occurrence of moiré disturbance caused by interference between the structure of pixel 20 and the structure of lenticular lenses 35 in the liquid crystal panel means 3'. That is, it is necessary that the quotient obtained by dividing the product of the distance $T_3$ between the pixel surface and the focal plane of the lenticular lenses and the divergence angle $\epsilon$ of input light by the refractive index n of the medium is larger than 0.75 times as much as the arrangement pitch P of the lenticular lenses. In the case where the quotient is equal to the pitch, moiré disturbance is reduced extremely. This rule is also applied to moiré disturbance in FIG. 30.

The configuration of FIG. 31 has an advantage that the degradation of the contrast ratio of the image display surface of the liquid crystal display unit caused by ambient external light 12 can be lightened compared with the configuration of FIG. 30. The explanation of FIGS. 30 and 31 has been finished.

The explanation of the third and fourth embodiments of the present invention and application thereof has been finished.

In combination of the present invention and a transmission screen to form a projection type liquid crystal display unit, there will be described means for lightening moiré disturbance caused by interference between the vertical stripe structure of the screen and the vertical stripe structure of the liquid crystal panel.

Figure 33:
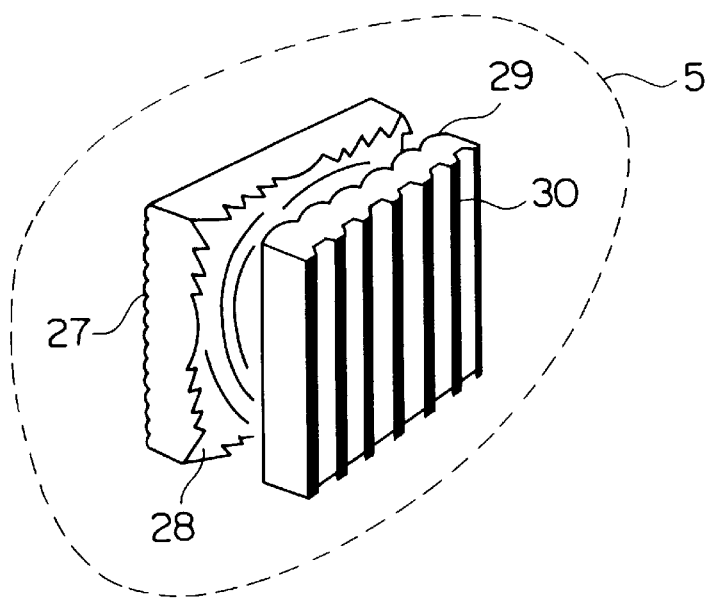
FIG. 33 is a perspective view showing an example of the transmissive screen.

FIG. 33 shows a configuration example of the transmission screen.

In FIG. 33, the reference numeral 27 designates lenticular lenses arranged at intervals of a pitch of about 0.1 mm or less for converging or diverging light vertically; 28, a surface of Fresnel lenses arranged at intervals of a pitch of about 0.1 mm; 29, lenticular lenses arranged at intervals of a pitch of about 0.5 mm for converging or diverging light horizontally; 30, a black-striped surface. The structure of the lenticular lenses 29 interferes with the vertical striped pixel structure of the liquid crystal panel to cause moiré disturbance.

Figure 34:
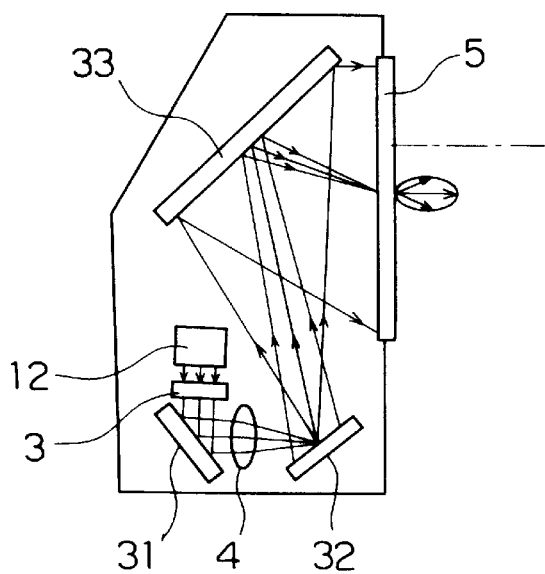
FIG. 34 is a schematic optical structural view of the transmissive display unit to which the present invention is applied.

FIG. 34 is a side view of a projection type liquid crystal display unit put in a cabinet. In FIG. 34, the reference numerals 12, 3, 4 and 5 designate the same parts which have been already described, correspondingly. The reference numerals 31, 32 and 33 designate light-reflecting means.

In order to eliminate the aforementioned moiré disturbance, it is necessary in the prior art to mix a large amount of diverging material in screen constituent members. There arises therefore a problem that projected light is absorbed by the diverging material to bring about lowering of the efficiency of use of light. Further, the degradation of focusing and contrast ratio is caused by the mixing of such a large amount of diverging material and, accordingly, the degradation of image quality is brought about.

In a projection type liquid crystal display unit according to a fifth embodiment of the present invention, moiré disturbance is reduced by shaping the light-reflecting means 32 of FIG. 34 like a longitudinal or transverse cylinder. Accordingly, use of such a large amount of diverging material can be avoided and, accordingly, image quality can be improved.

Figure 35:
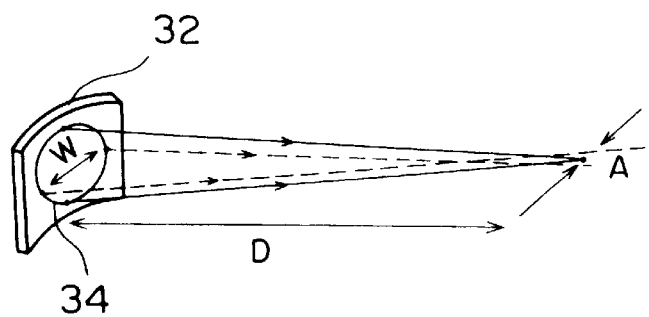
FIG. 35 is a perspective view for explaining the principle of FIG. 34.

The principle of reduction in moiré disturbance is shown in FIG. 35.

In FIG. 35, the reference numeral 32 designates a cylindrical light-reflecting means; and 34, a section of a bundle of light rays. The solid-line arrows represent upper and lower end light rays of the bundle of light rays, and the dot-line arrows represent left and right end light rays.

Figure 36:
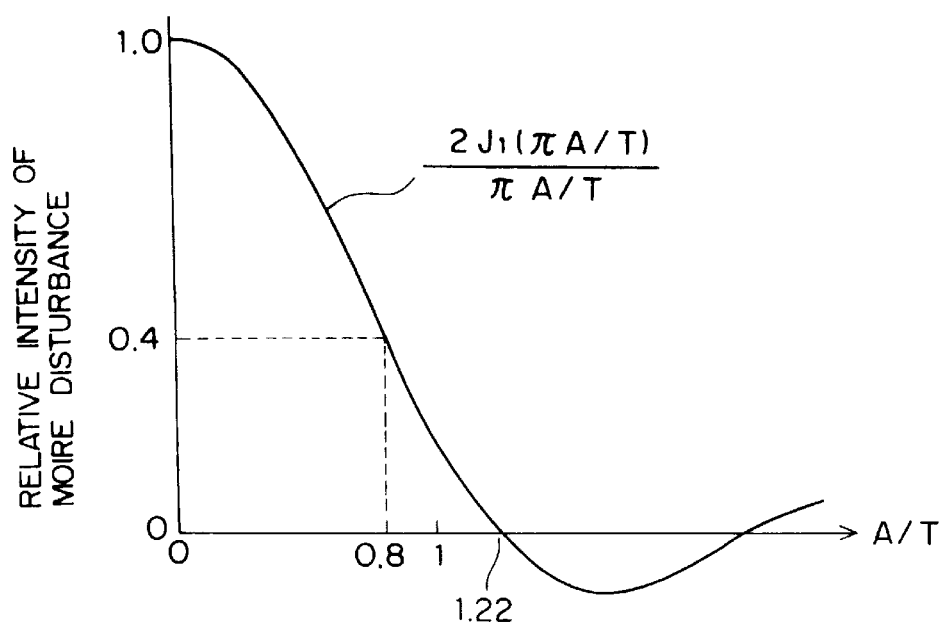
FIG. 36 is a graph for explaining the principle of FIG. 34.

If the screen is disposed in a position in which the upper and lower end light rays are converged, vertical resolution is not deteriorated in the reproduced image on the screen. On the other hand, horizontal spot size has the width of A as shown in FIG. 35. The aforementioned moiré disturbance can be reduced greatly by selecting the width A to be about 1.22 times as much as the pitch T of the lenticular lenses 29. Practically, the effect can be obtained sufficiently by selecting the horizontal defocusing width A to be not smaller than about 0.8 times as much as the pitch T of the lenticular lenses 29. FIG. 36 shows the calculated value of the moiré disturbance reducing effect by a cylindrical mirror on the assumption that the aberration of the projection lens is zero.

A moment may be given in order to shape the light-reflecting means 32 like a cylinder. In order to give a moment, flexure of the mirror due to gravity may be used or a moment may be given by a spring, or the like. When the given moment is M, the radius R of curvature of the mirror is given on the basis of strength of materials by the following expression:

$$R = \frac{12M}{Ebh^3} \quad (21)$$

in which
b is the width of the mirror,
h is the thickness of the mirror, and
E is the Young's modulus.

The relation of the radius R to the horizontal defocusing width A, the projection distance D and the width W of the light-ray bundle is given by the following expression.

$$R = \frac{2W}{A} D \quad (22)$$

Figure 65:
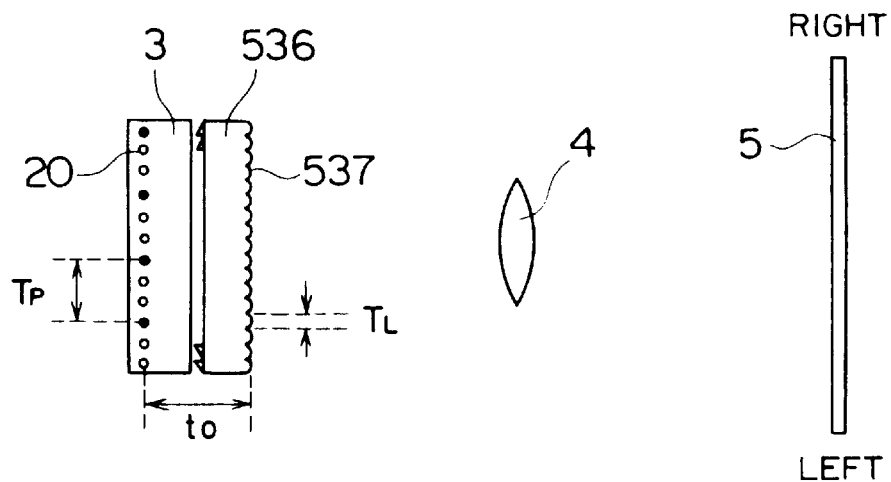
FIG. 65 is a schematic optical structural view showing the moiré disturbance reduction means.
Figure 70:
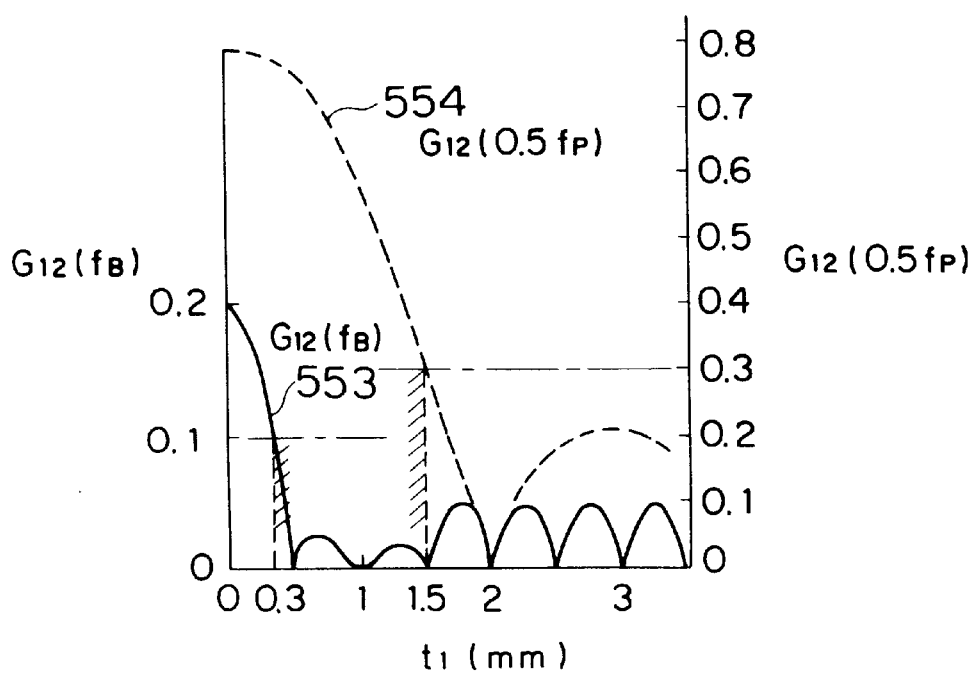
FIG. 70 is a graph for explaining the principle of FIG. 66.

By using the aforementioned expression, the required value of the radius can be calculated, that is, the required value of the moment can be calculated, so that this embodiment can be realized easily. The explanation of reduction of moiré disturbance by using the deformation of the mirror has been finished. Measures to reduce moiré disturbance for a BS screen by devising the output portion of the liquid crystal panel are shown in FIGS. 65 and 70 which will be described later.

Figure 38:
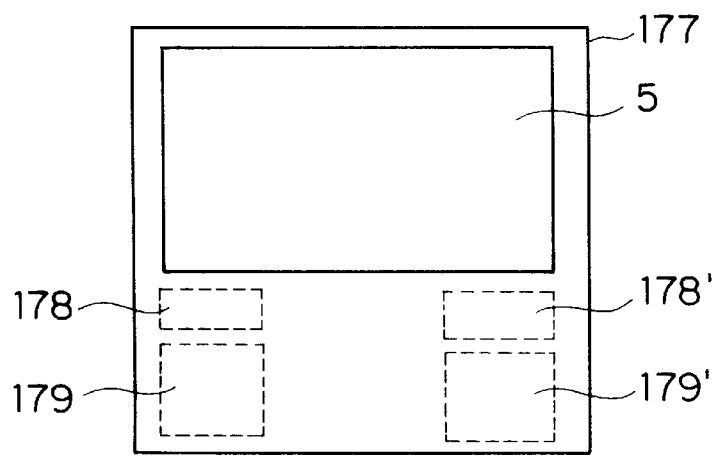
FIG. 38 is a front view of a back-projection type display unit according to the present invention.

FIG. 38 is a front view showing the case where the present invention is applied to a back projection type display unit. In FIG. 38, the reference numeral 5 designates a screen; 177, a cabinet; 178 and 178', speaker arrangement portions; 179 and 179', portions of arrangement of shelves for storing an optical disc player, a VTR, optical discs, tapes, and so on. It is recommended that this example is used together with the embodiments shown in FIGS. 26 and 34. This is because the depth of the cabinet can be made compact when the embodiments in FIGS. 26 and 34 are applied.

Ghost disturbance caused by the inner round-trip reflection of projection light in the Fresnel sheet used in a transmission screen will be described below.

Figure 39:
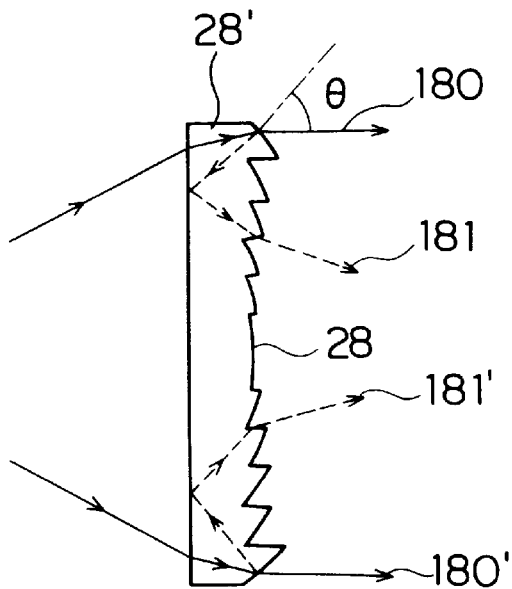
FIG. 39 is a horizontal plan view of a Fresnel sheet.
Figure 40:
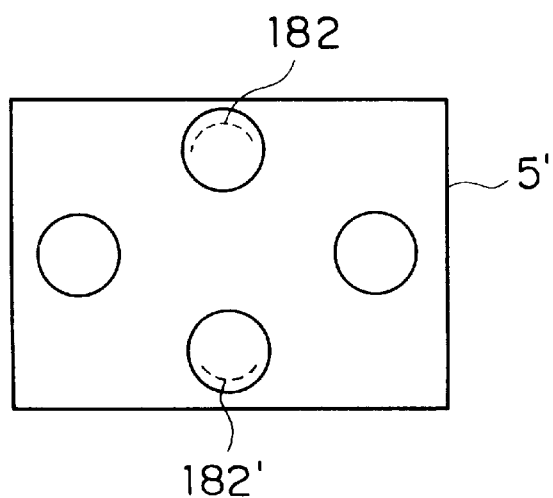
FIG. 40 is a view for explaining ghost disturbance.

FIG. 39 is a horizontal sectional view of the Fresnel sheet in the transmission screen depicted in FIG. 33. In FIG. 39, the reference numeral 28' designates a Fresnel sheet; and 28, a Fresnel lens surface. The reference numeral 180 and 180' designate effective projection light rays and the dotted lines 181 and 181' designate ghost disturbance light rays. Because these disturbance light rays move in horizontally oblique directions, the light rays are absorbed into the black stripes 30 described above with reference to FIG. 33. Accordingly, there is originally no ghost disturbance at the left and right ends of the screen. On the other hand, the disturbance light rays are not absorbed into the black stripes 30 at the upper and lower ends of the screen. Accordingly, ghost disturbance of the type shown in FIG. 40 is observed on the screen. In FIG. 40, the reference numeral 5' designates a screen frame, and the four round symbols represent images. The reference numerals 182 and 182' designates ghost disturbance images.

The present inventor has tried various experiments while paying attention to such ghost disturbance. As a result, it has been found that ghost disturbance is reduced greatly by limiting the direction (electric field) of polarization of light incident to the screen to the vertical direction.

Figure 41:
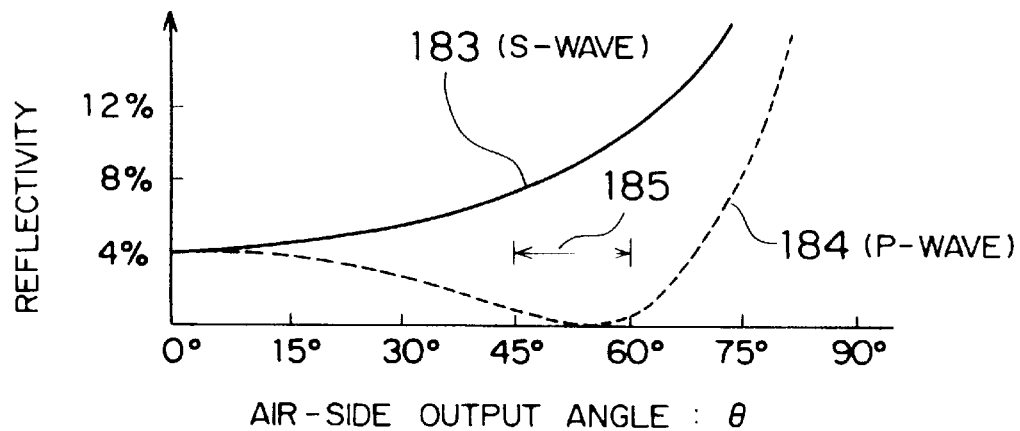
FIG. 41 is a graph for explaining reflectivity in the device according to the present invention.

The reason why ghost disturbance at the upper and lower end portions is reduced by limiting the direction of polarization of light incident to the screen to the vertical direction will be described below. FIG. 41 shows the light output angle dependency of the surface reflectivity of P wave and S wave. In Fig, 41, the curve 183 shows the reflectivity of S wave, and the curve 184 shows the reflectivity of P wave. The respective values of reflectivity are calculated by the following expression (42). The reflectivity of P wave takes zero at a so-called Brewster angle. The "Brewster angle" means an angle at which the output angle $\theta$ in FIG. 39 becomes equal to $\tan^{-1} 1/n$ (about 56°). Practically, in the back projection type display unit, the output angle $\theta$ is generally distributed in a region designated by the reference numeral 185 in FIG. 41 at the upper and lower ends of the screen. The "P wave with respect to the Fresnel sheet at the upper and lower ends of the screen" means vertical polarized wave.

Accordingly, it is understood that ghost disturbance in the upper and lower end portions is reduced by limiting the direction of polarization of light incident to the screen to the vertical direction according to the optical principle.

Figure 42:
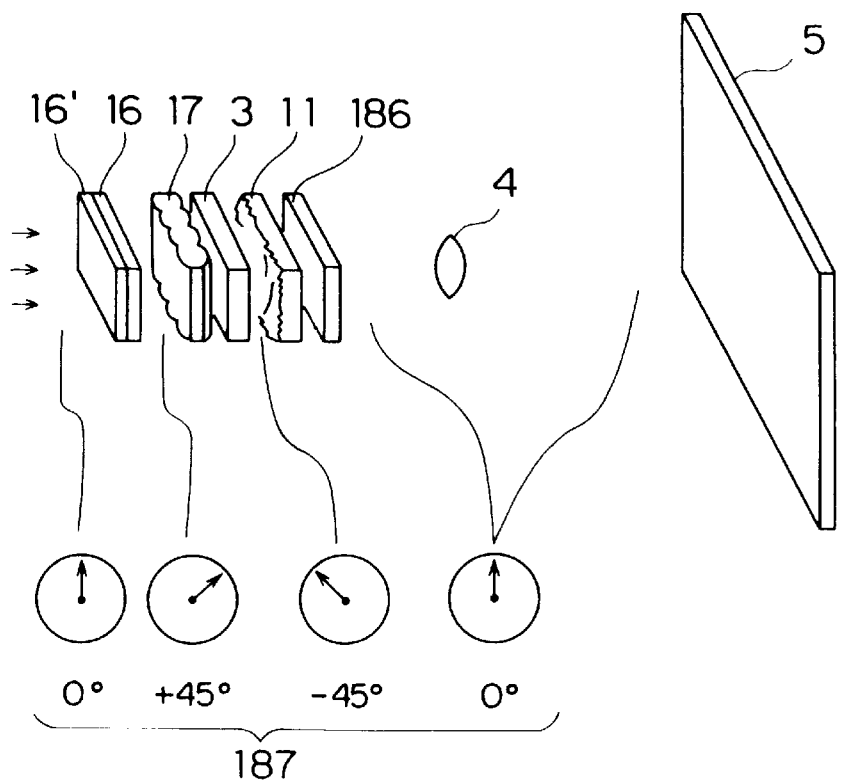
FIG. 42 is a perspective view showing a schematic optical structure for explaining a part of the embodiment of the present invention.

FIG. 42 shows an embodiment of the present invention based on the aforementioned experiment and consideration. In FIG. 42, the reference numerals 16', 16, 17, 3, 11, 4 and 5 designate the same parts as those shown in FIG. 26A. The reference numeral 186 designates a half-wavelength plate which is a main part of the this embodiment for rotating the plane of polarization by 45° and which is disposed between the liquid crystal panel 3 and the screen 5. The principle of the operation thereof will be described on the basis of the transition of the plane of polarization designated by the reference numeral 187 in FIG. 42. Light incident to the half-wavelength plate 16' for rotating the plane of polarization by 45° is polarized vertical wave. The direction of polarization of the output light of the polarization plate 16 is 45° to the right. The direction of polarization of the output light passing through the polarization plate (20" in FIG. 22) of the output surface of the liquid crystal panel 3 is 45° to the left. The direction of polarization of the output light which has passed through the half-wavelength plate 186 is vertical. Accordingly, the direction of polarization of light incident to the screen can be limited to polarized vertical wave. Accordingly, ghost disturbance in the upper and lower end portions of the screen can be lightened.

The essential condition for the present invention is that the direction of polarization of light incident to the screen is substantially limited to the vertical direction. The use of the half-wavelength plate 186 in FIG. 42 is a sufficient condition for satisfying the essential condition in this specific embodiment. This is because the reduction of ghost disturbance at the upper and lower ends of the screen as the object of this embodiment can be achieved with the removal of the half-wavelength plates 16' and 186, for example, by limiting the input light and output light of the liquid crystal panel 3 to horizontal polarized wave and vertical polarized wave respectively, and because such configuration is contained as one of easy modifications of this embodiment of the present invention.

Further, the direction of polarization of the output light can be converted into the horizontal direction by disposing a half-wavelength plate between the Fresnel sheet and the black striped sheet in the black stripe type screen shown in FIG. 33 while setting the light-anomaly axis of the half-wavelength plate to a 45° oblique direction. That is, the half-wavelength plate serves as means for making the direction of polarization horizontal. By this means, the loss of light reflection in the input/output surface of the black striped sheet can be reduced by application of the principle described above with reference to FIG. 41. Accordingly, the angle of view field can be enlarged in the left and right directions, so that the field to which the present invention can be applied can be widened. The means for making the direction of polarization horizontal may be integrally formed in the light output side of the black striped sheet.

Figure 43:
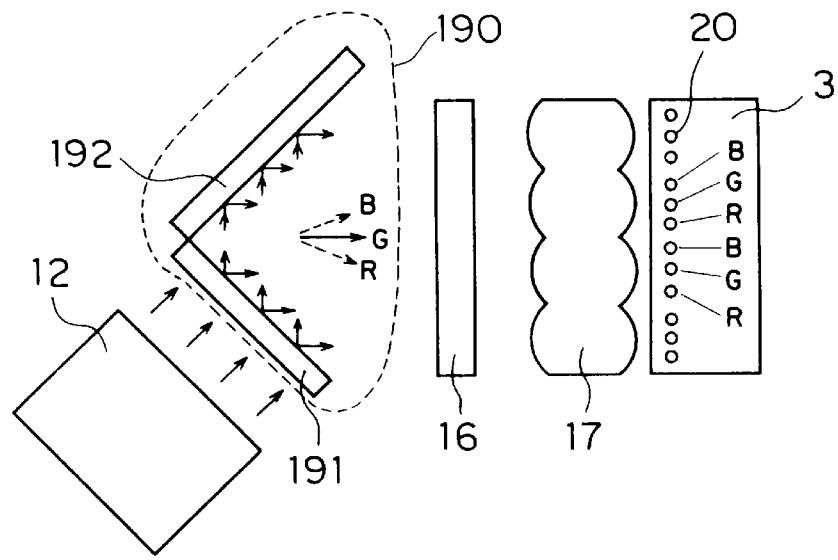
FIG. 43 is a schematic optical structural view showing a modified example of the three-direction means, which converts three primary colors into three different directions, in the second embodiment of the present invention.
Figure 44:
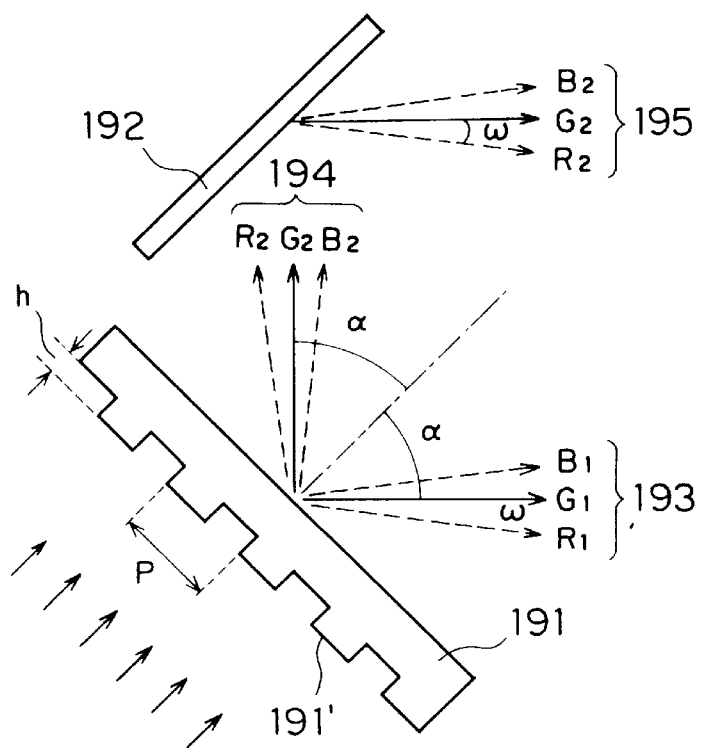
FIG. 44 is a schematic optical structural view for explaining the detail of a main part of FIG. 43.

A modified example of the three-direction means (13, 14 and 15) described above with reference to FIG. 21 is as a part surrounded by the dotted line 190 in FIG. 43. In FIG. 43, the reference numerals 12, 16, 17, 3 and 20 designate the same parts which have been already described, correspondingly. The reference numeral 191 designates a diffraction grating plate; and 192, a mirror. FIG. 44 shows the detailed configuration and principle thereof.

The reference numeral 191' designates a diffraction grating surface in which the period of arrangement of the diffraction grating is p and the depth of modulation is h. The reference numeral 193 designates diffracted light of positive first order; and 194, diffracted light of negative first order. The relating numerical expressions are as follows.

$$h \approx \frac{0.5\lambda_G}{n-1} \approx \lambda_G \quad (23)$$
$$\lambda_G \approx 0.535 \, \mu m, \quad \alpha \approx 45° \, (20° \sim 55°)$$
$$n \approx 1.5$$

$$p = \frac{\lambda_G}{\sin\alpha} \approx 0.76 \, \mu m \, (\alpha \approx 45°) \quad (24)$$

$$\omega = \sin^{-1}\frac{\lambda_R}{p} - \sin^{-1}\frac{\lambda_G}{p} \approx \frac{\lambda_R - \lambda_B}{2p} \times \frac{1}{\sqrt{1-(\lambda_G/p)^2}} \quad (25)$$

$$= \frac{\lambda_R - \lambda_B}{2\lambda_G}\tan\alpha \approx 0.15\tan\alpha \approx 8.6° \quad (26)$$
$$\lambda_R \approx 0.61 \, \mu m, \quad \lambda_B \approx 0.45 \, \mu m$$

In the aforementioned expressions, n is the refractive index (about 1.5) of the diffraction plate, $\alpha$ is the diffraction angle of diffracted green light of first order, and $\lambda_R$, $\lambda_G$ and $\lambda_B$ are wavelengths of red, green and blue respectively.

The expression (23) shows a condition for eliminating light of zero order outputted from the diffraction plate 191.

Figure 45:
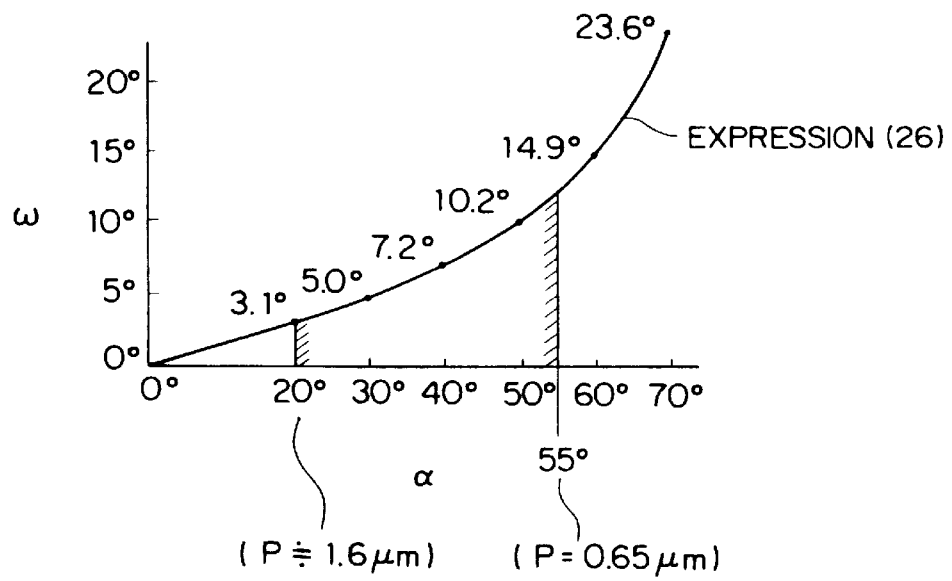
FIG. 45 is a graph showing a range of application of the embodiment depicted in FIG. 34.

The expression (24) shows the relation between the diffraction angle $\alpha$ of light of first order and the period p of arrangement of the diffraction grating. The expression (26) shows the relation between the angle $\omega$ between two colors and the diffraction angle $\alpha$. FIG. 45 is a graph showing this relation. As is understood from FIG. 44, diffracted light of positive first order and diffracted light of negative first order are in the relation of images reversed relative to each other with respect to the direction of input light. Accordingly, the output light 195 of the mirror 192 is made parallel to the diffracted light 193 of positive first order by arranging the mirror 192 in parallel to the direction of the input light. That is, the mirror 192 reflects the input diffracted light of negative first order to thereby convert the light into the output light parallel to the diffracted light of positive first order. In FIG. 45, the oblique-line portion shows the effective range of the present invention. On the basis of the expression (24), this corresponds to the case where the period p of arrangement of the diffraction grating is in a range of from 0.65 $\mu$m ($\alpha \leq 55°$) to 1.6 $\mu$m ($\omega \geq 20°$) inclusively. This is because the angle $\omega$ between two colors is too small or too large when the period p is out of range. According to this configuration, both size and cost of the apparatus can be reduced compared with the configuration of FIG. 21.

The present inventor has proposed the use of a diffraction grating in FIG. 12 of JP-A-5-257114. In the proposal, however, only diffracted light of positive first order is used but diffracted light of negative first order is not used. According to the present invention shown in FIGS. 43 and 44, therefore, the efficiency of use of light can be improved compared with JP-A-5-257114.

Figure 52:
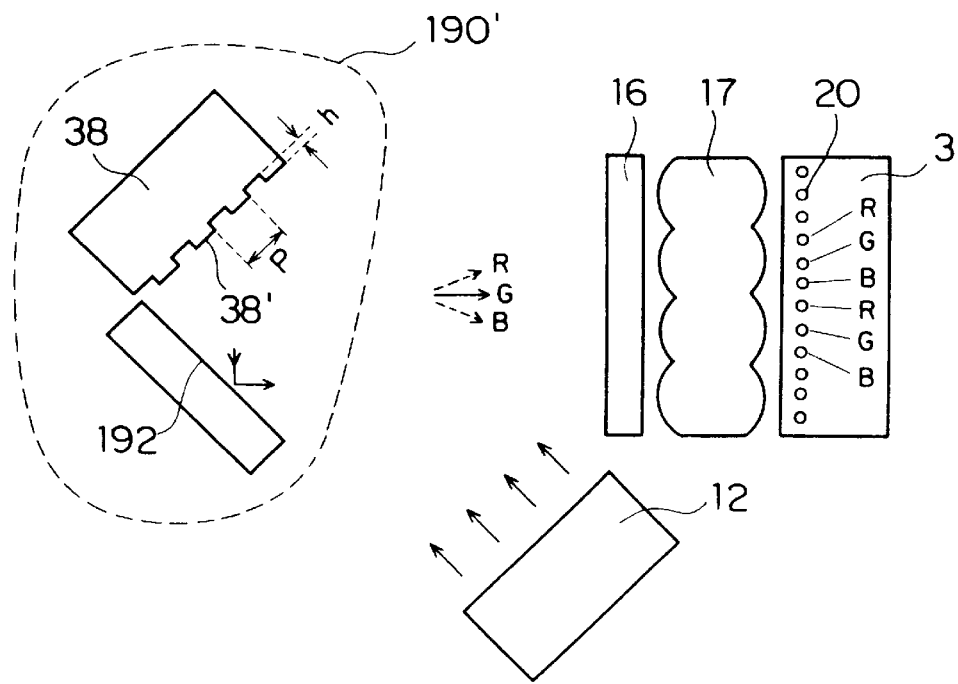
FIG. 52 is a schematic optical structural view showing a modified example of the three-direction means, which converts three primary colors into three different directions, according to the present invention.

FIG. 52 shows a modified example of FIG. 43. In FIG. 52, a portion surrounded by the dotted line 190' is a three-direction means which converts light of three primary colors into three different directions. Although FIG. 43 shows the case where a light-transmission type diffraction grating plate is used, FIG. 52 shows the case where a reflection type diffraction grating plate 38 is used. The reference numeral 38' designates a diffraction reflecting surface. In this example, the depth of the diffraction grating: h=$\lambda_G$/4, instead of the expression (23), is used as a conditional expression for eliminating output light of zero order. This is the same as the expression (23) in a physical sense of giving phase difference of 180°. Accordingly, the expressions (24) to (26) can be applied without any change. Accordingly, the principle of the operation is also the same.

Figure 53:
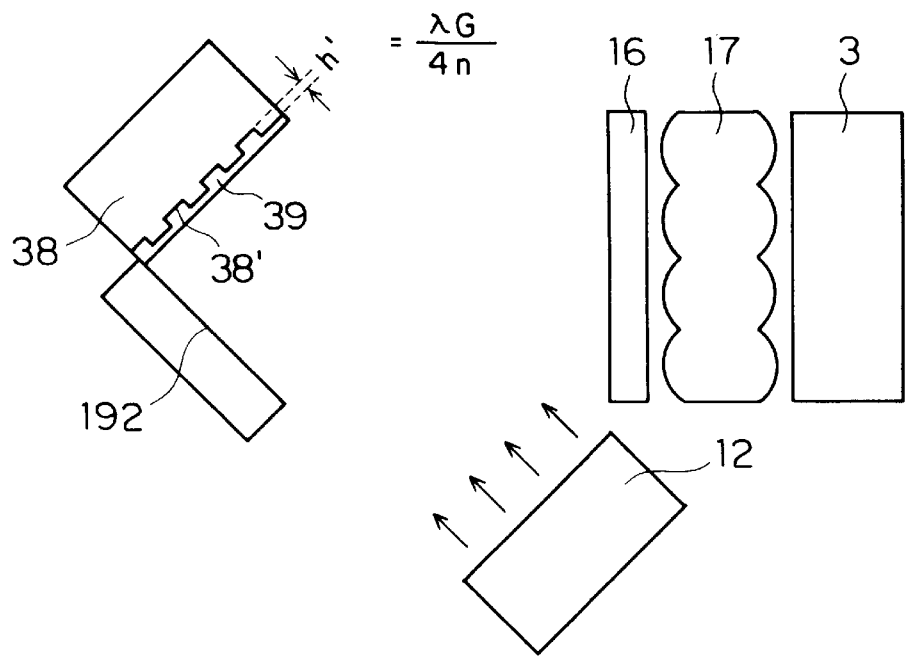
FIG. 53 is a schematic optical structural view showing a modified example of the three-direction means, which converts three primary colors into three different directions, according to the present invention.

FIG. 53 shows a further modified example. In FIG. 53, the reference numeral 39 designates a transparent coating for protecting the diffraction reflecting surface 38' from dust or the like. When the refractive index of the coating medium is n, the depth of the diffraction grating can be selected to be h'=$\lambda_G$/4n which is smaller than the value in the previous example. Accordingly, the production of the diffraction grating can be made easily.

Figure 46:
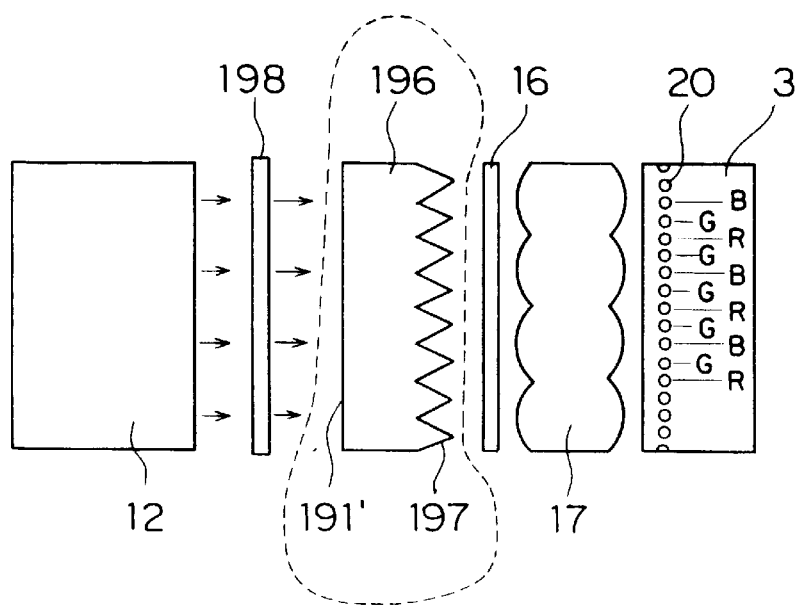
FIG. 46 is a schematic optical structural view showing a further modified embodiment of the present invention.
Figure 47:
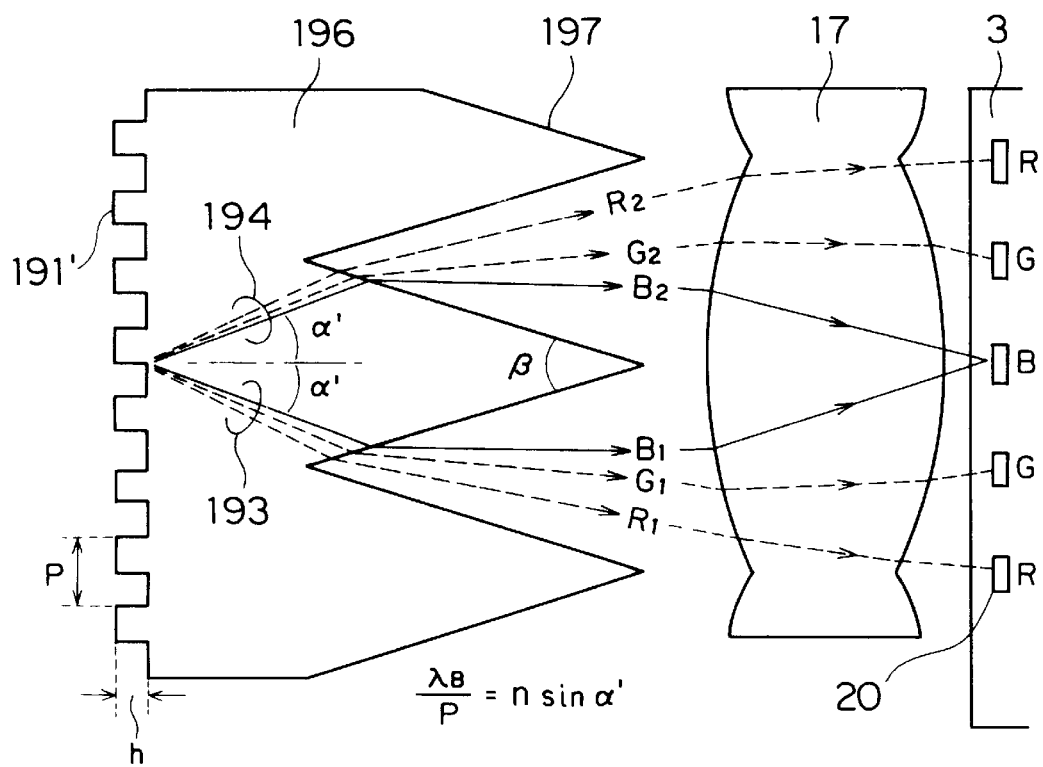
FIG. 47 is a detailed optical structural view of the five-direction means which converts three primary colors into five different directions, and which is a main part of FIG. 46.

FIG. 46 shows a further modified example. In FIG. 46, the reference numerals 191', 196 and 197 designate important parts of this configuration and the detail thereof is shown in FIG. 47. The reference numeral 198 designates a neutral color attenuation filter for improving color purity by attenuating orange color components or the like generated by mercury contained in the light source. Specifically, a known multilayer interference film filter or a coloring resin filter can be used. In FIG. 47, the reference numeral 191' designates the same part which has been already described. This part converts light of three primary colors into six directions. The reference numeral 197 designates a row of prisms.

The size of the prism angle $\beta$ is selected to be not larger than the angle $2\alpha'$ between a pair of diffracted blue light of positive and negative first orders. Further, the prism angle $\beta$ is selected so that positive and negative output blue colors are parallel to each other. Accordingly, the part 196 can be called "five-direction means".

The arrangement of pixels 20 in the liquid crystal panel means 3 in FIGS. 46 and 47 is RGBG, RGBG, RGBG. The period of arrangement of the lenticular lenses in the lenticular lens plate 17 is set to be equal to the width of one RGBG section. The thickness of the lenticular lens plate is selected to be nearly equal to the focal length of the lenticular lenses. (In the drawings, however, the lenticular lens plate is shown compressively.) By this means, input light having five directions (blue: one direction, red: two directions, green: two directions) can be led to positions of pixels of RGBGR respectively. In FIG. 47, the period of arrangement of the prism row 197 need not be made coincident with that of the lenticular lenses and may be selected to be in an arbitrary range (about 1 mm~0.1 mm). This is because moiré disturbance between the prism row 197 and the lenticular lenses can be eliminated easily by providing a distance between the two.

According to the configuration of FIG. 46, in addition to the aforementioned light-utilizing efficiency improving effect, an effect of matching the pixel arrangement pattern to visual mentality is obtained. As known well, green color contributes to detailed resolving power most greatly. Accordingly, the aforementioned configuration in which the number of green pixels is selected to be twice the number of red or blue pixels has desirable characteristic on visual mentality.

Incidentally, attention is to be paid to the fact that, in the configuration of FIG. 47, color separation is not made by the prisms 197. In this configuration, color separation is achieved by the diffraction grating 191'. Accordingly, the prisms 197 merely refract light. The explanation of FIGS. 46 and 47 has been finished.

As a further modification of the aforementioned example, the arrangement of pixels may be selected to be (RGBBGR) so that a pair of diffracted blue light of positive and negative first orders in FIG. 47 are not made parallel to each other but a concentration angle ω can be provided between the two. This is called "six-direction means" or "six-position means".

A method of forming a thin glass plate in the input side of the liquid crystal panel means 3 in FIGS. 21, 43 and 46 will be described below.

Figure 48:
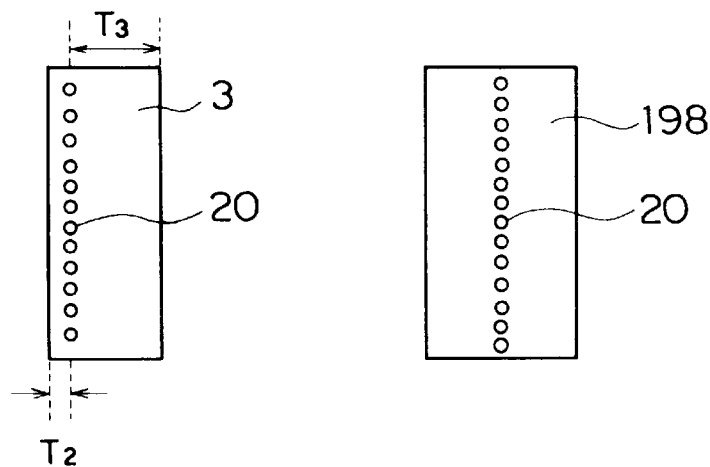
FIG. 48 is a view showing a schematic optical sectional structure of the liquid crystal panel.

In FIG. 48, the reference numeral 198 designates a conventional liquid crystal panel means; 3, a liquid crystal panel means according to the present invention; 20, a row of pixels; $T_2$, the thickness of the input side glass plate; and $T_3$, the thickness of the output side glass plate. In the conventional technique, in the case of a diagonal size of 10 inches, $T_2$ and $T_3$ are equal to each other, that is, $T_2$ and $T_3$ take the same value of about 1 mm. It has been thought of that use of a thinner glass plate is not suitable because of deformation, or the like, caused by shortage of image accuracy and abnomality of local temperature distribution.

Specific examples of the input side and output side glass plate thicknesses of the liquid crystal panel means 3 in the present invention are about 0.2 mm and 1 mm respectively. The procedure of forming such a thin glass plate will be described below in brief.

(1) A wiring pattern, TFT, an electric charge holding capacitor and a light-distribution film are formed in the light input side of the output side glass plate in the same manner as in the conventional technique.

(2) The input side glass plate is subjected to pre-annealing for giving uniform pressing power when the plate is mounted. The detail of the pre-annealing form will be described later.

(3) A transparent electrically conductive film (ITO) and a light-distribution film are formed in the light output side of the input side glass plate in the same manner as in the conventional technique.

(4) Spherical spacers (with a diameter of several μm) are distributed evenly on the TFT side surface of the output side glass plate. A bank is provided at the four peripheral sides.

(5) The input side glass plate is put on the output side glass plate.

(6) Liquid crystal is injected into the gap between the two glass plates to thereby seal the gap.

A point of difference between the aforementioned forming procedure and the conventional technique is only the pre-annealing of the item (2). Pre-annealing will be described below.

Figure 49:
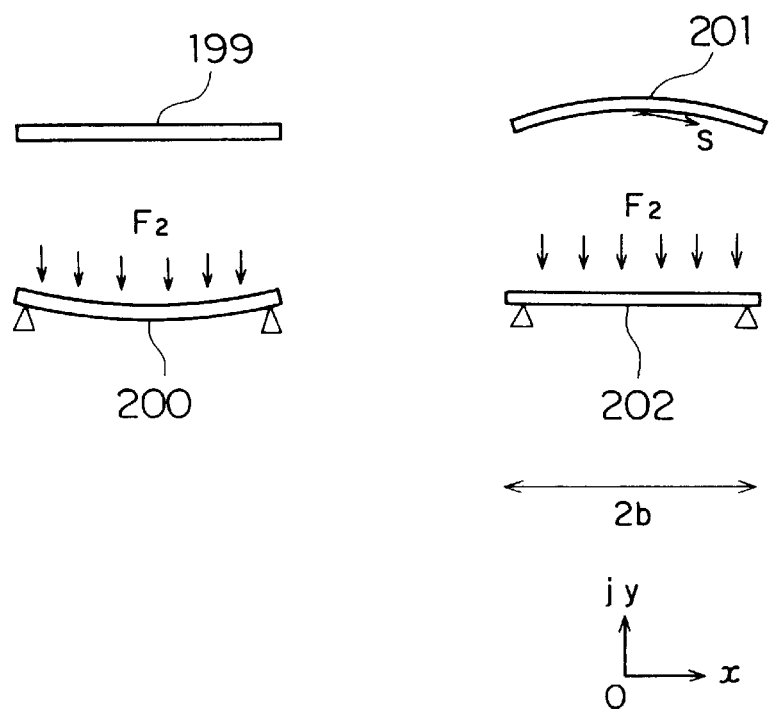
FIG. 49 is a view for explaining the basic principle of the liquid crystal panel forming method according to the present invention.

FIG. 49 shows the principle simply. In FIG. 49, the reference numeral 199 designates a flat plate in an agravity state. The reference numeral 200 shows the fact that the flat plate 199 is bent by its own weight when gravity acts on the flat plate 199. The reference numeral 201 designates the shape of a pre-annealed plate in an agravity state. The reference numeral 202 shows the fact that the pre-annealed plate 201 is changed to a flat plate when gravity acts on the pre-annealed plate 201 suitably. That is, in this embodiment, the curved thin glass plate 201 is used on the input side of the liquid crystal panel 3.

To give upward adhesive power to the thin plate even in the state in which gravity acts on the thin plate, it is necessary that pre-annealing is performed more intensively. A condition therefor is shown by the following numerical expressions.

According to strength of materials, the curvature $\theta_1$ of a thin plate and the area density $F_2$ of the loaded thin plate have a relation given by the following expression.

$$D\Delta\theta_1 = F_2 \tag{27}$$

$$D = \frac{Et^2}{12(1-k^2)} \tag{28}$$

D: rigidity

Δ: Laplacian

E: Young's modulus t: plate thickness k: Poisson's ratio

In the case of a glass material, $$\frac{E}{1-k^2} \approx 7 \text{ Mg}/(\text{mm})^2 \tag{29}$$

Because pre-annealing makes the plate bend only in the direction of one dimension (generally, the direction of the short side), $\Delta\theta_1$ in the expression (27) becomes $\theta_1''$ when the surface coordinates measured along the direction of the dimension are S.

$$D\theta_1'' = F_2 \tag{30}$$

$$\theta_1'' = \frac{d^2\theta_1(s)}{(ds)^2}$$

Also in a gravity acting state, a condition for giving adhesive power is given by the following expression.

$$F_2 \geq m_3 t \tag{31}$$

$$m_3 \approx 2.5 \text{ g}/(\text{cm})^3$$

The following expression is obtained by solving the differential equation of the expression (30).

$$\theta_1 = \frac{F_2}{2D}(s^2 - b^2) \tag{32}$$

in which
b=(width of short side)/2

$$\frac{F_2}{2D} \geq \frac{12(1-k^2)}{2Et^3} = \frac{6m_3(1-k^2)}{Et^2} \approx 2.1 \times 10^{-3} (\text{mm})^{-3} \quad (33)$$

When the Gaussian complex coordinates (x,jy)=z described additionally in FIG. 49 is used, the curvature $\theta_1$ is given by the following expression.

$$z = (x, jy) \quad (34)$$

$$\frac{d^2 z}{(ds)^2} = j\theta_1 \frac{dz}{ds}$$

$$\therefore \frac{d\left(\ln\frac{dz}{ds}\right)}{ds} = j\theta_1 \quad (35)$$

$$ds = j\frac{F_2}{2D}(s^2 - b^2)$$

$$\therefore \ln\frac{dz}{ds} = j\frac{F_2}{2D}\left(\frac{s^3}{3} - b^2 s\right) \quad (36)$$

$$\therefore z = \int_0^s \exp\left\{j\frac{F_2}{2D}\left(\frac{s^3}{3} - b^2 s\right)\right\} ds$$

If $\frac{F_2}{2D} b^3 \ll 1$ is valid, $\quad (37)$ $$z = \left\{s, j\frac{F_2}{2D}\left(\frac{s^4}{12} - \frac{b^2 s^2}{2}\right)\right\}$$

Figure 50:
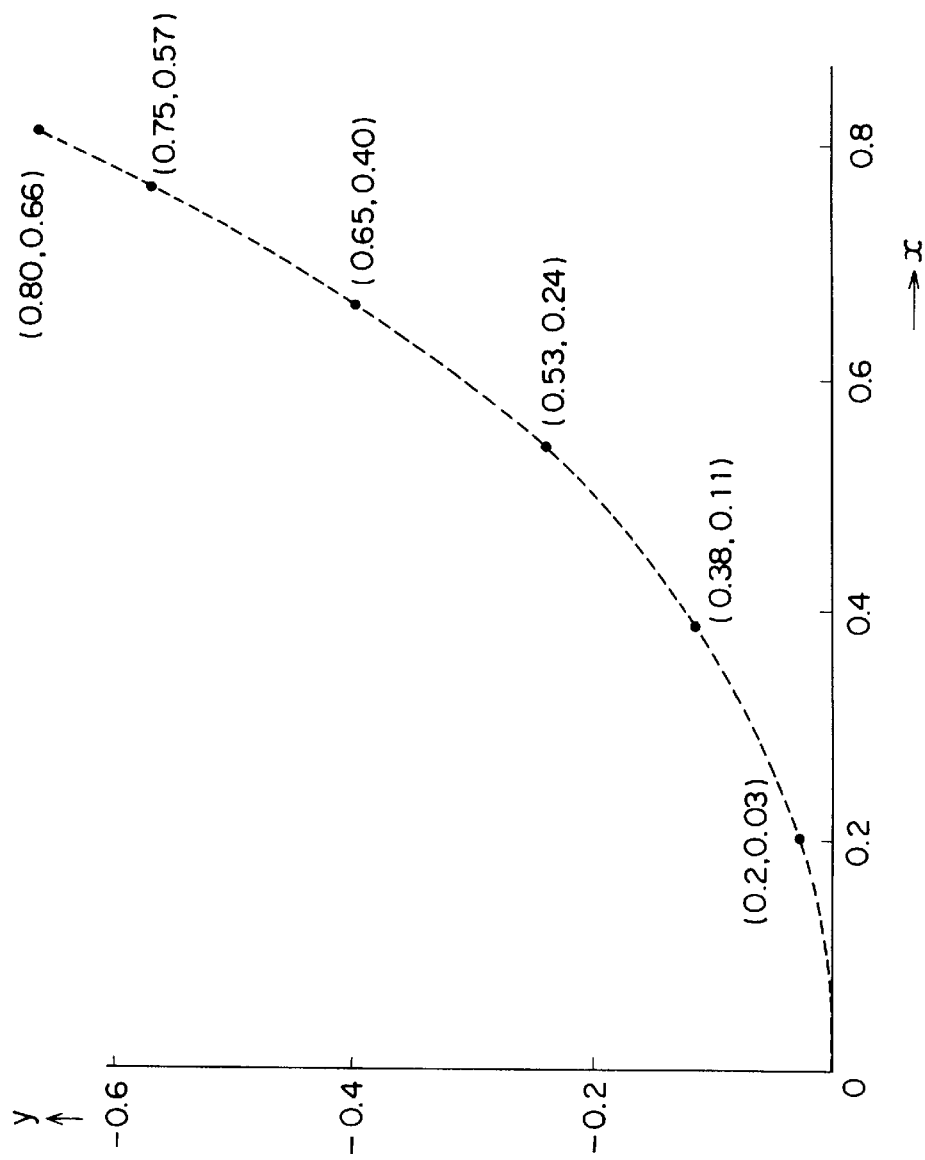
FIG. 50 is a graph showing a pre-annealing profile.

FIG. 50 is a graph showing a result of computerized calculation of the expression (36) by numerical integration. Because the value of the expression (36) is a complex number, only a right half is expressed in the form of a graph with x as the real part and v as the imaginary part on the basis of the aforementioned definition.

As is to be understood from the above description, always stably giving adhesive pressure to the pixel forming portion of the liquid crystal panel means is achieved by applying pre-annealing to the thin plate so that adhesive pressure determined by second derivative with respect to the surface one-dimensional ordinate (s) of the curvature of the thin plate is larger than the weight of the thin plate. This producing method is effective particularly to a large-scale panel having a diagonal size larger than 15 inches.

Figure 51:
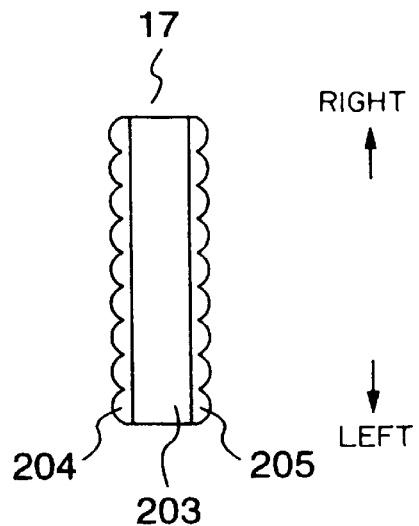
FIG. 51 is a schematic horizontal section showing the quality of the material for a double-side lenticular lens.

FIG. 51 shows constituent materials of the double-side lenticular lens 17. In FIG. 51, the reference numeral 203 designates a glass substrate having a thickness of 0.5 to 2 mm; 204 and 205, ultraviolet-curing resins such as an acrylic resin, and so on, which are formed on surfaces of the glass substrate 203 and generally have a thickness of about 0.1 mm or smaller. Accordingly, the linear expansion coefficient of the double-side lenticular lens as a whole in the left and right directions in FIG. 51 is nearly coincident with that of the glass substrate and, accordingly, coincident with that of the liquid crystal panel means. The four-side ends (upper and lower ends and left and right ends) of the double-side lenticular lens are stuck and fixed to the liquid crystal panel means 3.

Accordingly, the phase of arrangement of the lenticular lens and the phase of arrangement of pixels in the liquid crystal panel means 3 can be kept substantially constant against the temperature change. Alternatively, as a substitute for the adhesion of the four side ends, the space between the liquid crystal panel and the double-side lenticular lens may be filled with a medium (such as a silicone resin) having a refractive index smaller than the refractive index of the lenticular lens medium to thereby achieve adhesion of the surface as a whole.

In FIG. 51, if the substrate 203 is formed from a resin material, a linear expansion coefficient difference of about 70 ppm/° C. arises between the substrate 203 and the liquid crystal panel means. Accordingly, an expansion/contraction difference of 0.1% (a difference of 0.1 mm in the case of a panel size of 100 mm per one side) is generated because of the temperature change of 14° C. Because this is nearly equal to the pixel size, color tone becomes quite abnormal at the left and right ends of the screen.

That is, the change of color tone caused by the temperature change can be prevented by forming the substrate of the lenticular lens 17 from a glass material which is the same material as that of the liquid crystal panel means 3.

Figure 54:
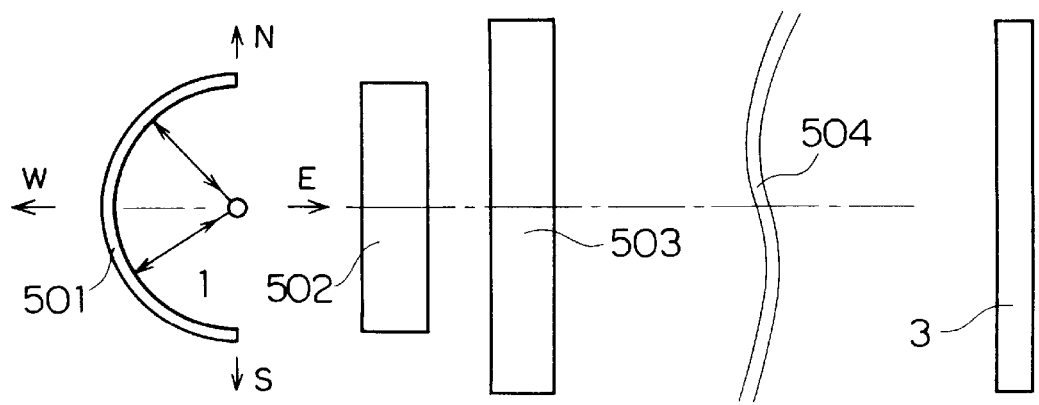
FIG. 54 is a schematic optical structural view showing the theoretical basic structure of an aspect mismatch loss reduction type collimator in the present invention.

As described above, the first embodiment of the present invention is categorized in an optical system which is rotationally symmetrical with respect to an optical axis. The aspect mismatch loss is considerably improved compared with the conventional technique but it still remains. FIG. 54 shows the basic configuration of a modified example of the collimator for reducing the aspect mismatch loss more greatly to improve the efficiency of use of light.

In FIG. 54, the reference numeral 1 designates a light source; and 3, a liquid crystal panel. The basic configuration will be described on the basis of a polar coordinate system in which latitude and longitude, and east, west, south and north are defined with the light source as its origin for convenience of description. The reference numeral 501 designates a spherical light-reflecting means disposed in the western hemisphere; 502, a first-direction light-deflecting means; and 503, a second-direction light-deflecting means. The means 502 and 503 form a collimator means in this modified example. The reference numeral 504 designates a symbol merely showing omission.

In FIG. 54, the spherical light-reflecting means 501 serves to return light radiated from the light source 1 onto the western hemisphere to the light source 1 to thereby radiate the light onto the eastern hemisphere again. The first-direction light-deflecting means 502 serves to deflect light in a latitude-reducing direction. The second-direction light-deflecting means 503 serves to deflect light in a longitudinal-divergence reducing direction. By the action of the first-direction and second-direction light-deflecting means, the section of the output light thereof can be substantially shaped like a rectangle. Accordingly, the aspect ratio mismatch loss in the conventional technique is eliminated so that the efficiency of use of light can be improved.

Figure 55A:
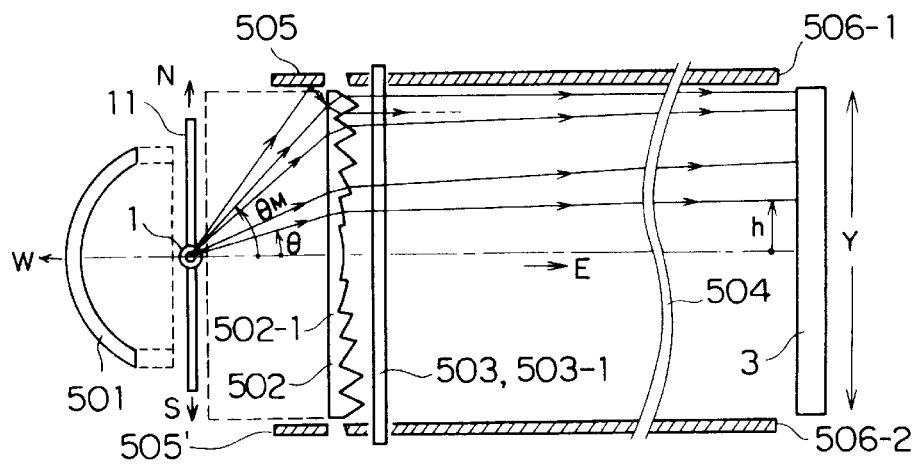
FIGS. 55A and 55B are schematic optical structural views showing a specific embodiment of FIG. 54 and are a vertical sectional view and a horizontal sectional view respectively.
Figure 55B:
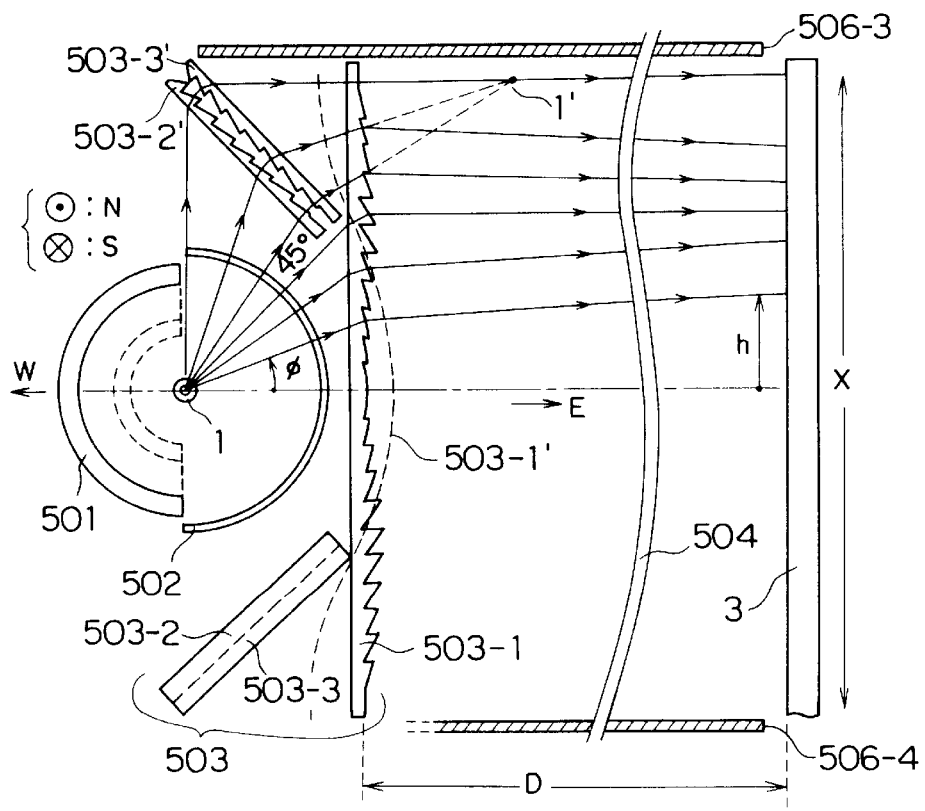

FIGS. 55A and 55B show a specific example of the aforementioned basic configuration. FIG. 55A is a front sectional view, and FIG. 55B is an elevation sectional view, that is, a section taken in the equator. In the drawings, the reference numeral 1 designates a light source; 11, a stem thereof; 3, a liquid crystal panel; 501, a spherical light-reflecting means disposed in the western hemisphere; 502, a semi-cylindrical first-direction light-deflecting means disposed in the eastern hemisphere; 503, a second-direction light-deflecting means disposed in the eastern hemisphere; and 504, a symbol showing omission. The means 503 is constituted by flat-plate-like linear Fresnel sheets designated by the reference numerals 503-1, 503-2, 503-3, 503-2' and 503-3'. As shown in the drawings, the first-direction light-deflecting means 502 is a semi-cylindrical Fresnel sheet having a linear Fresnel lens surface 502-1 formed in its outside. The cylindrical shape can be achieved easily by cylindrically annealing a thin flat-plate-like Fresnel sheet produced in the form of a flat plate in advance. Alternatively, the cylindrical shape can be achieved by sticking such a flat-plate-like Fresnel sheet to the outer surface of a strong transparent semi-cylinder produced separately.

The description of the configuration of FIGS. 55A and 55B has been finished and the operation thereof will be described below. In the drawings, the arrow-headed solid lines radiated from the light source 1 show paths of light rays. The angle θ is a latitude component showing a light-radiating direction, h is the ordinate of latitudinal distance on the liquid crystal panel 3, the angle φ is a longitude component showing a light-radiating direction, and k is the ordinate of longitudinal distance on the liquid crystal panel 3.

The first-direction light-deflecting means 502 refracts and deflects light in a latitude-reducing direction as shown in the drawings. When the angle of deflection of the first-direction light-deflecting means 502 is selected to satisfy the following expression, the illuminance of the input surface of the liquid crystal panel 3 in the latitudinal direction can be improved so as to be more uniform compared with that of the input surface of the means 502. This is because the solid angle measured with a point light source as its center is proportional to the sine of the latitude θ. (Note: In so-called Mercator projection, planes near the northern and southern poles are enlarged unwarrantably because θ is used instead of the right side of the expression (38)).

$$h(\theta) \, \sin \theta \tag{38}$$

in which θ is latitude, and h is the ordinate of latitudinal distance on the liquid crystal panel 3.

The explanation of the first-direction light-deflecting means 502 has been finished and the explanation of the second-direction light-deflecting means 503 will be made below. Because the elevation view of FIG. 55B is vertically symmetrical, only an upper half thereof will be described. As shown in the drawing, the second-direction light-deflecting means 503 refracts and deflects light in a longitudinal-divergence reducing direction. In this occasion, the angle of deflection is set so that the sum of deflection angles of the Fresnel sheets 503-1, 503-2' and 503-3' satisfies the following expression:

$$k(\phi) \, \phi \tag{39}$$

in which φ is longitude, and k is the ordinate of longitudinal distance on the liquid crystal panel 3.

The aforementioned expression is based on the fact that light-radiating characteristic of the light source is generally nearly rotationally symmetrical in the longitudinal direction.

As shown in the drawing, a simple designing method is to make the Fresnel sheets 503-2' and 503-3' mirror-symmetrical to each other. That is, setting is performed so that light incident to each position on the Fresnel sheet 503-2' is outputted in parallel to a direction of the normal line of the Fresnel sheet surface to form light inputted to the Fresnel sheet 503-3' and further the output light of the Fresnel sheet 503-3' is outputted in a direction (shown by the dotted line) designated by the reference numeral 1'. (The formula for designing the prism angle of the Fresnel lens has been described in the expression (17)). In FIG. 55B, the point 1' is a point which is located to be mirror-symmetrical to the light source 1 with respect to the Fresnel sheet 503-2'/3'.

As the material for the Fresnel sheet, there is suitable methacrylic resin large in Abbe number, that is, little in chromatic aberration. Upon reception of the aforementioned output light, a corresponding portion of the Fresnel sheet 503-1 refracts and deflects light toward the liquid crystal panel 3 so that the expression (39) substantially holds.

The explanation of the principle, operation and configuration of the basic portions in FIGS. 55A and 55B has been finished and the explanation of supplementary portions will be made.

In the front sectional view of FIG. 55A, the Fresnel sheets 503-2, 503-2', 503-3 and 503-3' are omitted for avoiding unnecessary complex of the external appearance of the drawings.

In FIG. 55B, light rays are slightly inclination-corrected in the longitudinal direction in the section D to satisfy the k–φ relation of the expression (39). The inclination correction can be made unnecessary if the Fresnel sheet 503-1 is shaped not like a flat plate but like a curved plate (the dotted line 503-1'). That is, the Fresnel sheet is preferably arranged so that the ordinate of light incident to the curved plate 503-1' satisfies the expression (39). Therefore, the curved plate is preferably shaped so that the two-dimensional coordinates of the curved plate are proportional to (φ cot φ, φ). Further, the shape of the curved plate may be approximated by a polygonal line. Then, the curved plate can be formed cheaply and easily.

The parts 505 and 505' disposed at the south and north ends in FIG. 55A are semi-annular light-reflecting means. The means 505/505' are described only in the front sectional view (A) side for avoiding unnecessary complex of the drawing. The means 505/505' serve to invert the latitude of the direction of light radiated toward the south and north poles to thereby use the light effectively. The means 505/505' are formed so as to be near (or stuck) to the semi-cylinder 502 in the inner cylindrical surface of the semi-cylinder 502 or in the south and north end side surface thereof.

The reference numerals 506-1, 506-2, 506-3 and 506-4 designate light-guiding wall means disposed along the outside edge of each light path. A mirror or a direction regulating wall is used as the means. The light-guiding wall has a function of preventing the illuminance of the peripheral region of the liquid crystal panel 3 from being lowered compared with that of the central region thereof. The direction-regulating type light-guiding wall means is obtained by application of the principle of a direction regulator which will be described later in FIG. 62. The light-guiding wall means will be described later, separately.

In the applied example in which the distance D between the Fresnel sheet 503-1 and the liquid crystal panel 3 is very small compared with the size of the liquid crystal panel 3, addition of a lens means onto the light input side of the panel 3 is effective for collimating light incident to the liquid crystal panel 3. Or it is effective that light is collimated toward the input pupil of the projection lens means disposed in the output side of the liquid crystal panel 3 by the lens means.

In the case where the value of D is equal to or larger than the size of the liquid crystal panel 3, such a lens means need not be added. This is because light rays incident to the liquid crystal panel 3 have been already made parallel sufficiently.

In FIG. 55B, the ratio of the longitudinal size X of the liquid crystal panel 3 to the latitudinal size Y thereof, that is, the aspect ratio is about 2. Accordingly, to make the former correspond to the width (horizontal width) of the screen and make the latter correspond to the height (vertical width) of the screen is suitable for general use.

When the value of the aspect ratio is K, the value in the example of arrangement in FIGS. 55A and 55B is given by the following expression:

$$K \approx \frac{4D_{503}}{2D_{503}\tan\theta_M} \quad (40)$$

in which $D_{503}$ is the distance between the light source 1 and the Fresnel sheet 503-1, $D_{502}$ is the distance between the light source 1 and the first-direction light-deflecting means 502, and $\theta_M$ is the maximum latitude angle (see FIGS. 55A and 55B).

$$K' \approx \frac{D_{503}}{D_{502}\tan\theta_M} \quad (40')$$

At the time of using beam splitter

Accordingly, the value of K can be increased if the ratio D503/D502 is increased.

Figure 56:
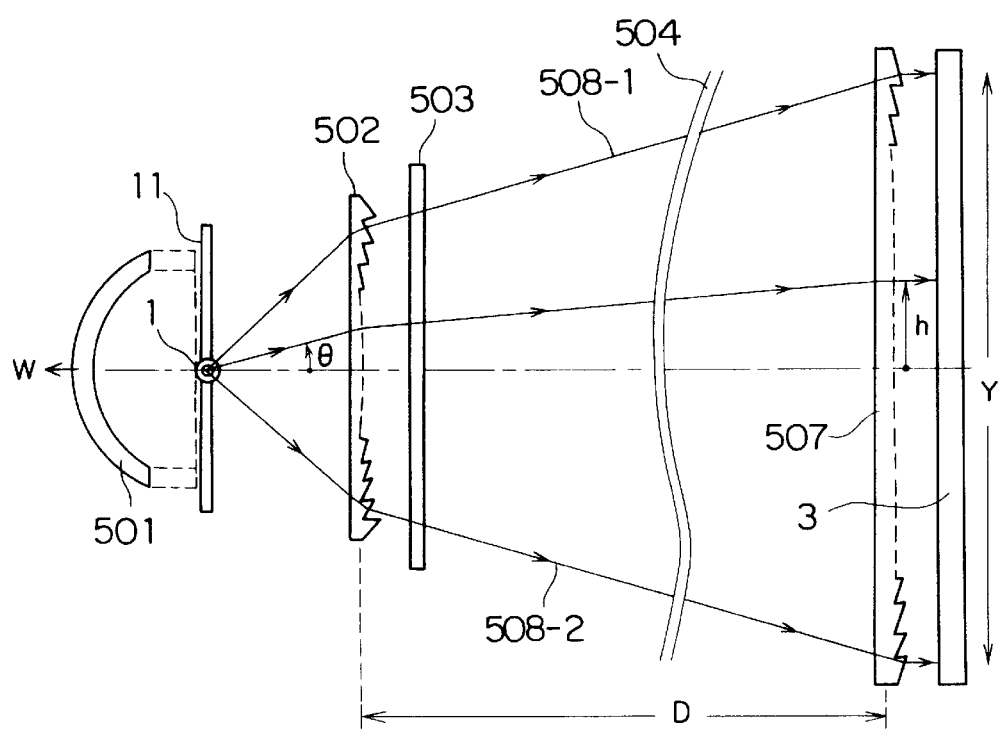
FIG. 56 is a schematic sectional view showing the optical structure of the aspect ratio reduction means.

Contrariwise, in order to reduce the value of K, there are two methods. The first method is shown in FIG. 56. In FIG. 56, the reference numerals 1, 3, 11, 501, 502, 503 and 504 designate the same parts which have been already described, correspondingly. In FIG. 56, to make south and north end light rays 508-1 and 508-2 divergent is a point of difference from FIGS. 55A and 55B. By this method, the height Y can be increased correspondingly to the running distance D and, accordingly, the aspect ratio can be reduced correspondingly to the running distance D. The reference numeral 507 designates a collimator linear Fresnel sheet. In the case where the value of D is sufficiently large compared with the size of the panel 3, the sheet 507 can be removed. Also in this example, satisfying the h–θ relation of the aforementioned expression (38) is effective for performing improvement to make the illuminance of the surface of the panel 3 uniform. The explanation of FIG. 56 has been finished.

Although FIG. 56 shows the case where latitudinal scale-enlargement in the section D is used, longitudinal scale-reduction may be contrariwise used in the section D. For the longitudinal scale-reduction, it is preferable that one Fresnel sheet having different power is added to the output side of the Fresnel sheet 503-1 so as to be mirror-symmetrical.

The second method for reducing the aspect ratio is a method in which the south-north distance (vertical width) is increased to about twice by using a polarized beam splitter and a mirror. A drawing therefor is shown additionally in FIG. 62. In the case, K' in the expression (40') is used because the aspect ratio is reduced to half.

The explanation of the supplementary portions about FIGS. 55A and 55B has been finished.

Figure 57A:
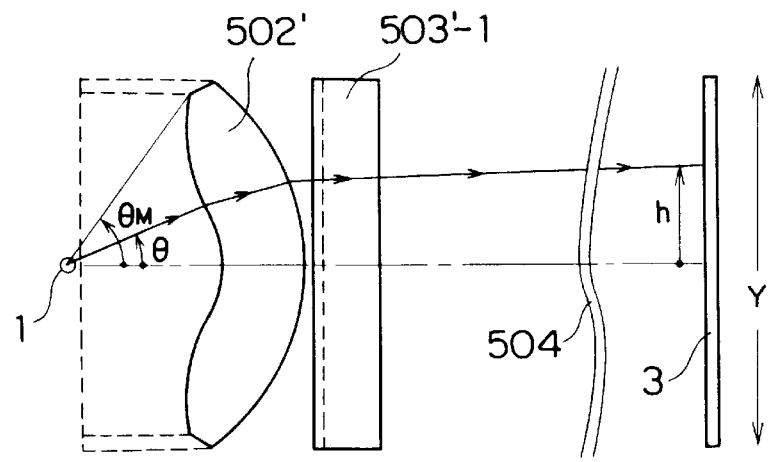
FIGS. 57A and 57B are schematic optical structural sectional views showing another modified example of the embodiment of FIG. 54.
Figure 57B:
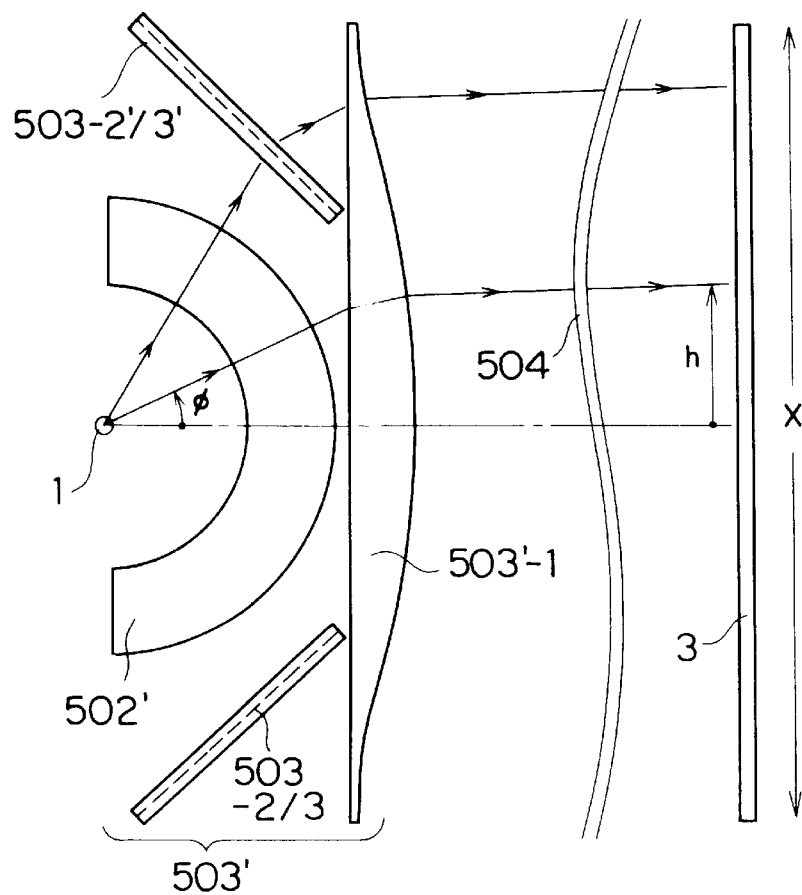

A locally modified example of the collimator shown in FIGS. 55A and 55B is shown in FIGS. 57A and 57B. The point of difference of FIGS. 57A and 57B from FIGS. 55A and 55B is only 502' and 503'-1. Other parts may be slightly omitted but are substantially the same. The reference numeral 502' designates a first-direction light-deflecting means which is shaped to be aspherical semi-toroidal. The reference numeral 503'-1 designates an aspherical columnar lens which forms a part of the second-direction light-deflecting means 503'. The h–θ relation and the k–φ relation are as shown in the aforementioned expressions (38) and (39). Accordingly, the principle of the operation thereof is the same. In this example, however, the semi-toroidal light-reflecting means 505/505' in FIG. 55A cannot exhibit its effect. The explanation of FIGS. 57A and 57B have been finished.

FIGS. 55A and 55B are suitable for a relatively large-size optical system because the Fresnel sheet is lightweight whereas FIGS. 57A and 57B are suitable for a relatively small-size optical system.

In FIGS. 57A and 57B, the angle (±εy in the latitudinal direction, ±x in the longitudinal direction) of divergence of light in the input surface of the panel 3 is given by the following expression. The reason is based on the principle described above With respect to the expressions (9) and (9').

$$\sin\epsilon x \approx \epsilon x \approx \frac{\pi a \cos\theta}{X} \quad (41)$$

$$\sin\epsilon y \approx \epsilon y \approx \frac{2a \sin\theta_M}{Y\cos\theta}$$

in which a is the radius of the light-emitting portion of the light source 1, and X, Y, $\theta_M$ and θ are as shown in FIGS. 57A and 57B.

As is understood from the factor of cos contained in the above expression, it is found that εx decreases and εy increases as the latitude increases compared with the equatorial region (θ0). Accordingly, when the latitude ($\theta_M$) of limitation of use is 45°, the increasing rate of εy can be limited within about 1.42. The description of the angle of divergence has been finished.

A specific numerical value of the divergence angle will be described below. When the radius a of the light source is 1.5 mm and the value of the width X in the expression (41) is 270 mm, the value of εx becomes 0.017 rad (equivalent to ±1°) in θ=0. When the value of Y is 110 mm and the value of $\theta_M$ is 45°, the value of εy becomes 0.019 rad. That is, collimator output with very good parallelism is obtained. When the angle of divergence of the output of the Fresnel lens is to be obtained by using the expression (9) and (9'), attention should be paid as follows. That is, it is necessary to pay attention not to the macroscopic area of the output surface of the Fresnel lens but to the sum of microscopic effective output areas. That is, because the latter becomes smaller than former, the angle of divergence becomes larger. If attention is paid to only this fact, a suitable collimator can be formed easily by using the Fresnel lens. As is understood from the above description, the expressions (9) and (9') can be applied also to an optical system containing such a Fresnel lens and are wide in the range of application.

Figure 58:
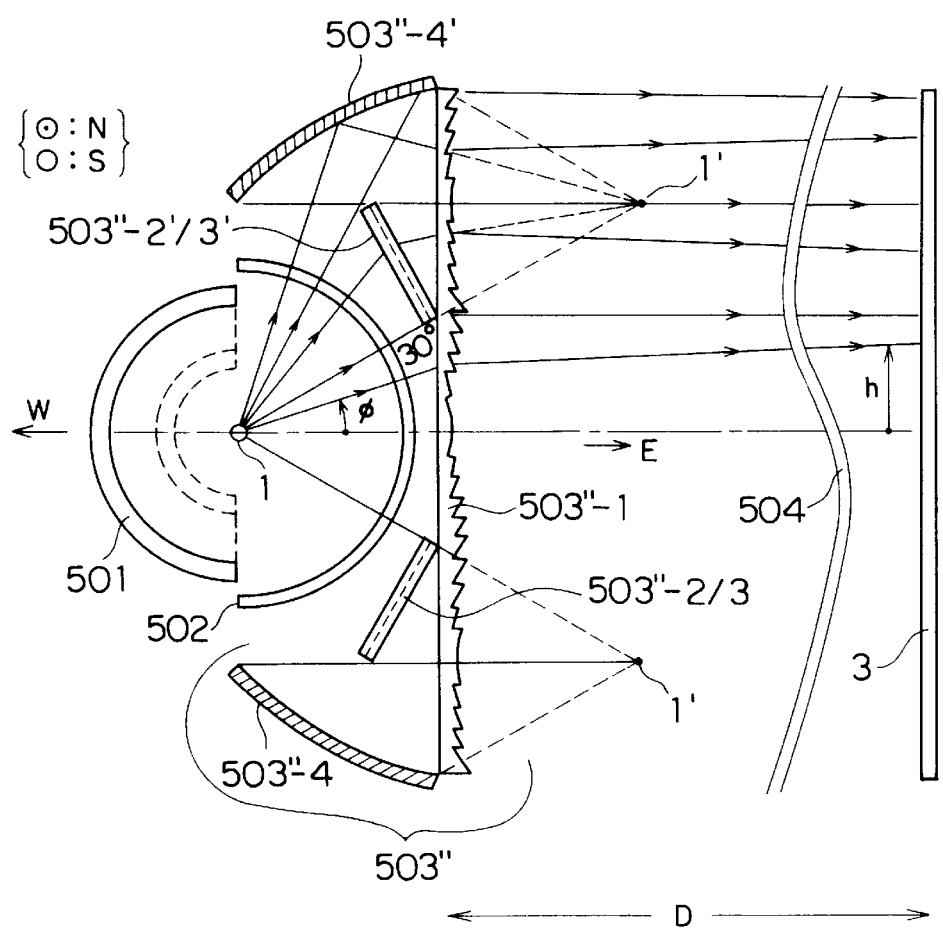
FIG. 58 is a schematic optical structural sectional view showing a further modified example of the embodiment of FIG. 54.

A further modified example of FIG. 54 is shown in FIG. 58 (sectional view taken in the equator).

A point of difference of FIG. 58 from FIGS. 55A and 55B is only the constituent elements of a second-direction light-deflecting means 503", while the others are the same. The Fresnel sheet 503"-1 and the Fresnel sheet pairs 503"-2/3 and 503"-2'/3' are obtained by slightly modifying corresponding elements in FIGS. 55A and 55B. The main point of difference is in that arc-cylindrical light-reflecting means 503"-4 and 503"-4' are added. In this example, the arc of the arc-cylindrical light-reflecting means is an elliptic arc having the light source 1 and its image 1' as focal points. The angle of deflection of the second-direction light-deflecting means 503" is set so as to substantially satisfy the φ–k relation in the expression (39) in the same manner as in FIGS. 55A and 55B. Accordingly, the illuminance of light incident to the panel 3 is made uniform and improved. The explanation of the configuration and operation of FIG. 58 has been finished and a modified example will be described below.

In FIG. 58, when the running distance D is sufficiently large compared with the panel size, only a portion of the Fresnel sheet 503"-1 within the latitude range of about ±30° may be used and the residual portion may be removed. In the case, the output light of the Fresnel sheets 503"-2/3 and 503"-2'/3' and the arc-cylindrical light-reflecting means 503"-4 and 503"-4' is directly transmitted toward the panel 3 instead of the image position 1'. Of course, in this case, the illuminance of the input surface of the panel can be made uniform and improved by satisfying the –k relation in the aforementioned expression (39).

Figure 59A:
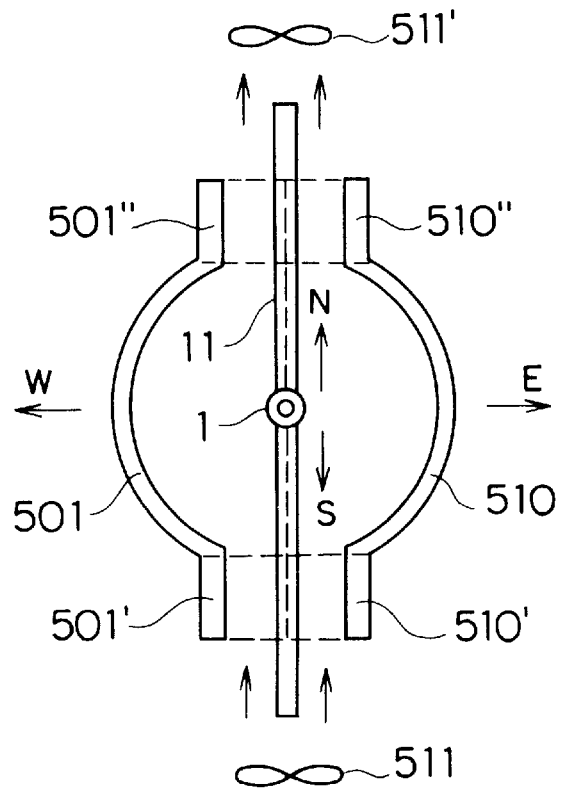
FIGS. 59A and 59B are a schematic longitudinal sectional view and a schematic transverse sectional view for aiding the heat dissipation means of the light source in the present invention.
Figure 59B:
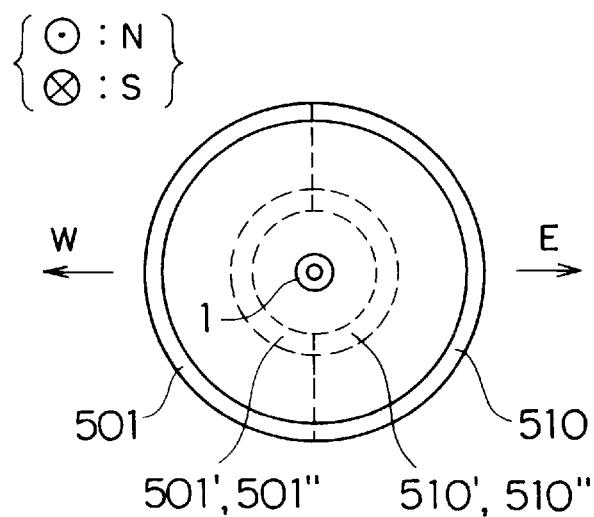

Generally, a large-light-output light source generates a great deal of heat attendantly. An embodiment of the present invention for improving heat dissipation from the light source is shown in FIGS. 59A and 59B. In the drawings, FIG. 59A is a front sectional view, and FIG. 59B is a sectional view taken in the equator.

In FIGS. 59A and 59B, the reference numeral 1 designates a light source; 11, a stem of the light source; 501, a semi-spherical light-reflecting means disposed in the western hemisphere; 501' and 501", semi-cylindrical portions formed integrally with the means 501 and disposed at the south and north ends respectively; and 510, a semispherical light-transmitting means disposed in the eastern hemisphere for transmitting visible light and absorbing or reflecting at least one part of infrared rays. The reference numerals 510' and 510" designate semi-cylindrical portions formed integrally with the means 510 and disposed at the south and north ends. The reference numerals 511 and 511' designate air blowers.

Air-passing opening means are formed in high-latitude regions (in the inside of the semi-cylindrical portions 501', 501", 510' and 510") at the south and north ends of the semispherical light-reflecting means 501 so that the light source means 1 can be looked over linearly. Accordingly, air can be made to flow efficiently. Accordingly, heat generated from the light source 1 can be dissipated efficiently.

The explanation of the basic configuration and operation of FIGS. 59A and 59B has been finished and supplementary items will be described below.

In FIGS. 59A and 59B, it is recommended that the semispherical light-reflecting means 501 is formed so as to reflect mainly visible light and transmit infrared rays. Such a characteristic can be realized, as well known, as a so-called cold mirror by forming dielectric thin films different in refractive index in the form of a multilayer. By the cooperative action of the cold mirror 501, the cold filter 510 and the air blowers 511 and 511', visible light components useful as an output thereof can be extracted efficiently in the eastern hemisphere.

The cold mirror 501 and the cold filter 510 may be formed integrally with each other. By this measure, simplification in structure can be attained.

The explanation of FIGS. 59A and 59B has been finished.

Figure 60A:
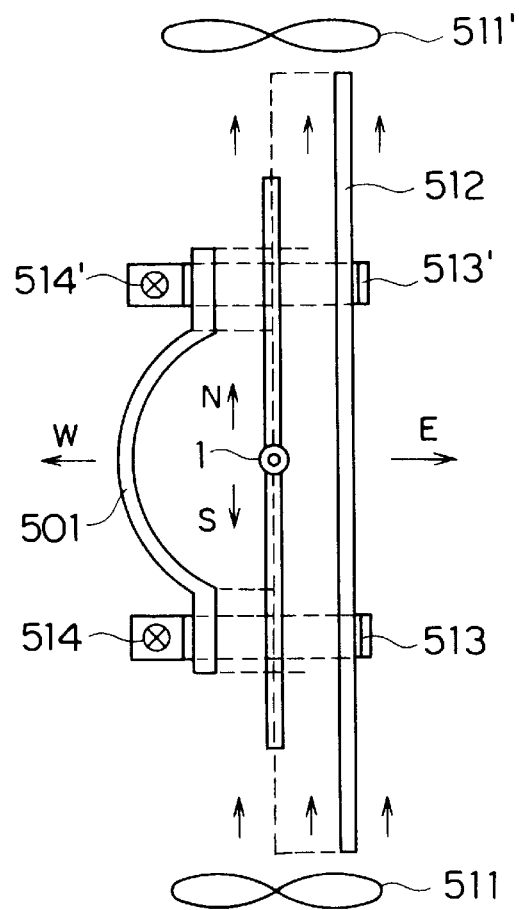
FIGS. 60A and 60B are a longitudinal sectional view and a transverse sectional view respectively for explaining a further example of the heat dissipation means of the light source in the embodiment of the present invention.
Figure 60B:
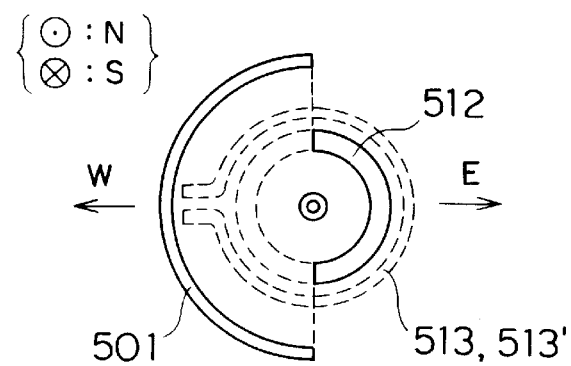

A modified example for improving heat dissipation is shown in FIGS. 60A and 60B.

In FIGS. 60A and 60B, a semi-cylindrical cold filter 513 is used instead of the semispherical cold filter 510 in FIG. 59. The others are the same as in FIGS. 59A and 59B and omitted for simplification of the drawings.

In FIGS. 60A and 60B, the reference numerals 513 and 513' designate connection supporting members. The reference numerals 514 and 514' designate screws which are shown only in the front sectional view (FIG. 60A) and not shown in the equatorial sectional view (FIG. 60B). The cold mirror 501 and the semi-cylindrical cold filter 512 can be connected and supported by the connection supporting members 513 and 513' and the screws 514 and 514'. Of course, this supporting method can be applied to FIGS. 59A and 59B.

The semi-cylindrical cold filter is parallel to the air blowing path. Accordingly, heat dissipation can be achieved more efficiently compared with FIGS. 59A and 59B.

As the material for the cold filter 512, there can be used a so-called heat-absorbent glass material or a general glass material coated with an infrared-ray reflecting film on its surface. As an example of the latter, there can be used a multilayer film type material or an ITO (indium/tin oxide) film.

Figure 61:
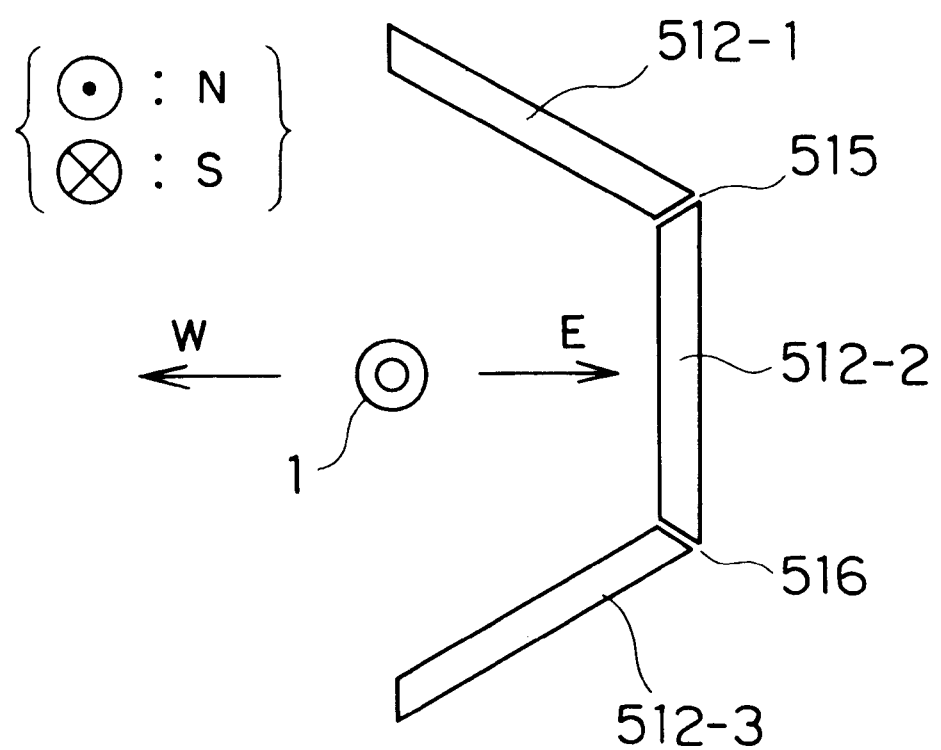
FIG. 61 is a schematic sectional view showing a partly modified example of FIG. 60.

FIG. 61 shows a modified example for preventing heat stress destruction of the cold filter 512 in application to large light output. FIG. 61 is an equatorial sectional view of the cold filter. The reference numerals 512-1, 512-2 and 512-3 designate slender flat-plate-like cold filter members respectively. These are arranged in the form of a polygon approximating a semi-cylinder as shown in FIG. 61. In inter-contacting sides designated by the reference numerals 515 and 516, independent and free heat-stress deformation is allowed so that heat-stress destruction can be prevented.

In the above description, the cold mirror 501 and the cold filter 510, 512 are generally named as "light-reflecting means" and "light-transmitting means" respectively.

A second aspect-ratio reducing method, which has been promised above in connection with FIG. 55 and the expression (40) so as to be described later, is shown in a part of FIG. 62.

Figure 62:
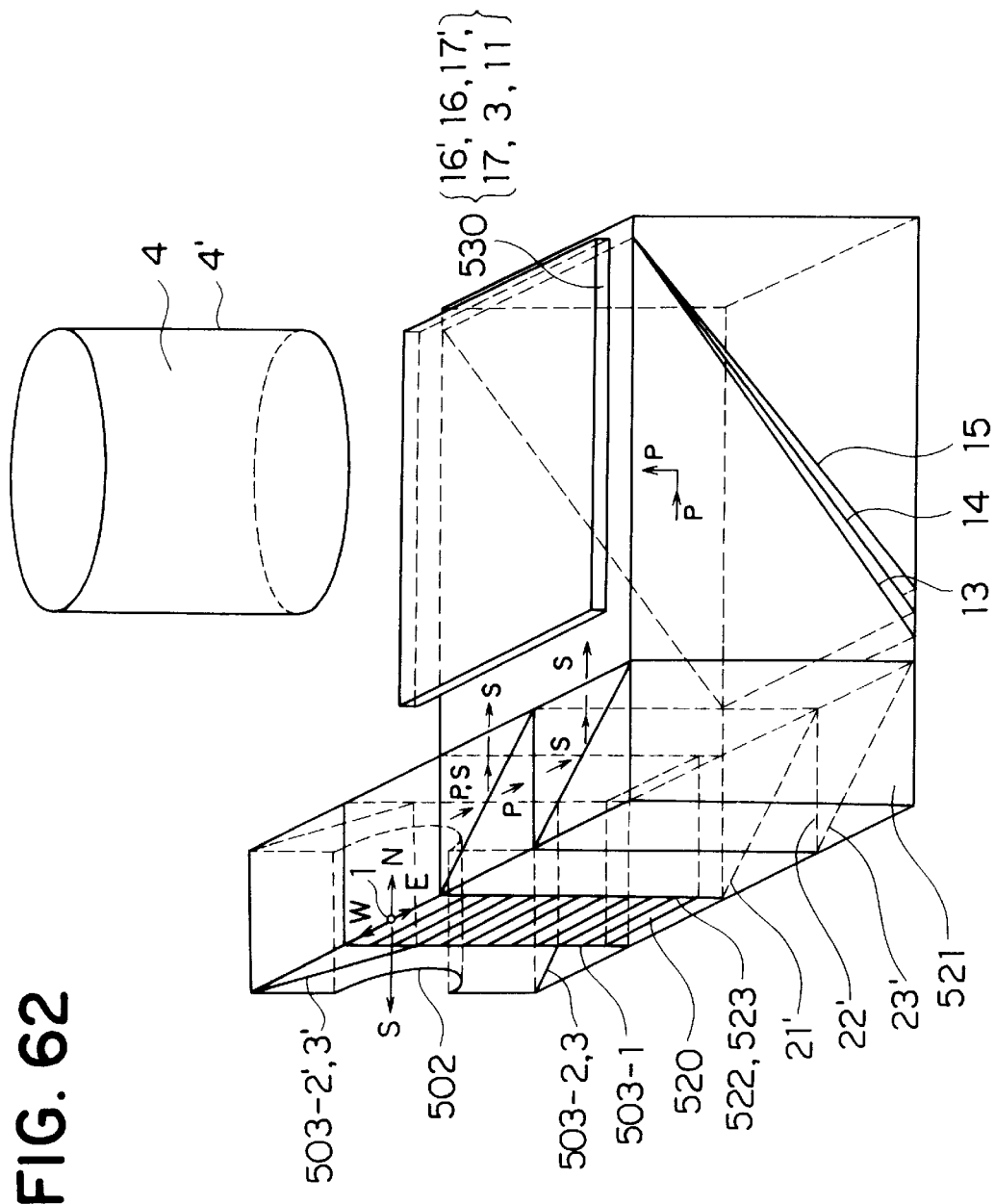
FIG. 62 is a schematic optical structural view of a further embodiment of the present invention.

FIG. 62 is a perspective view corresponding to a portion following the aforementioned collimator means (FIGS. 54 to 61) of the projection type liquid crystal display unit according to the present invention. In FIG. 62, the expression of thicknesses of various types of thin plate members is omitted for the purpose of simplification of drawing. Further, the case of FIG. 62 includes the case where sections of a plurality of thin plate members arranged adjacently are collectively expressed as a single solid line. The configuration and operation of FIG. 62 will be described along the path of travelling of light.

The reference numeral 1 designates a light source. A spherical light-reflecting means 501 as described above in FIG. 55 is disposed in the eastern hemisphere of the light source 1. The means 501 is, however, not shown in FIG. 62 for avoiding complex of expression. The cold filter 512 in FIG. 60 is also omitted in the same manner as described above. The reference numeral 502 designates the aforementioned first-direction light-deflecting means for deflecting light in a latitude-reducing direction (see FIG. 55). The reference numerals 503-1, 503-2/503-3, 503-2'/503-3' designate elements of the aforementioned second-direction light-deflecting means for deflecting light in a longitudinal-divergence reducing direction (see FIG. 55). Accordingly, substantially collimated light is obtained as the output of the Fresnel sheet 503-1. The reference numeral 520 designates means invented and named "direction regulator" by the present inventor. The object of the direction regulator is to remove parasitic harmful light which is not collimated. The structure of the direction regulator is so simple that a large number of black and smooth-surface rectangular sheets are arranged in parallel to each other in the form of shelves. The principle thereof is based on the property that a sheet which looks black in observation from a normal direction reflects light like a mirror in observation from a tangential direction (incident angle of 85° or larger). Generally, the reflectivity at the boundary between a sheet of refractive index n and air is given by the following expression for P wave and S wave respectively.

$$Rp = \frac{\tan 2(\alpha n - \alpha_1)}{\tan 2(\alpha n + \alpha_1)} \quad (42)$$

$$Rs = \frac{\sin 2(\alpha n - \alpha_1)}{\sin 2(\alpha n + \alpha_1)}$$

in which

Rp: P-wave reflectivity,

Rs: S-wave reflectivity, $\alpha_1$: air-side input angle, and $\alpha n$: sheet medium side output angle.

$$n \sin dn = \sin \alpha_1 \quad (43)$$

(Snell Laws of Refraction)

Approximate solutions are obtained by using the sin e $\theta(0.5\pi - \alpha_1)$ of $\alpha_1$ as a substitute of $\alpha_1$ in the case where $\alpha_1$ is sufficiently near to $0.5\pi$, and the following expressions are obtained from the expressions (42) and (43).

$$\ln Rp \approx \frac{-n^2 4\theta}{\sqrt{n^2-1}}, \quad \ln Rs \approx \frac{-4\theta}{\sqrt{n^2-1}} \quad (44)$$

∴ In the case of $n$ 1.5, (45)

$$\ln Rp \approx -8\theta, \ln Rs \approx -3.6\theta$$

∴

$$20 \log Rp \approx -70\theta \text{ [dB]}$$

$$20 \log Rs \approx -31\theta \text{ [dB]}$$

When the pitch of arrangement of direction-regulator sheets is d and the length of each direction-regulator sheet, that is, the running distance is l, the average number of times of reflection, in the direction regulator, of light having an inclination of longitude θ rad is equal to lθ/d. Whenever reflection is made once, attenuation shown by the expression (44) is brought. Accordingly, the total attenuation quantities Gp(θ) and GS(θ) are given by the following expression.

$$Gp(\theta) \approx 70\theta l\theta/d = \frac{70l}{d}\theta^2 [dB] \quad (46)$$

$$Gs(\theta) \approx 31\theta l\theta/d = \frac{31l}{d}\theta^2 [dB]$$

∴ In the case of d=6 mm and l=100 mm, $$Gp(\theta) \approx 1170\theta^2 \text{ [dB]}$$

$$Gs(\theta) \approx 520\theta^2 \text{ [dB]} \quad (47)$$

θ: [rad]

Figure 63:
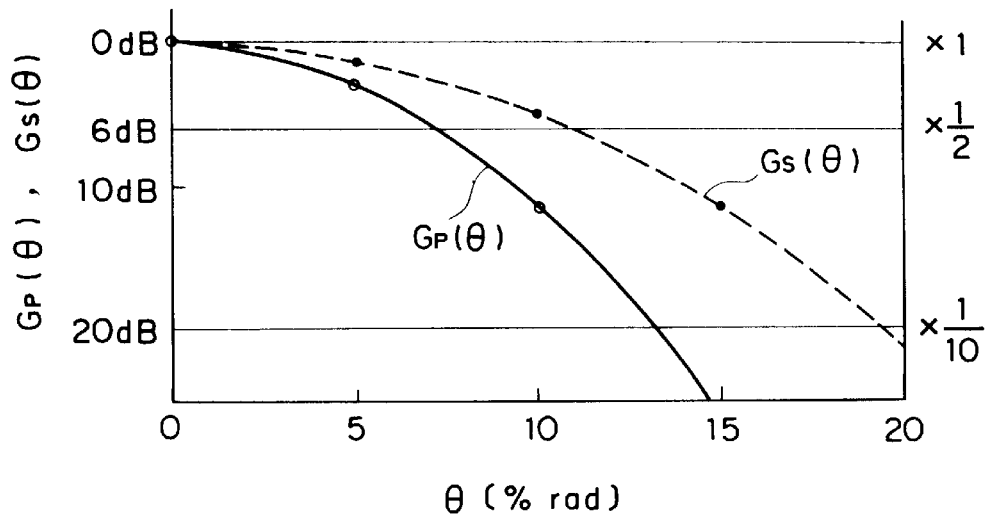
FIG. 63 is a graph for explaining the principle of the direction regulator in the embodiment of the present invention.

The expression (47) is plotted in FIG. 63. It is apparent from FIG. 63 that parasitic harmful light components at the longitude of about 0.1 rad or higher in the numerical value example of the expression (47) can be attenuated to about 0.5 times or less.

Further, as described above, the surface of the black thin plate is required to be not a light diffusing mat surface but to be a smooth surface which can reflect light, because a mat surface reflects light while diffusing it so as to be against the purpose of the direction regulator.

Large-latitude harmful light can be removed when the direction of arrangement of the direction regulator is selected to be in the form of vertical shelves.

In this embodiment, the direction of arrangement of the direction regulator is selected to be a direction of removing large-longitude harmful light in order to prevent crosstalk interference between three primary colors, that is, color-purity deterioration interference in the following three-direction means (13, 14, 15 . . . similar to parts shown in FIG. 22). Incidentally, the direction regulator sheets need not be perfect black, so that semitransparent sheets having the light transmittivity of about 50% or less can be used as a substitute.

The explanation of the direction regulator 520 in the present invention has been finished.

The principle of the direction regulator can be applied to the light-guiding wall means 506-1, 506-2, 506-3 and 506-4 in FIG. 55. That is, black or semitransparent flat plate means having smooth surfaces are used for the light-guiding wall means. This is because only effective light collimated sufficiently is reflected or guided by the aforementioned means so that parasitic harmful light (light with the value of of about 0.1 rad or larger) collimated insufficiently can be absorbed or eliminated on the basis of the expression (45). Further, by the configuration of semitransparent light-guiding walls, the state of light propagation in the inside of the light-path box can be observed from the outside. Accordingly, there are merits in that not only abnormality of the optical system can be detected easily but also optimum regulation can be performed efficiently. The explanation of the direction regulator type light-guiding wall means 506-1, 506-2, 506-3, 506-4 . . . see FIG. 55) according to the present invention has been finished. The direction regulator type light-guiding wall means are used in upper and lower inner walls and left and right inner walls in respective blocks in FIG. 62. Incidentally, in the light-path wall of a tank 521, a transparent material having a refractive index smaller than that of liquid in the tank is used in the inner wall portion so that light is guided by utilizing a so-called total reflection phenomenon of light.

In FIG. 62, the reference numeral 521 designates a liquid-enclosure tank for polarized beam splitter. A polarized beam splitter 21', a half-wavelength phase difference plate 22' and a mirror 23' are inserted in the liquid in the tank. The operation of the parts 21' to 23' is as described above with reference to FIG. 28. In FIG. 62, the arrows showing light rays of P wave and S wave are shown only in the uppermost portion for convenience of drawing. As is understood from FIG. 62, the aspect ratio K (expression (40)) can be reduced to half by the action of the parts 21' and 23'.

Further, parts 522 and 523 are inserted in the liquid along the input side wall of the tank 521. The reference numeral 522 designates a quarter-wavelength phase difference plate which is disposed so that the light-anomaly axis thereof is inclined by 45° from the south-north direction (with the east-west direction as its axis). By this measure, the south-north direction deflection of the polarization plane of input light caused by the first/second-direction light-deflecting means can be made uniform by circular polarization. By this measure, evenness of gradient on the reproduced image can be prevented from being obstructed.

The part 523 provided together with the part 522 is a multilayer film filter plate for improving color purity. The filter plate 523 reflects orange-color components in the light-emitting spectra of the metal halide light source 1 to thereby stop the orange-color components. Thus, particularly, the color purity of red and green primary colors can be improved.

The explanation of the inside of the tank 521 has been finished.

As known well, P wave means a component in which the direction of an electric field component of light wave is parallel to a plane containing the vector of the direction of travelling of the input/output light thereof. S wave means a component in which the direction of an electric field component of light wave is perpendicular to the plane. Accordingly, S wave (see FIG. 62) outputted from the tank 521 means a component in which the direction of electric field thereof is perpendicular. Being defined from a point of view of dichroic mirrors 13, 14 and 15, this component is P wave. Accordingly, this component is shown as P wave in FIG. 62. Incidentally, in this example, the reference numerals 13, 14 and 15 designate blue, green and red reflection dichroic mirrors respectively, which are generically called "three-direction means" in the present invention. A multi-layer film is formed in the front side of each of the dichroic mirrors, and a glass plate is exposed to the air in the rear side thereof.

Compared with the embodiment described with reference to FIGS. 27 and 28, the embodiment shown in FIG. 62 has a merit that the efficiency of use of S wave and P wave is very good. The reason is as follows. The mirrors 23 and 23' both in FIGS. 27 and 28 and in FIG. 62 are used for reflection of S wave, so that highly efficient reflecting characteristic is obtained on the basis of the principle shown in FIG. 41 and the expression (42). On the other hand, the dichroic mirrors in FIGS. 27 and 28 are used for reflection of S wave, so that non-dichroic harmful reflection of about 5% or more is generated in the rear surface of the glass substrate. The dichroic mirrors in FIG. 62 are used for reflection of P wave, so that the harmful reflection can be reduced to be 1% or less (see FIG. 41). As is understood from the above description, the configuration shown in FIG. 62 has a peculiar merit that improvement of light utilization can be attained by forming the polarized beam splitter mirror 23' as an S wave reflection mirror and forming the three-direction dichroic mirrors 13, 14 and 15 as P wave reflection mirrors.

The following parts 16', 16, 17', 17, 3 and 11 are the same as those described above with reference to FIGS. 25 and 26A. These are generically called "liquid crystal panel assembly" 530. The reference numeral 4 designates a projection lens; and 4', a cylinder for housing the projection lens. Light reflected by the three-direction means 13, 14 and 15 is inputted to the liquid crystal panel assembly 530. Further, the output light of the liquid crystal panel assembly is transmitted to the following black stripe type screen through the projection lens 4, so that a beautiful large image is formed on the screen. The basic explanation of FIG. 62 has been finished. In the case where a liquid crystal panel with the effective diagonal length of 33 cm is used, the schematic size of the optical system shown in FIG. 62 is 50 cmW×50 cmD×30 cmH except the projection lens portion. The angle between adjacent dichroic mirrors 13, 14 and 15 is about 2° and, accordingly, the angle between the light outputs thereof is about 4° Accordingly, a large part of light can be projected by using the effective F value of the projection lens 4 of about F/3.8.

Figure 64:
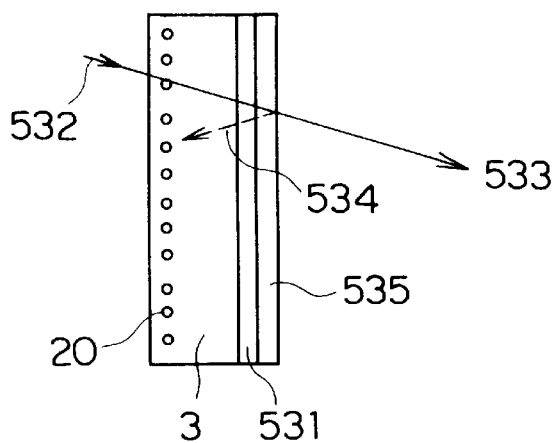
FIG. 64 is a schematic sectional view showing the contrast ratio improvement means at the light output portion of the panel.

A slightly modified example of the liquid crystal panel light-output portion will be described below. FIG. 64 shows the liquid crystal panel 3 and the output portion thereof. In FIG. 64, the reference numeral 20 designates pixels; 531, a well-known output side polarization plate; 532, input light; 533, output light; and 534, harmful reflected light. In the applied field in which large light output is required, there arises a problem that the reflected light excites a pixel-forming semiconductor element to thereby degrade the contrast ratio of the reproduced image. This problem is eliminated by sticking a quarter-wavelength phase plate designated by the reference numeral 535 integrally. The quarter-wavelength plate 535 and the polarization plate 531 are stuck integrally with each other so that the direction of the light-anomaly axis of the quarter-wavelength plate 535 is inclined by 45° with respect to the direction of the light-anomaly axis of the polarization plate 531. By this measure, the plane of polarization of the reflected light 534 can be rotated by 90°. (Light makes a reciprocating motion in the quarter-wavelength plate to thereby substantially serve as a half-wavelength phase plate.) Accordingly, the reflected light 534 can be absorbed and eliminated by the polarization plate 531. Accordingly, the degradation of the contrast ratio can be prevented. The explanation of FIG. 64 has been finished.

A modified example of the moiré disturbance reducing means is shown in FIG. 65. Moiré disturbance generated between a Fresnel lens and a lenticular lens in a so-called black stripe type screen has been already described in detail in U.S. Pat. No. 4,725,134 of the present inventor. According to the U.S. Patent, moiré disturbance in the form of CRT projection can be overcome. In a projection type liquid crystal display unit, however, novel intensive moiré disturbance is generated by interference between the pixel arrangement of the liquid crystal panel and the black stripe arrangement of the screen.

In FIG. 65, the reference numeral 3 designates a liquid crystal panel; 20, pixels in the liquid crystal panel; 4, a projection lens; and 5, a black stripe type screen.

The reference numeral 536 designates a transparent plate; and 537, a horizontally light-diverging meas for diverging light at least horizontally to reduce moiré disturbance. The transparent plate 536 may be used together with the Fresnel sheet 11 shown in FIG. 26A.

Figure 66:
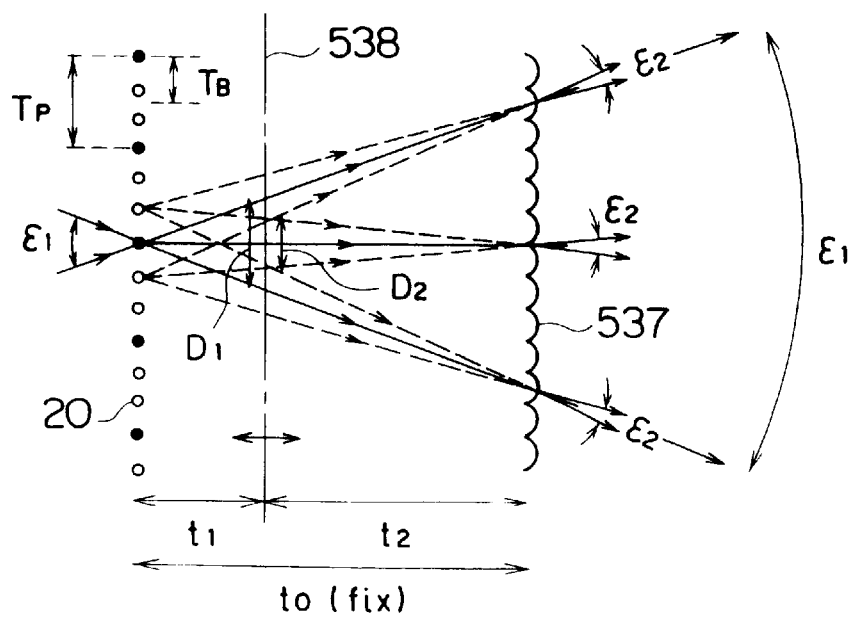
FIG. 66 is a light path view for explaining the principle of FIG. 65.

FIG. 66 shows the principle of the operation thereof. In FIG. 66, the reference numeral 20 designates pixels in the liquid crystal panel, in which the black circles are green pixels with the arrangement period of Tp. The reference numeral 537 designates a horizontally light-diverging means in which the arrangement period TL of lenticular lenses is selected to be smaller than the arrangement period Tp of the green pixels. The reference numeral 538 designates a conjugate plane of the projection lens (panel side image-forming plane in the case where light is traced reversely starting from the screen). $\epsilon_1$ is an angle [rad] of divergence of input light, $\epsilon_2$ is an angle [rad] of divergence of light of the horizontally light-diverging means 537. $t_0$ is the distance between the pixel plane and the light-diverging means 537. In a specific example which will be described later, there shown the case where the value of $t_0$ is selected to be 3 mm. $t_1$ is the distance of the conjugate plane measured from the pixel plane, and $t_2$ is the distance of the conjugate plane measured from the light-diverging means. The position of the conjugate plane can be finely controlled by a well-known focusing mechanism of the projection lens and, further, has a slight spread (about 0.2 mm to 1 mm) caused by the image surface aberration of the projection lens in dependence on the position (center/periphery) on the screen.

Figure 67:
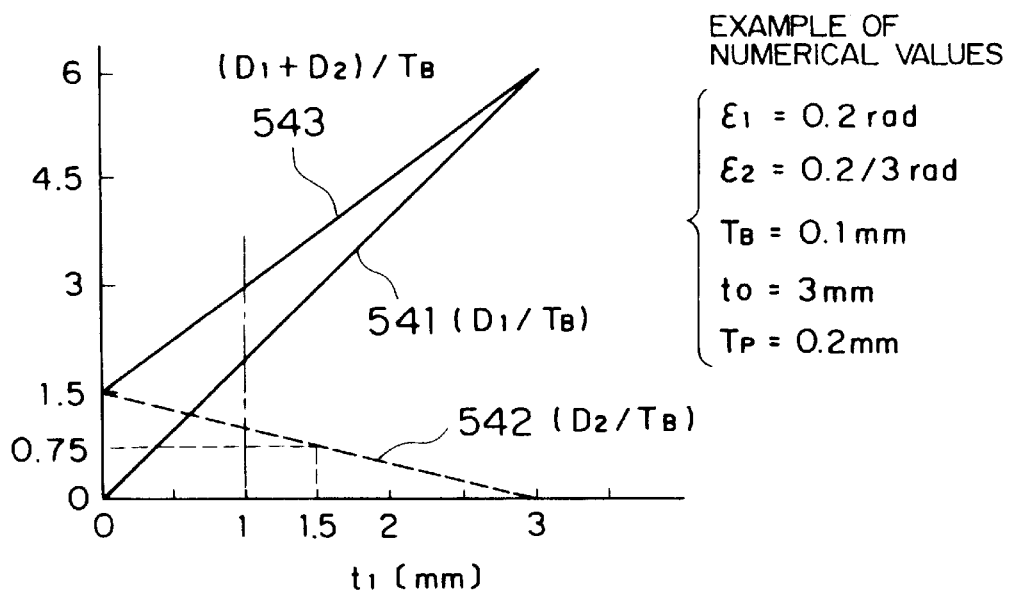
FIG. 67 is a graph for explaining the principle of FIG. 66.

In FIG. 66, the arrow-headed solid lines show paths of light rays respectively. The arrow-headed dotted lines show a light-divergence range (half-value angle) of the light-diverging means 537 as expressed by extrapolation in the virtual image space side. $T_B$ is the value of the period of black stripe arrangement of the black stripe type screen 5 which is transformed into the liquid crystal panel 3 side taking into account the magnification of the projection lens 4. In FIG. 66, $D_1$ and $D_2$ are spreads (half-value widths) of horizontal spot size caused by the divergence angles $\epsilon_1$ and $\epsilon_2$ respectively. The values of $D_1$ and $D_2$ depend on the position ($t_1$) of the conjugate plane. The pattern of dependence is shown in FIG. 67. In FIG. 67, the reference numerals 541 and 542 designate graphs of the values of $D_1/T_B$ and $D_2/T_B$ calculated on the basis of practical numerical value examples described additionally in FIG. 67. The reference numeral 543 designates the sum of the two values. The values of $D_1$ and $D_2$ are equal to $\epsilon_1 t_1$ and $\epsilon_2 t_2$ respectively.

The relation between the spot size and the frequency response is shown in the following expression.

$$G_1(f) = S(D_1 f) \tag{48}$$
$$G_2(f) = S(D_2 f)$$
$$S(x) = \frac{\sin \pi x}{\pi x}$$

$$D_1 = \epsilon_1 t_1, D_2 = \epsilon_2 t_2 \tag{49}$$
$$G_{12}(f) = G_1(f) \cdot G_2(f)$$

$$G_{12}(0.5 fp) \geq 0.3, \quad fp = \frac{1}{Tp} \tag{50}$$

$$Gt(f) = G_1(f) G_2(f) G_3(f) \tag{51}$$

$$|Gt(fB)| \leq 0.01, \quad f_B = \frac{1}{TB} \tag{52}$$

$$G_3(f_B) \lesssim 0.1 \tag{53}$$

$$\therefore G_1(f_B) \cdot G_2(f_B) \leq 0.1 \tag{54}$$

Figure 68:
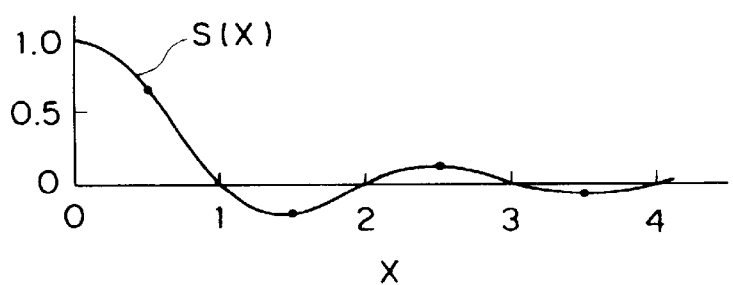
FIG. 68 is a graph for explaining the principle of FIG. 66.

In the aforementioned expressions, G1(f) and $G_2$(f) are frequency responses corresponding to the spot sizes $D_1$ and $D_2$ respectively. Here, f is spatial frequency [cycle/mm]. The form of S(x) is shown in FIG. 68. The frequency response is well-known as a gate spectrum corresponding to a rectangular distribution in the field of electrical engineering. The frequency response convolutely synthesized from $D_1$ and $D_2$ is given by the aforementioned expression (49) on the basis of the principle of convolution. It is recommended that the aforementioned expression (50) is satisfied to prevent defocusing of the reproduced image. Here, 0.5 fp is the maximum information frequency which can be restored by the pixel arrangement shown in FIG. 66 (Shannon's sampling theorem). The total frequency characteristic inclusive of the frequency characteristic $G_3$(f) of the projection lens is given by the expression (51). The recommended condition for reducing moiré disturbance is as shown in the expression (52). The thought thereof can be known by reference to the aforementioned U.S. Pat. No. 4,725,134.

The black stripe arrangement frequency $f_B$ is set to be not lower than about twice the general liquid crystal panel pixel arrangement frequency fp. That is, it is equivalent to a value of not smaller than about four times the maximum information frequency 0.5 fp. Generally, the value $G_3(f_B)$ of the response $G_3$(f) of the projection lens in the frequency $f_B$ is not larger than about 0.1. Accordingly, the condition for satisfying the condition for the expression (52) is substantially equivalent to the fact that $G_{12}$(f) is selected to be not larger than 0.1 as shown in the expression (54).

Figure 69:
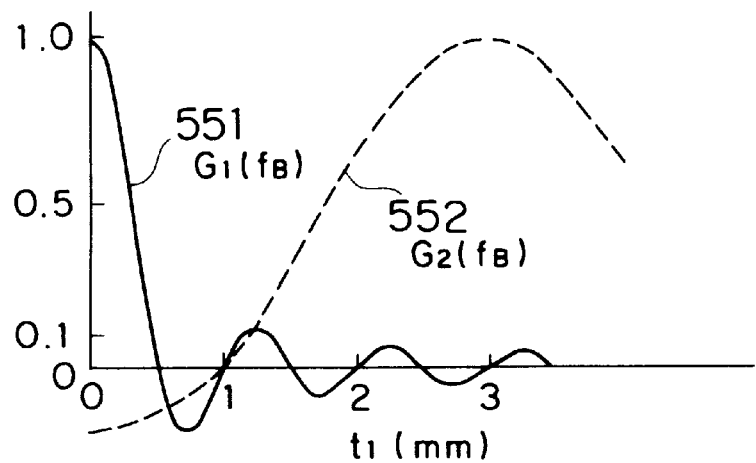
FIG. 69 is a graph for explaining the principle of FIG. 66.

Results of calculation of $G_1(f_B)$ and $G_2(f_B)$ on the basis of the aforementioned expressions in the numerical value example of FIG. 67 are shown in FIG. 69. In FIG. 69, the reference numeral 551 designates $G_1(f_B)$; and 552, $G_2(f_B)$. In FIG. 70, the reference numeral 553 designates the product $G_{12}(f_B)$ of $G_1(f_B)$ and $G_2(f_B)$. The reference numeral 554 designates $G_{12}$(0.5 fp).

It is apparent from the drawings that the region satisfying the expressions (50) and (54) is in a $t_1$ (pixel plane~conjugate plane) value range of from 0.3 to 1.5 mm. That is, it is proved that both prevention of focusing deterioration of the image (expression (50)) and reduction of moiré disturbance (expression (54)) can be made.

Particularly in the large-scale field in which the diagonal size of the liquid crystal panel is larger than about 15 cm, practical application of the present invention is characterized in that (1) a Fresnel sheet means is disposed in the light-output side of the liquid crystal panel 3, (2) a Fresnel lens surface is formed in the light-input side of the Fresnel sheet, and (3) at least a light-diverging means for diverging light horizontally is disposed in the light-output side of the Fresnel sheet means or in the inside of the Fresnel sheet, wherein the horizontal half-value width of a spot size on the reproduced image is set to be larger than 0.75 times the black stripe arrangement period of the black stripe screen by the light-diverging means. The "0.75 times" corresponds to the fact that the ratio $D_2/T_B$ in FIG. 67 corresponding to the upper limit 1.5 mm of $t_1$ in FIG. 70 is 0.75. In application to a small-scale projector in which the diagonal size of the liquid crystal panel is not larger than about 15 cm, the Fresnel lens may be removed and the aperture of the projection lens may be selected to be larger alternatively.

The explanation of FIGS. 65 to 70 concerning moiré disturbance reduction has been finished.

The present invention has been described mainly upon the optical system thereof. A well-known technique can be applied to an electric circuit system for driving the liquid crystal panel. Particularly as means for reducing luminance irregularity and color irregularity remaining on the reproduced image, it is effective that means described in U.S. Pat. Nos. 4,969,731, 5,355,187 and JP-A-5-310111 (all filed by the present inventor) is used.

A technique useful for application of the present invention to a multi-screen type display unit is as follows. The "multi-screen type display unit" means a display unit in which unit projectors are arranged in the upper and lower sides and in the left and right sides in the form of a matrix so that a huge superhigh definition image can be projected as a whole. In this application, it is required that geometric distortion in each image joint portion is adjusted finely and that continuity in the image joint portion is secured.

It is however impossible to move the pixel positions locally continuously because the material for the liquid crystal panel is stiff (glass plate).

Figure 71:
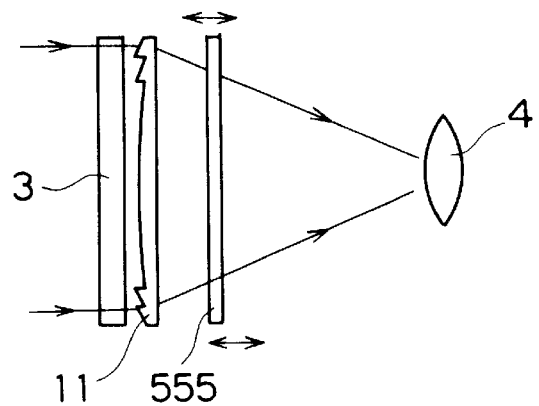
FIG. 71 is a schematic sectional view showing the basic structure of the geometrical distortion correction means.

FIG. 71 shows a geometric distortion compensating means in the present invention configured mechanically and optically.

In FIG. 71, the reference numeral 3 designates a liquid crystal panel; 11, a Fresnel sheet; and 4, a projection lens. These have been already described.

The reference numeral 555 designates a transparent flexible plate having a thickness of about 1 to about 3 mm. Respective peripheral portions of the transparent flexible plate are provided with a mechanism in which the respective peripheral portions can be bent independently.

Figure 72A:
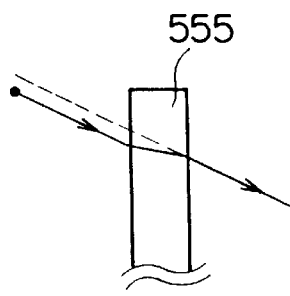
FIGS. 72A, 72B and 72C are light path views for explaining the optical principle of FIG. 71.
Figure 72B:
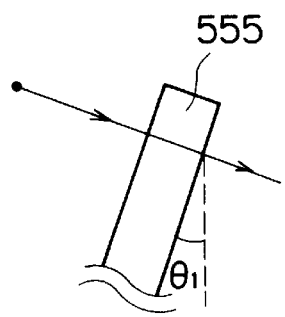
Figure 72C:
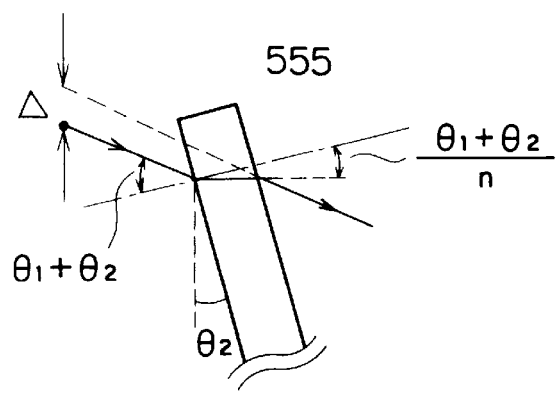

FIGS. 72A, 72B and 72C show the principle of the compensation. In the drawings, FIG. 72A shows a not-bent flat plate state, FIG. 72B shows a state in which the plate is bent convexly by an angle $\theta_1$ with respect to the liquid crystal panel surface, and FIG. 72C shows a state in which the plate is bent concavely by an angle $\theta_2$. In the drawing, Δ is a distortion correcting quantity. The magnitude of Δ is nearly proportional to the sum [rad] of ($\theta_1+\theta_2$) and given by the following expression:

$$\Delta(\theta_1 + \theta_2)\frac{n-1}{n}t \qquad (55)$$

in which t is the thickness of the transparent flexible plate, and n is the light-refractive index of the transparent flexible plate.

Accordingly, when the bending angle adjusting range ($\theta_1+\theta_2$) is about 0.45 rad, the thickness t is 2 mm and the refractive index n is 1.5, distortion correction of about 0.3 mm can be made. Because the magnitude of geometric distortion of the projection lens 4 is about 0.3 mm in the diagonal corner portions of the liquid crystal panel 3, distortion correction can be made by the aforementioned configuration.

Figure 73:
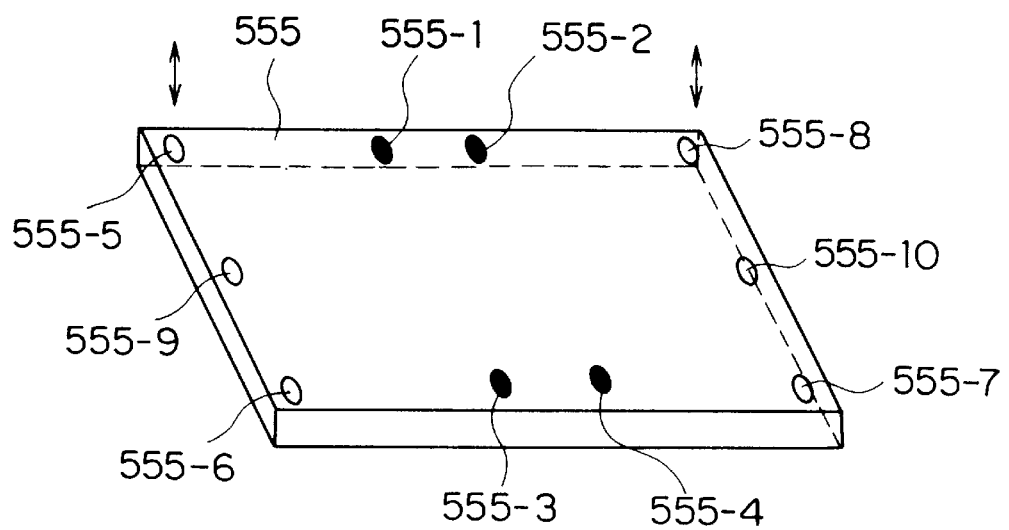
FIG. 73 is a schematic sectional view showing a specific example of the geometrical distortion correction means of FIG. 71.

Practically, as shown in the perspective view of FIG. 73, distortion correction can be realized by a mechanism in which four points 555-1, 555-2, 555-3 and 555-4 in the neighborhood of the central portion of the long side of the transparent flexible plate 555 are fixed and supported and six points 555-5, 555-6, 555-7, 555-8, 555-9 and 555-10 are adjusted finely in the direction of a normal line of the flexible plate 555. The explanation of application of the present invention to a multi-screen type display unit has been finished.

Figure 74:
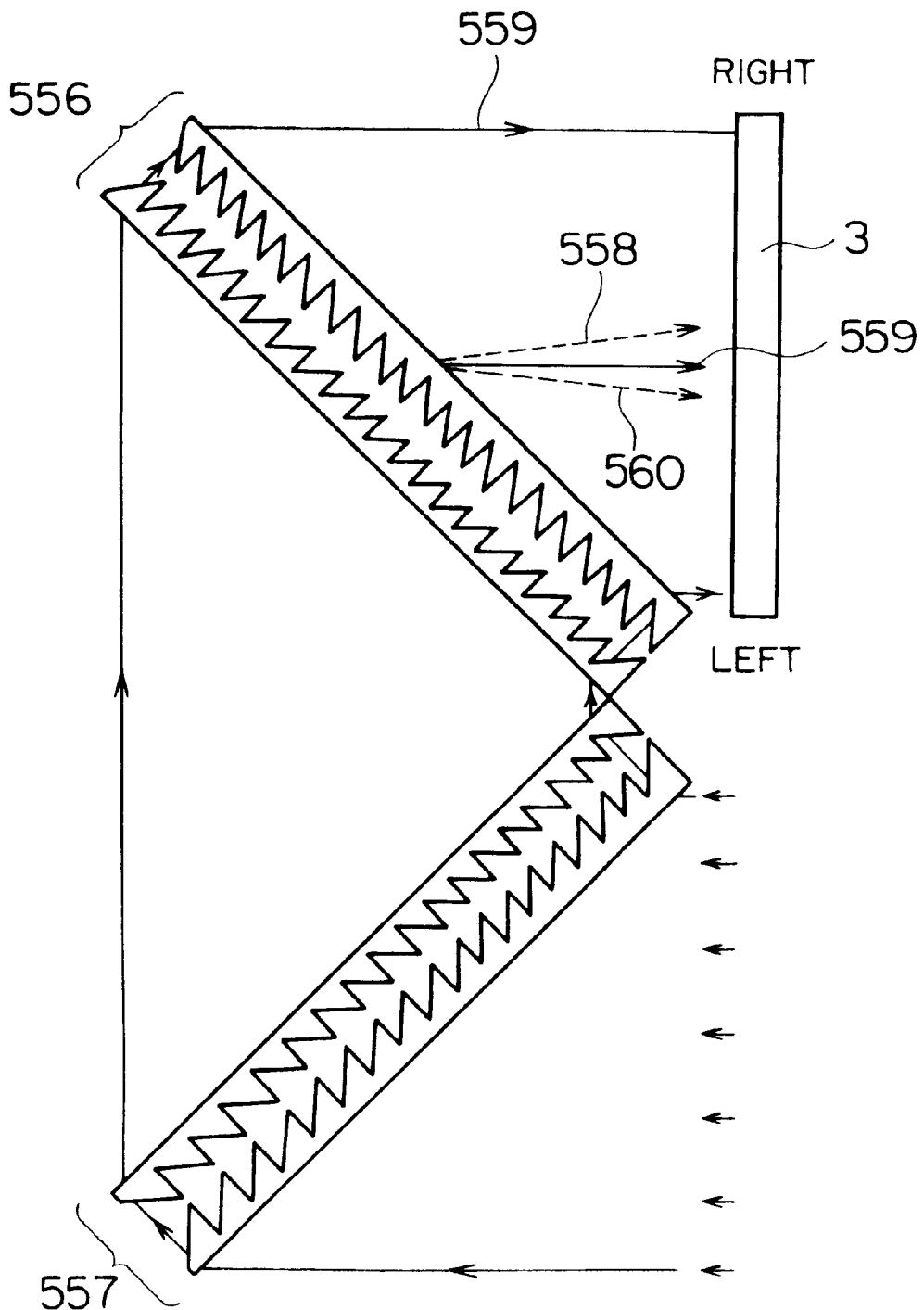
FIG. 74 is a schematic sectional view showing a modified example of the three-direction means which can be adapted to the present invention.

A substitute means for the three-direction means (13, 14, 15 in FIGS. 21 and 62 or 191, 192 in FIGS. 43 and 44 or 38, 192 in FIGS. 52 and 53) will be described below. In FIG. 74, the reference numeral 3 designates a liquid crystal panel; 556 and 557, prism means each using a pair of prism plates in combination so as to be mirror-symmetrical. As the material for the prism means, a material small in Abbe number, that is, large in color aberration, such as polycarbonate resin, polystyrene resin, or the like, is used in contrast to the case of the aforementioned parts 503-2 and 503-3 in FIG. 55. The prism angle of each prism sheet can be calculated on the basis of the aforementioned expression (17). The value of the prism angle becomes about 60° when the value of the refractive index of about 1.58 is substituted into the expression. In FIG. 74, the arrow-headed solid line 559 shows the direction of green light rays; 558, the direction of red light rays; and 560, the direction of blue light rays. The angle between respective adjacent colors is nearly equal (about 4°) to that in the specific numerical value example in FIG. 62.

Figure 75:
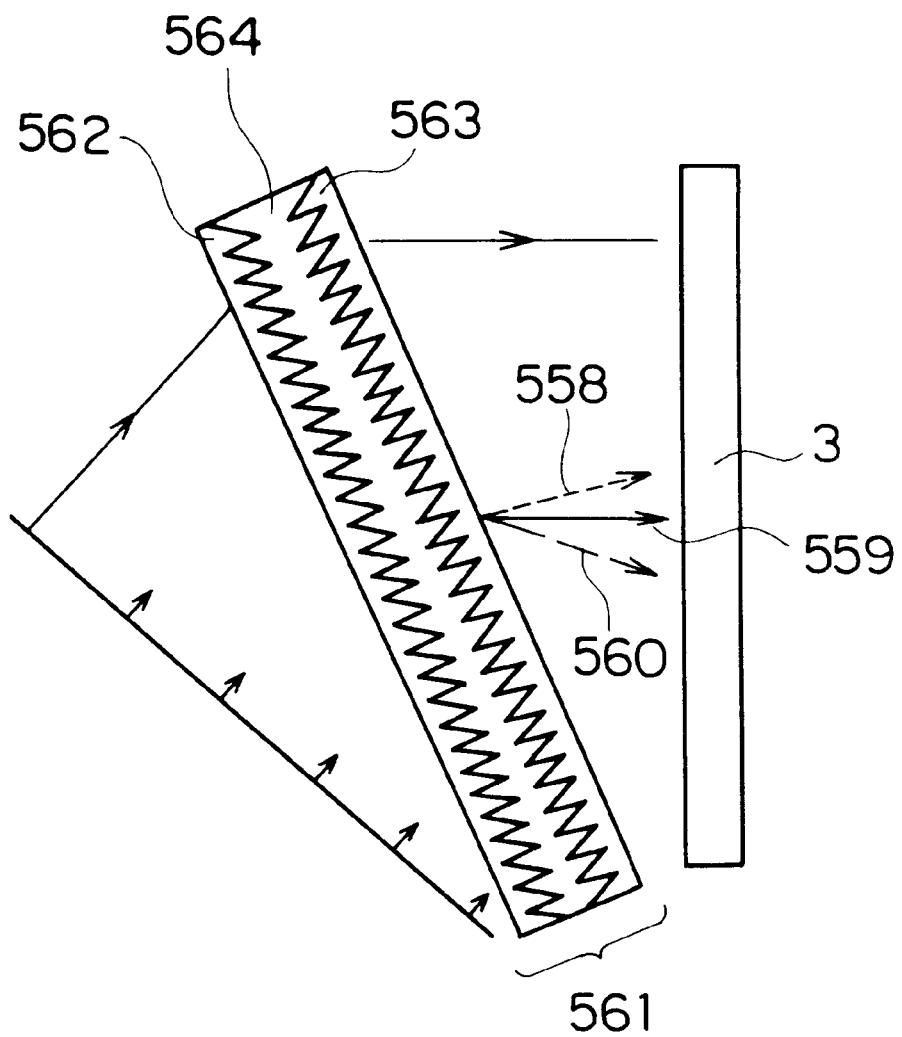
FIG. 75 is a schematic sectional view showing a modified example of the three-direction means depicted in FIG. 74.

The configuration of FIG. 74 can be formed at lower cost compared with the case of the dichroic mirror type in FIG. 62. The configuration of FIG. 74, however, has a disadvantage that the light path length is large. FIG. 75 shows a modified example in which the light path length is reduced. In FIG. 75, the reference numeral 561 designates a three-direction means; 562 and 563, prism means using a pair of prism plates in combination so as to be mirror-symmetrical; and 564, a medium filled between the two prism plates 562 and 563. As the material for the prism plates 562 and 563, a resin material small in Abbe number, such as polycarbonate resin or polystyrene resin, is used. As the filler medium 564, a resin material large in Abbe number, such as methacrylic resin or silicone resin, is used. Hence, color aberration can be emphasized by action just reverse to the action of the color aberration correcting lens. Accordingly, the three-direction means can be achieved in a relatively short light path length. As a practical forming method, an ultraviolet-curing method can be used.

As described in the opening, the starting point of the present invention was the discovery of the expressions (9) and (9') by the present inventor. This law can stand up in terms of differential calculus in arbitrary small areas $S_1$, $S_2$ on an optical path. Accordingly, the positional relation of this law relative to the with the Lagrange-Helmholtz law can be compared to the relation of the Faraday's law relative to the Maxwell's law in the electromagnetics. From the expressions (9) and (9'), the new concept "sinusoidal area" was introduced. By introducing this new concept, the inventor could exclude the ambiguous unit "per apparent area" which was needed in the conventional illuminating engineering but which was not suitable for the expression in the physics, and has succeeded in standardization of the unit system into "per actual unit area" which is suitable for architecture in the physics. Accordingly, the inventor would like to propose the following amendment in the International System of Units. That is, the symbol [sr] which is used for expression of "a solid angle" in the present unit systems should be changed into [$rad^2$]. This is because the content of the meaning of "a solid angle" is exactly [$rad^2$], and does not includes any new concept other than this expression [$rad^2$]. On the other hand, the unit of "sinusoidal area" which is a new concept should be newly added into the International System of Units. Although the unit [sr] is used in the beginning, it is reasonable to introduce a symbol [sa] in order to avoid ambiguity.

By the introduction of the new concept "sinusoidal area", the inventor has reached a concept "mutual exchange area" between the arbitrary faces $S_1$, $S_2$ on an optical path and a concept "self exchange area" of a light source face. Further, as described in the specification, the inventor has succeeded in quantification of the angle of divergence of collimator output light. As will be understood from the process of derivation, the obtained result is a very general one which is established in extremely wide application. In order to facilitate the understanding of this fact, the following Table shows the result of comparison among the various types of collimators already described in connection with FIGS. 5, 11, 19, 54 and 55.

In the Table, it is assumed that the light source is spherical with a radius of r and the losses of light reflection and transmission in the collimators are disregarded.

TABLE

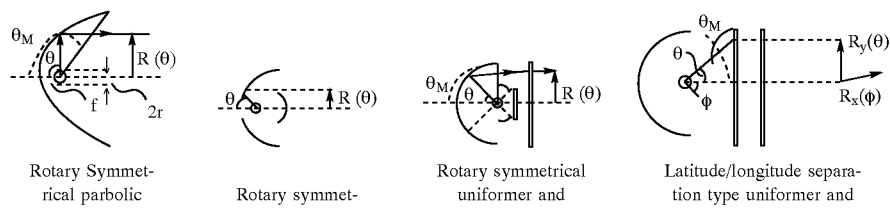

Rotary Symmetrical parbolic | Rotary symmet- | Rotary symmetrical uniformer and | Latitude/longitude separation type uniformer and

Figure 5:
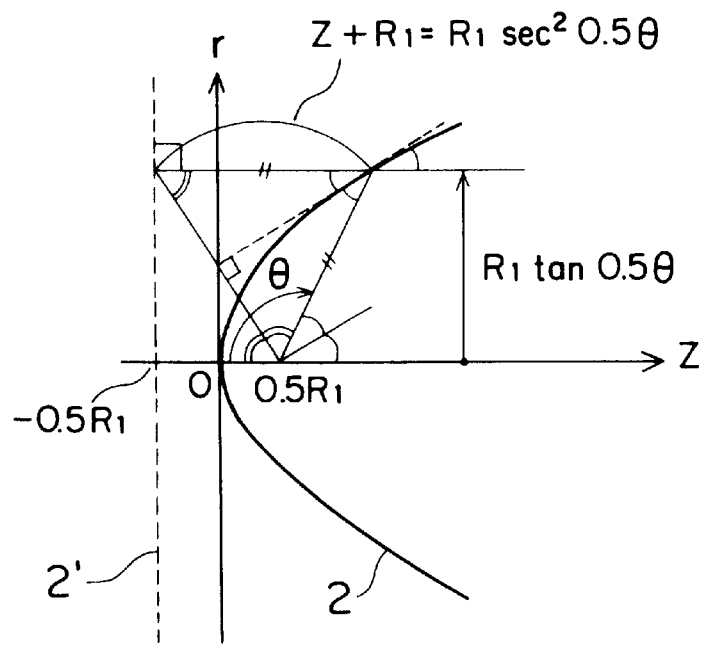
FIG. 5 is a graph for explaining the performance of the conventional liquid crystal display unit.

| Collimator type | mirror FIG. 5 | rical uniformer FIG. 11 | semispherical mirror FIG. 19 | semispherical mirror FIGS. 54, 55 |
|---|---|---|---|---|
| Sectional shape of output light | Circular | Circular | Circular | Rectangular |
| Collimator function $R(\theta)$ | $2f \tan 0.5\theta$ | $2f \sin 0.5\theta$ | $2f \sin 0.5\theta$ | $\begin{cases} R_x = f_x\phi \\ R_y = f_y\sin\theta \end{cases}$ |
| Utilization rate $E(\theta_M)$ | $\dfrac{2\sin^2\theta_M}{\pi}$ | $\dfrac{2\sin^2\theta_M}{\pi}$ | $\dfrac{2}{\pi}$ | $\sin\theta_M$ |
| Output illumminance $I(\theta)$ | $\dfrac{L\cos^4 0.5\theta}{4\pi f^2}$ | $\dfrac{L}{4\pi f^2}$ | $\dfrac{L}{2\pi f^2}$ | $\dfrac{L}{2(\pi f)_x f_y}$ |
| Output light divergence angle $\begin{cases} \sin\mathcal{E}_s(\theta) \\ \sin\mathcal{E}_m(\theta) \end{cases}$ | $\dfrac{r\cos^2 0.5\theta}{f}$ | $\dfrac{r\cos 0.5\theta}{f}$ | $\dfrac{r\cos 0.5\theta}{f}$ | $\mathcal{E}_x = \dfrac{r\cos\theta}{f_x}$ |
| | $\dfrac{r\cos^2 0.5\theta}{f}$ | $\dfrac{r}{f\cos 0.5\theta}$ | $\dfrac{r}{f\cos 0.5\theta}$ | $\mathcal{E}_y = \dfrac{r}{f_y\cos\theta}$ |
| Figure of merit: $\eta$ $\eta = ME\left(\dfrac{I_{min}}{I_{max}}\right)^{\frac{1}{4}}\left(\dfrac{\varepsilon_{min}}{\varepsilon_{max}}\right)^{\frac{1}{2}}$ | $\dfrac{2\sin^2 0.5\theta_M \cos 0.5\theta_M}{\pi}$ $\leq 0.25$ $(\theta_M = 109°)$ | $\dfrac{2\sin^2 0.5\theta_M \sqrt{\cos 0.5\theta_M}}{\pi}$ $\leq 0.34$ $(\theta_M = 127°)$ | $\dfrac{4\sin^2 0.5\pi \sqrt{\cos 0.5\pi}}{\pi}$ $\leq 0.54$ $(\theta_M = 90°)$ | $2\sin\theta_M \sqrt{\cos\theta_M}$ $\leq 1.24$ $(\theta_M = 55°)$ |

Light source intensity increase rate: M $M = \begin{cases} 1 \ldots \text{pressure of semispherical mirror} \\ 2 \ldots \text{Absence of semispherical mirror} \end{cases}$ It would be understood how greatly the present invention has brought about great revolution starting from the discovery of the concept of "sinusoidal area", in comparison with the form on the leftmost column corresponding to FIG. 5 of the prior art.

The explanation of main embodiments of the present invention and main modified examples thereof has been finished. Although the present invention has been disclosed on the assumption of an TN (twisted nematic) type liquid crystal panel, the invention can be applied to other type light valves. In the embodiments having no relation to polarization, the liquid crystal panel means may be replaced by a general image source means (for example, OHP sheet).

INDUSTRIAL APPLICABILITY

As is to be understood from the aforementioned disclosure, according to the present invention, there can be provided a liquid crystal display unit excellent both in contrast ratio and in image quality to overcome the problems in the prior art.

Further, improvement of the efficiency of use of light in the liquid crystal display unit can be achieved.

Further, improvement of relative corner illuminance in the liquid crystal display unit can be achieved.

Further, the thicknesses of two glass plates constituting the liquid crystal panel means are made different from each other and a TFT (thin film-like semiconductor element) is formed in the thick plate side to thereby make it possible to keep the strength of the liquid crystal panel means and reduce the total weight thereof.

These techniques can be applied to direct vision type, optical fiber type and projection type liquid crystal display units and, accordingly, these techniques are highly valuable industrially.

I claim:

1. In a projection type display unit having a black stripe screen, a projection lens, and a liquid crystal panel means, a liquid crystal display unit with reduced moire interference comprising at least a light-diverging means disposed in a light path from said liquid crystal panel means to said projection lens for diverging light horizontally and constituted so that a half-value width of a horizontal spread of spot size by said light-diverging means is not smaller than a value 0.75 times as large as a period of arrangement of black stripes, and a frequency response of said light diverging means is not smaller than 0.3 at the largest data frequency which can be restored by said liquid crystal panel means.

2. A liquid crystal display unit according to claim 1, wherein said display unit is a rear projection type liquid crystal display unit and comprises optical disc storing shelves provided in at least one of left and right portions below said screen means.

3. A projection type liquid crystal display unit according claim 1, further comprising half-wavelength phase plate means disposed between said liquid crystal panel means and said screen means so that in-put light to said screen means is transformed into a vertical polarized wave.

4. A projection type liquid crystal display unit having a transparent flexible plate means disposed between a liquid crystal panel means and a projection lens means so that geometric distortion on a reproduced image is compensated by bending and adjusting respective peripheral portions of said transparent flexible plate means.

5. A liquid crystal display unit comprising a light source means for emitting white light rays, a liquid crystal panel means, and a light-ray direction transforming means for guiding output light of said light source means to said liquid crystal panel means, wherein a three-direction means for separating light of three primary colors into light rays of three different directions, a three-position means for converging said light rays of three different directions toward three different positions, and a light-divergence-reducing means for reducing an angle of divergence of light are disposed along a traveling direction of light in an input side of said liquid crystal panel means, a thickness $T_1$ of a medium between said three-position means and said light-divergence-reducing means being formed so as to be not smaller than 0.6 times but not larger than 1.2 times as large as a focal length of said light-divergence-reducing means, a focal length f of said three-position means being formed so as to be not smaller than $T_1$ but not larger than $1.6T_1$, whereby direction differences of said light rays of said three primary colors are reduced and said light rays of said three primary colors are guided to respective pixel positions for said three primary colors.

6. A liquid crystal display unit according to claim 5, further comprising polarization-direction matching means disposed between said liquid crystal panel means and said three-direction means for making a light-separating direction of said three-direction means substantially coincident with a wide-directivity direction of said liquid crystal panel means.

7. A liquid crystal display unit according to claim 5, wherein said three-position means and said light-divergence-reducing means are constituted by an input-side lenticular lens and an output-side lenticular lens, respectively, in one sheet of double-sided lenticular lens means disposed on a light-input side of said liquid crystal panel means.

8. A liquid crystal display unit according to claim 7, wherein a lenticular lens means is further disposed on a light-input side of said double-sided lenticular lens means so that a light-converging direction of said lenticular lens means is substantially perpendicular to a light-converging direction of said double-sided lenticular lens means.

9. A liquid crystal display unit according to claim 5, wherein said display unit is a projection type liquid crystal display unit and further comprises a projection lens means and a screen means.

10. A liquid crystal display unit according to claim 5, wherein light-utilizing efficiency improving means constituted by a polarizing beam splitter, a half wavelength plate for rotating a plane of polarization by 90 degrees and a reflecting mirror are disposed between said light-ray-direction transforming means and said three direction means.

11. A liquid crystal display unit according to claim 5 wherein said display unit is an optical fiber type liquid crystal display unit and wherein light-receiving ends of optical fiber means are disposed on an output side of said liquid crystal panel means.

12. A liquid crystal display unit according to claim 5 wherein said display unit is a direct view type liquid crystal display unit and further comprises a lenticular lens means disposed on an output side of said liquid crystal panel means so that a light diverging direction of said lenticular lens means is made substantially coincident with a narrow-directivity direction of said liquid crystal panel means.

13. A liquid crystal display unit according to claim 8, wherein stripe type-polarization direction rotating means are disposed on a light-output side of said liquid crystal panel means so that a plane of polarization of an output light of said lenticular lens means is rotated by 90 degrees line-by-line every two lines by said polarization direction rotating means.

14. A projection type liquid crystal display unit according to claim 1, further comprising quarter-wavelength phase plate means which is formed integrally with light-deflecting means formed on an output face of said liquid crystal panel means.

15. A projection type liquid crystal display unit according to any one of claims 1, 4, or 9, wherein field lens means is provided at an output side of said liquid crystal panel means so that the direction of output light rays is deflected toward a pupil of said projection lens by said field lens means.

16. A projection type liquid crystal display unit according to claim 15, wherein said field lens means is constituted by two Fresnel sheets which are joined with each other in a manner so that respective lens faces of said two Fresnel sheets are made to face each other with their prism phases made coincident with each other.

17. In a projection type display unit having a black stripe screen, a projection lens, and a liquid crystal panel, a liquid crystal display unit with reduced moire interference comprising at least a light-diverging unit disposed in a light path from said liquid crystal panel to said projection lens diverging light horizontally and constituted so that a half-value width of a horizontal spread of spot size by said light-diverging unit is not smaller than a value 0.75 times as large as a period of arrangement of black stripes, and the frequency response of said light diverging means is not smaller than 0.3 at the largest data frequency which can be restored by said liquid crystal panel.

18. A projection type liquid crystal display unit having a transparent flexible plate disposed between a liquid crystal panel and a projection lens so that geometric distortion on a reproduced image is compensated by bending and adjusting respective peripheral portions of said transparent flexible plate.

19. A liquid crystal display unit comprising a light source emitting white light rays, a liquid crystal panel, and a light-ray direction transforming unit guiding output light of said light source to said liquid crystal panel, wherein a three-direction separator separating light of three primary colors into light rays of three different directions, a three-position converger converging said light rays of three different directions toward three different positions, and a light-divergence reducer reducing an angle of divergence of light are disposed along a traveling direction of light in an input side of said liquid crystal panel means, a thickness $T_1$ of a medium between said three-position converger and said light-divergence reducer being formed so as to be not smaller than 0.6 times but not larger than 1.2 times as large as a focal length of said light-divergence reducer, a focal length f of said three-position converger being formed so as to be not smaller than $T_1$ but not larger than $1.6T_1$, whereby direction differences of said light rays of said three primary colors are reduced and said light rays of said three primary colors are guided to respective pixel positions for said three primary colors.

20. A liquid crystal display unit according to claim 10, further comprising quarter-wavelength phase plate means which is disposed between said light ray-direction transforming means and said polarizing beam splitter with its light-anomaly axis inclined by 45° relative to a horizontal direction.

* * * * *